(12) United States Patent
Sandstrom

(10) Patent No.: US 11,816,505 B2
(45) Date of Patent: Nov. 14, 2023

(54) CONFIGURABLE LOGIC PLATFORM WITH RECONFIGURABLE PROCESSING CIRCUITRY

(71) Applicant: ThroughPuter, Inc., Williamsburg, VA (US)

(72) Inventor: Mark Henrik Sandstrom, Alexandria, VA (US)

(73) Assignee: ThroughPuter, Inc., Williamsburg, VA (US)

( * ) Notice: Subject to any disclaimer, the term of this patent is extended or adjusted under 35 U.S.C. 154(b) by 0 days.

(21) Appl. No.: 17/979,526

(22) Filed: Nov. 2, 2022

(65) Prior Publication Data
US 2023/0053365 A1    Feb. 23, 2023

Related U.S. Application Data

(63) Continuation of application No. 17/859,657, filed on Jul. 7, 2022, now Pat. No. 11,500,682, which is a (Continued)

(51) Int. Cl.
*G06F 9/50* (2006.01)
*G06F 9/48* (2006.01)
(Continued)

(52) U.S. Cl.
CPC .......... *G06F 9/5038* (2013.01); *G06F 9/4881* (2013.01); *G06F 8/656* (2018.02);
(Continued)

(58) Field of Classification Search
CPC ...... G06F 9/5038; G06F 9/4881; G06F 8/656; G06F 9/5027; G06F 15/173; G06F 15/80;
(Continued)

(56) References Cited

U.S. PATENT DOCUMENTS 3,881,141 A    4/1975    Narita et al.
4,402,046 A    8/1983    Cox et al.
(Continued)

FOREIGN PATENT DOCUMENTS

DE    3340123 A1    5/1985
EP    255857 A2    2/1988
(Continued)

OTHER PUBLICATIONS

Papadimitriou et al, "Performance of Partial Reconfiguration in FPGA Systems: a Survey and a Cost Model", ACM Transactions on Reconfigurable Technology and Systems, vol. 4, Issue 4, Dec. 28, 2011, pp. 1-24.
(Continued)

*Primary Examiner* — Brian T O Connor
(74) *Attorney, Agent, or Firm* — Gardella Grace P.A.

(57) ABSTRACT

An architecture for a load-balanced groups of multi-stage manycore processors shared dynamically among a set of software applications, with capabilities for destination task defined intra-application prioritization of inter-task communications (ITC), for architecture-based ITC performance isolation between the applications, as well as for prioritizing application task instances for execution on cores of manycore processors based at least in part on which of the task instances have available for them the input data, such as ITC data, that they need for executing.

17 Claims, 16 Drawing Sheets

Related U.S. Application Data continuation of application No. 17/470,926, filed on Sep. 9, 2021, now Pat. No. 11,385,934, which is a continuation of application No. 17/463,098, filed on Aug. 31, 2021, now Pat. No. 11,347,556, which is a continuation of application No. 17/344,636, filed on Jun. 10, 2021, now Pat. No. 11,188,388, which is a continuation of application No. 17/195,174, filed on Mar. 8, 2021, now Pat. No. 11,036,556, which is a continuation of application No. 16/434,581, filed on Jun. 7, 2019, now Pat. No. 10,942,778, which is a continuation of application No. 15/267,153, filed on Sep. 16, 2016, now Pat. No. 10,318,353, which is a continuation of application No. 14/318,512, filed on Jun. 27, 2014, now Pat. No. 9,448,847.

(60) Provisional application No. 61/934,747, filed on Feb. 1, 2014, provisional application No. 61/869,646, filed on Aug. 23, 2013.

(51) Int. Cl.
- *G06F 8/656* (2018.01)
- *G06F 15/80* (2006.01)
- *H04L 47/78* (2022.01)
- *G06F 15/173* (2006.01)

(52) U.S. Cl.
CPC .......... *G06F 9/5027* (2013.01); *G06F 15/173* (2013.01); *G06F 15/80* (2013.01); *G06F 2209/483* (2013.01); *G06F 2209/5021* (2013.01); *H04L 47/78* (2013.01)

(58) Field of Classification Search
CPC ....... G06F 2209/483; G06F 2209/5021; H04L 47/78
See application file for complete search history.

(56) References Cited

U.S. PATENT DOCUMENTS

| | | | |
|---|---|---|---|
| 4,404,628 | A | 9/1983 | Angelo |
| 4,956,771 | A | 9/1990 | Neustaedter |
| 5,031,146 | A | 7/1991 | Umina et al. |
| 5,237,673 | A | 8/1993 | Orbits et al. |
| 5,303,369 | A | 4/1994 | Borcherding et al. |
| 5,452,231 | A | 9/1995 | Butts et al. |
| 5,519,829 | A | 5/1996 | Wilson |
| 5,600,845 | A | 2/1997 | Gilson |
| 5,612,891 | A | 3/1997 | Butts et al. |
| 5,752,030 | A | 5/1998 | Konno et al. |
| 5,809,516 | A | 9/1998 | Ukai et al. |
| 5,931,959 | A | 8/1999 | Kwiat |
| 6,072,781 | A | 6/2000 | Feeney et al. |
| 6,108,683 | A | 8/2000 | Kamada et al. |
| 6,211,721 | B1 | 4/2001 | Smetana |
| 6,212,544 | B1 | 4/2001 | Borkenhagen et al. |
| 6,289,434 | B1 | 9/2001 | Roy |
| 6,289,440 | B1 | 9/2001 | Casselman |
| 6,334,175 | B1 | 12/2001 | Chih |
| 6,345,287 | B1 | 2/2002 | Fong et al. |
| 6,353,616 | B1 | 3/2002 | Elwalid et al. |
| 6,366,157 | B1 | 4/2002 | Abdesselem et al. |
| 6,605,960 | B2 | 8/2003 | Veenstra |
| 6,721,948 | B1 | 4/2004 | Morgan |
| 6,728,959 | B1 | 4/2004 | Merkey |
| 6,769,017 | B1 | 7/2004 | Bhat et al. |
| 6,782,410 | B1 | 8/2004 | Bhagat et al. |
| 6,816,905 | B1 | 11/2004 | Sheets et al. |
| 6,909,691 | B1 | 6/2005 | Goyal et al. |
| 6,912,706 | B1 | 6/2005 | Stamm et al. |
| 7,028,167 | B2 | 4/2006 | Soltis, Jr. et al. |
| 7,058,868 | B2 | 6/2006 | Guettaf |
| 7,093,258 | B1 | 8/2006 | Miller et al. |
| 7,099,813 | B2 | 8/2006 | Nightingale |
| 7,110,417 | B1 | 9/2006 | El-Hennawey et al. |
| 7,117,372 | B1 | 10/2006 | Trimberger |
| 7,177,961 | B2 | 2/2007 | Brice, Jr. et al. |
| 7,178,145 | B2 | 2/2007 | Bono |
| 7,307,445 | B2 | 12/2007 | Liang |
| 7,315,897 | B1 | 1/2008 | Hardee et al. |
| 7,328,314 | B2 | 2/2008 | Kendall et al. |
| 7,370,013 | B1 | 5/2008 | Aziz et al. |
| 7,389,403 | B1 | 6/2008 | Alpert et al. |
| 7,406,407 | B2 | 7/2008 | Larus |
| 7,447,873 | B1 | 11/2008 | Nordquist |
| 7,461,376 | B2 | 12/2008 | Geye et al. |
| 7,469,311 | B1 | 12/2008 | Tsu et al. |
| 7,503,045 | B1 | 3/2009 | Aziz et al. |
| 7,518,396 | B1 | 4/2009 | Kondapalli et al. |
| 7,581,079 | B2 | 8/2009 | Pechanek |
| 7,665,092 | B1 | 2/2010 | Vengerov |
| 7,669,035 | B2 | 2/2010 | Young et al. |
| 7,698,541 | B1 | 4/2010 | Robles |
| 7,738,496 | B1 | 6/2010 | Raza |
| 7,743,001 | B1 | 6/2010 | Vermeulen et al. |
| 7,760,625 | B2 | 7/2010 | Miyaho et al. |
| 7,765,512 | B1 | 7/2010 | Neuendorffer |
| 7,765,547 | B2 | 7/2010 | Cismas et al. |
| 7,802,255 | B2 | 9/2010 | Pilkington |
| 7,805,706 | B1 | 9/2010 | Ly et al. |
| 7,861,063 | B1 | 12/2010 | Golla et al. |
| 7,908,606 | B2 | 3/2011 | Depro et al. |
| 7,971,072 | B1 | 6/2011 | Donlin et al. |
| 7,984,246 | B1 | 7/2011 | Yung et al. |
| 8,001,549 | B2 | 8/2011 | Henmi |
| 8,015,392 | B2 | 9/2011 | Naik et al. |
| 8,018,961 | B2 | 9/2011 | Gopinath et al. |
| 8,024,731 | B1 | 9/2011 | Cornwell et al. |
| 8,032,889 | B2 | 10/2011 | Conrad et al. |
| 8,046,766 | B2 | 10/2011 | Rhine |
| 8,050,256 | B1 | 11/2011 | Bao et al. |
| 8,059,674 | B2 | 11/2011 | Cheung et al. |
| 8,060,610 | B1 | 11/2011 | Herington |
| 8,087,029 | B1 | 12/2011 | Lindholm et al. |
| 8,095,662 | B1 | 1/2012 | Lappas et al. |
| 8,098,255 | B2 | 1/2012 | Fouladi et al. |
| 8,136,153 | B2 | 3/2012 | Zhang et al. |
| 8,174,287 | B2 | 5/2012 | German |
| 8,230,070 | B2 | 7/2012 | Buyya et al. |
| 8,271,730 | B2 | 9/2012 | Piry et al. |
| 8,296,434 | B1 | 10/2012 | Miller et al. |
| 8,327,126 | B2 | 12/2012 | Bell, Jr. et al. |
| 8,352,609 | B2 | 1/2013 | Maclinovsky et al. |
| 8,352,611 | B2 | 1/2013 | Maddhuri et al. |
| 8,407,658 | B2 | 3/2013 | Needham |
| 8,429,630 | B2 | 4/2013 | Nickolov et al. |
| 8,447,933 | B2 | 5/2013 | Nishihara |
| 8,533,674 | B2 | 9/2013 | Abrams et al. |
| 8,539,207 | B1 | 9/2013 | LeGrand |
| 8,544,014 | B2 | 9/2013 | Gopalan et al. |
| 8,561,183 | B2 | 10/2013 | Muth et al. |
| 8,566,836 | B2 | 10/2013 | Ramaraju et al. |
| 8,572,622 | B2 | 10/2013 | Alexander et al. |
| 8,595,832 | B1 | 11/2013 | Yee et al. |
| 8,612,330 | B1 | 12/2013 | Certain et al. |
| 8,626,970 | B2 | 1/2014 | Craddock et al. |
| 8,635,675 | B2 | 1/2014 | Kruglick |
| 8,713,572 | B2 | 4/2014 | Chambliss et al. |
| 8,713,574 | B2 | 4/2014 | Creamer et al. |
| 8,738,860 | B1 | 5/2014 | Griffin et al. |
| 8,745,241 | B2 | 6/2014 | Waldspurger |
| 8,762,595 | B1 | 6/2014 | Muller et al. |
| 8,850,574 | B1 | 9/2014 | Ansel et al. |
| 8,881,141 | B2 | 11/2014 | Koch et al. |
| 8,910,109 | B1 | 12/2014 | Orthner |
| 8,935,491 | B2 | 1/2015 | Sandstrom |
| 9,038,072 | B2 | 5/2015 | Nollet et al. |
| 9,104,453 | B2 | 8/2015 | Anand et al. |
| 9,164,953 | B2 | 10/2015 | Lippett |
| 9,183,052 | B2 * | 11/2015 | Muthiah ............... G06F 9/5061 |
| 9,218,195 | B2 | 12/2015 | Anderson et al. |

(56) References Cited

U.S. PATENT DOCUMENTS

| | | | |
|---|---|---|---|
| 9,262,360 B2 | 2/2016 | Wagh et al. | |
| 9,348,724 B2 | 5/2016 | Ota et al. | |
| 9,390,046 B2 | 7/2016 | Wagh | |
| 9,411,636 B1 * | 8/2016 | Ting | G06F 9/4881 |
| 9,424,090 B2 | 8/2016 | Sandstrom | |
| 9,448,847 B2 | 9/2016 | Sandstrom | |
| 9,465,667 B1 | 10/2016 | Sandstrom | |
| 9,503,093 B2 | 11/2016 | Karras et al. | |
| 9,519,518 B2 * | 12/2016 | Kamath | G06F 9/5088 |
| 9,589,088 B1 | 3/2017 | Mishra et al. | |
| 9,608,933 B2 | 3/2017 | Emaru | |
| 9,632,833 B2 | 4/2017 | Sandstrom | |
| 9,690,600 B2 | 6/2017 | Jung et al. | |
| 9,697,161 B2 | 7/2017 | Mangano et al. | |
| 9,910,708 B2 | 3/2018 | Williamson | |
| 10,013,662 B2 | 7/2018 | Brandwine et al. | |
| 10,133,599 B1 | 11/2018 | Sandstrom | |
| 10,133,600 B2 | 11/2018 | Sandstrom | |
| 10,223,317 B2 | 3/2019 | Atta | |
| 10,282,330 B2 | 5/2019 | Khan | |
| 10,318,353 B2 | 6/2019 | Sandstrom | |
| 10,430,242 B2 | 10/2019 | Sandstrom | |
| 10,942,778 B2 | 3/2021 | Sandstrom | |
| 11,036,556 B1 | 6/2021 | Sandstrom | |
| 11,182,320 B2 | 11/2021 | Khan et al. | |
| 11,188,388 B2 | 11/2021 | Sandstrom | |
| 11,347,556 B2 | 5/2022 | Sandstrom | |
| 11,385,934 B2 | 7/2022 | Sandstrom | |
| 11,687,374 B2 | 6/2023 | Sandstrom | |
| 2002/0040400 A1 | 4/2002 | Masters | |
| 2002/0056033 A1 | 5/2002 | Huppenthal | |
| 2002/0112091 A1 | 8/2002 | Schott et al. | |
| 2002/0124012 A1 | 9/2002 | Liem et al. | |
| 2002/0129080 A1 | 9/2002 | Hentschel et al. | |
| 2002/0141343 A1 | 10/2002 | Bays | |
| 2002/0143843 A1 | 10/2002 | Mehta | |
| 2002/0169828 A1 | 11/2002 | Blanchard | |
| 2003/0018807 A1 | 1/2003 | Larsson et al. | |
| 2003/0200408 A1 | 10/2003 | Mekhiel | |
| 2003/0235200 A1 | 12/2003 | Kendall et al. | |
| 2004/0088488 A1 | 5/2004 | Ober et al. | |
| 2004/0111724 A1 | 6/2004 | Libby | |
| 2004/0128401 A1 | 7/2004 | Fallon et al. | |
| 2004/0158637 A1 | 8/2004 | Lee | |
| 2004/0168170 A1 | 8/2004 | Miller | |
| 2004/0193806 A1 | 9/2004 | Koga et al. | |
| 2004/0210900 A1 | 10/2004 | Jones et al. | |
| 2005/0010502 A1 | 1/2005 | Birkestrand et al. | |
| 2005/0013705 A1 | 1/2005 | Farkas et al. | |
| 2005/0021931 A1 | 1/2005 | Anderson et al. | |
| 2005/0036515 A1 | 2/2005 | Cheung et al. | |
| 2005/0044344 A1 | 2/2005 | Stevens | |
| 2005/0055694 A1 | 3/2005 | Lee | |
| 2005/0080999 A1 | 4/2005 | Angsmark et al. | |
| 2005/0182838 A1 | 8/2005 | Sheets et al. | |
| 2005/0188372 A1 | 8/2005 | Inoue et al. | |
| 2005/0193186 A1 | 9/2005 | Gazsi et al. | |
| 2005/0198476 A1 | 9/2005 | Gazsi et al. | |
| 2005/0235070 A1 | 10/2005 | Young et al. | |
| 2005/0257030 A1 | 11/2005 | Langhammer | |
| 2005/0268298 A1 | 12/2005 | Hunt et al. | |
| 2005/0278551 A1 | 12/2005 | Goodnow et al. | |
| 2006/0036774 A1 | 2/2006 | Schott et al. | |
| 2006/0059485 A1 | 3/2006 | Onufryk et al. | |
| 2006/0061794 A1 | 3/2006 | Ito et al. | |
| 2006/0070078 A1 | 3/2006 | Dweck et al. | |
| 2006/0075265 A1 | 4/2006 | Hamaoka et al. | |
| 2006/0136606 A1 | 6/2006 | Guzy et al. | |
| 2006/0179194 A1 | 8/2006 | Jensen | |
| 2006/0195847 A1 | 8/2006 | Amano et al. | |
| 2006/0212870 A1 | 9/2006 | Arndt et al. | |
| 2006/0218376 A1 | 9/2006 | Pechanek | |
| 2007/0074011 A1 | 3/2007 | Borkar et al. | |
| 2007/0153802 A1 | 7/2007 | Anke et al. | |
| 2007/0220517 A1 | 9/2007 | Lippett | |
| 2007/0226482 A1 | 9/2007 | Borkar et al. | |
| 2007/0283311 A1 | 12/2007 | Karoubalis et al. | |
| 2007/0291576 A1 | 12/2007 | Yang | |
| 2008/0046997 A1 | 2/2008 | Wang | |
| 2008/0077927 A1 | 3/2008 | Armstrong et al. | |
| 2008/0086395 A1 | 4/2008 | Brenner et al. | |
| 2008/0189703 A1 | 8/2008 | Im et al. | |
| 2008/0201716 A1 | 8/2008 | Du et al. | |
| 2008/0222640 A1 | 9/2008 | Daly et al. | |
| 2008/0244588 A1 | 10/2008 | Leiserson et al. | |
| 2008/0256339 A1 | 10/2008 | Xu et al. | |
| 2008/0288747 A1 | 11/2008 | Inglett et al. | |
| 2009/0037554 A1 | 2/2009 | Herington | |
| 2009/0049443 A1 | 2/2009 | Powers et al. | |
| 2009/0070762 A1 | 3/2009 | Franaszek et al. | |
| 2009/0178047 A1 | 7/2009 | Astley et al. | |
| 2009/0187756 A1 | 7/2009 | Nollet et al. | |
| 2009/0198866 A1 | 8/2009 | Chen et al. | |
| 2009/0265712 A1 | 10/2009 | Herington | |
| 2009/0282477 A1 | 11/2009 | Chen et al. | |
| 2009/0327446 A1 | 12/2009 | Wittenschlaeger | |
| 2010/0043008 A1 | 2/2010 | Marchand | |
| 2010/0049963 A1 | 2/2010 | Bell, Jr. et al. | |
| 2010/0058346 A1 | 3/2010 | Narang et al. | |
| 2010/0100883 A1 | 4/2010 | Booton | |
| 2010/0131955 A1 | 5/2010 | Brent et al. | |
| 2010/0153700 A1 | 6/2010 | Capps, Jr. et al. | |
| 2010/0153955 A1 | 6/2010 | Sirota et al. | |
| 2010/0162230 A1 | 6/2010 | Chen et al. | |
| 2010/0192155 A1 | 7/2010 | Nam et al. | |
| 2010/0205602 A1 | 8/2010 | Zedlewski et al. | |
| 2010/0232396 A1 | 9/2010 | Jing et al. | |
| 2010/0268889 A1 | 10/2010 | Conte et al. | |
| 2010/0287320 A1 | 11/2010 | Querol et al. | |
| 2010/0333099 A1 | 12/2010 | Kupferschmidt et al. | |
| 2011/0014893 A1 | 1/2011 | Davis et al. | |
| 2011/0035749 A1 | 2/2011 | Krishnakumar et al. | |
| 2011/0047546 A1 | 2/2011 | Kivity et al. | |
| 2011/0050713 A1 | 3/2011 | McCrary et al. | |
| 2011/0055480 A1 | 3/2011 | Guyetant et al. | |
| 2011/0078411 A1 | 3/2011 | Maclinovsky et al. | |
| 2011/0096667 A1 | 4/2011 | Arita et al. | |
| 2011/0119674 A1 | 5/2011 | Nishikawa | |
| 2011/0125960 A1 | 5/2011 | Casselman | |
| 2011/0154348 A1 | 6/2011 | Elnozahy et al. | |
| 2011/0161969 A1 | 6/2011 | Arndt et al. | |
| 2011/0161976 A1 | 6/2011 | Alexander et al. | |
| 2011/0173432 A1 | 7/2011 | Cher et al. | |
| 2011/0197048 A1 | 8/2011 | Chung et al. | |
| 2011/0247012 A1 | 10/2011 | Uehara | |
| 2011/0249678 A1 | 10/2011 | Bonicatto et al. | |
| 2011/0258317 A1 | 10/2011 | Sinha et al. | |
| 2011/0296138 A1 | 12/2011 | Carter et al. | |
| 2011/0321057 A1 | 12/2011 | Mejdrich et al. | |
| 2012/0005473 A1 | 1/2012 | Hofstee et al. | |
| 2012/0022832 A1 | 1/2012 | Shannon et al. | |
| 2012/0079501 A1 | 3/2012 | Sandstrom | |
| 2012/0089985 A1 | 4/2012 | Adar et al. | |
| 2012/0173734 A1 | 7/2012 | Kimbrel et al. | |
| 2012/0216012 A1 | 8/2012 | Vorbach et al. | |
| 2012/0221886 A1 | 8/2012 | Bareness et al. | |
| 2012/0222038 A1 | 8/2012 | Katragadda et al. | |
| 2012/0222042 A1 | 8/2012 | Chess et al. | |
| 2012/0246450 A1 | 9/2012 | Abdallah | |
| 2012/0266176 A1 | 10/2012 | Vojnovic et al. | |
| 2012/0303809 A1 | 11/2012 | Patel et al. | |
| 2012/0324458 A1 | 12/2012 | Peterson et al. | |
| 2013/0013903 A1 | 1/2013 | Bell, Jr. et al. | |
| 2013/0222402 A1 | 8/2013 | Peterson et al. | |
| 2013/0325998 A1 | 12/2013 | Hormuth et al. | |
| 2014/0089635 A1 | 3/2014 | Shifer et al. | |
| 2014/0123135 A1 | 5/2014 | Huang et al. | |
| 2014/0149993 A1 | 5/2014 | Sandstrom | |
| 2014/0181501 A1 | 6/2014 | Hicok et al. | |
| 2014/0317378 A1 | 10/2014 | Lippett | |
| 2014/0331236 A1 | 11/2014 | Mitra et al. | |
| 2014/0372167 A1 | 12/2014 | Hillier | |
| 2015/0100772 A1 | 4/2015 | Jung et al. | |
| 2015/0178116 A1 | 6/2015 | Jorgensen et al. | |

(56) References Cited

U.S. PATENT DOCUMENTS

| | | | |
|---|---|---|---|
| 2015/0277920 | A1 | 10/2015 | Bradbury et al. |
| 2015/0339798 | A1 | 11/2015 | Peterson et al. |
| 2015/0378776 | A1 | 12/2015 | Lippett |
| 2016/0034295 | A1 | 2/2016 | Cochran |
| 2016/0048394 | A1 | 2/2016 | Vorbach et al. |
| 2016/0080201 | A1 | 3/2016 | Huang et al. |
| 2016/0378538 | A1 | 12/2016 | Kang |
| 2017/0024573 | A1 | 1/2017 | Bhattacharyya et al. |
| 2017/0097838 | A1 | 4/2017 | Nagapudi et al. |
| 2017/0310794 | A1 | 10/2017 | Smith et al. |
| 2018/0089119 | A1 | 3/2018 | Khan et al. |
| 2018/0097709 | A1 | 4/2018 | Box et al. |
| 2019/0361745 | A1 | 11/2019 | Sandstrom |
| 2020/0192454 | A1 | 6/2020 | de Rochemont |
| 2021/0191781 | A1 | 6/2021 | Sandstrom |
| 2021/0303361 | A1 | 9/2021 | Sandstrom |
| 2021/0397484 | A1 | 12/2021 | Sandstrom |
| 2021/0406083 | A1 | 12/2021 | Sandstrom |
| 2022/0342715 | A1 | 10/2022 | Sandstrom |

FOREIGN PATENT DOCUMENTS

| | | |
|---|---|---|
| EP | 389622 A2 | 7/1999 |
| EP | 2309388 A1 | 4/2011 |
| EP | 2704022 | 3/2014 |
| GB | 1236177 A | 6/1971 |
| GB | 2145255 A | 3/1985 |
| GB | 2272311 A | 5/1994 |
| JP | 05197619 A | 8/1993 |
| JP | 06004314 A | 1/1994 |
| JP | 11353291 A | 12/1999 |
| JP | 2014-230174 | 12/2014 |
| SU | 1327106 A1 | 7/1987 |
| WO | 2000070426 A2 | 11/2000 |
| WO | 2001061525 | 8/2001 |
| WO | 02/09285 A2 | 1/2002 |
| WO | 2008112779 | 9/2008 |
| WO | 2011123467 A1 | 10/2011 |
| WO | 2012/040691 A1 | 3/2012 |

OTHER PUBLICATIONS

Russinovich, M. and Solomon, D., "Microsoft Windows Internals, Fourth Edition: Microsoft Windows Server 2003, Windows XP, and Windows 2000", Microsoft Press, Dec. 1, 2004.
Tuan, Vu Manh, "A Study on a Multitasking Environment for Dynamically Reconfigurable Processors", School of Science for Open and Evironmental Systems, Graduate School of Science and Technology, Keio University, 2009.
Tullsen, Dean Michael, "Simultaneous Multithreading", University of Washington, 1996.
Wang, Zheng, "Internet QoS Architectures and Mechanisms for Quality of Service", Morgan Kaufmann, 2001. (Partial reference submitted, Chapter 2, pp. 60-64).
Yadev, et al, "Scheduling Algorithm: Tasks Scheduling Algorithm for Multiple Processors With Dynamic Reassignment", Journal of Computer Systems, Networks, and Communications, Jan. 1, 2008.
[#HADOOP—3445] Implementing core scheduler functionality in Resource Manager (V1) for Hadoop, Accessed May 18, 2018, 12 pages, https://issues.apache.org/jira/si/jira.issueviews:issue-html/HADOOP-3445/HADOOP-3445.html. (previously submitted in related U.S. Appl. No. 15/267,153).
7 Series FPGAs Configuration User Guide, a Xilinx, Inc. User Guide UG470 (v1.4) Jul. 19, 2012. (previously submitted in related U.S. Appl. No. 15/267,153).
Borges, et al., "Sun Grid Engine, a new scheduler for EGEE middleware," (2018). (previously submitted in related U.S. Appl. No. 15/267,153).
Cooper, Brian F. et al., Building a Cloud for Yahoo!, 2009, 9 pages, IEEE Computer Society Technical Committee on Data Engineering, https://www.researchgate.net/profile/Rodrigo_Fonseca3/publication/220282767_Building_a_Cloud_for_Yahoo/links/0912f5109da99ddf6a000000/Building-a-Cloud-for-Yahoo.pdf. (previously submitted in related U.S. Appl. No. 15/267,153).
Dye, David, Partial Reconfiguration of Xilinx FPGAs Using ISE Design Suite, a Xilinx, Inc. White Paper WP374 (v1.2), May 30, 2012. (previously submitted in related U.S. Appl. No. 15/267,153).
Examination Report issued in IN Application No. 1219/MUM/2012 dated Jul. 19, 2019. (previously submitted in related U.S. Appl. No. 17/195,174).
Examination Report issued in IN Application No. 2414/MUM/2011 dated Jul. 25, 2019. (previously submitted in related U.S. Appl. No. 17/195,174).
Examiner's Answer issued in related U.S. Appl. No. 15/267,153 dated Feb. 10, 2016, 9 pages. (previously submitted in related U.S. Appl. No. 15/267,153).
Final Rejection issued in related U.S. Appl. No. 15/267,153 dated Apr. 18, 2013, 18 pages. (previously submitted in related U.S. Appl. No. 15/267,153).
Final Rejection issued in related U.S. Appl. No. 15/267,153 dated Mar. 26, 2015, 14 pages. (previously submitted in related U.S. Appl. No. 15/267,153).
Final Rejection issued in related U.S. Appl. No. 15/267,153 dated Sep. 3, 2014, 18 pages. (previously submitted in related U.S. Appl. No. 15/267,153).
Final Rejection issued in related U.S. Appl. No. 15/267,153 dated Jul. 28, 2017, 16 pages. (previously submitted in related U.S. Appl. No. 15/267,153).
First Examination Report issued in IN Application No. 401/MUM/2011 on Nov. 9, 2018. (previously submitted in related U.S. Appl. No. 15/267,153).
Fischer, Michael J. et al., Assigning Tasks for Efficiency in Hadoop, 2010, 11 pages, https://www.researchgate.net/profile/Xueyuan_Su/publication/221257628_Assigning_tasks_for_efficiency_in_Hadoop/links/53df31100cf216e4210c5fd1/Assigning-tasks-for-efficiency-in-Hadoop.pdf. (previously submitted in related U.S. Appl. No. 15/267,153).
Gentzsch, et al., "Sun Grid Engine: Towards Creating a Compute Power Grid." IEEE Computer Society, Proceedings of the 1st International Symposium on Cluster Computing and the Grid (2001). (previously submitted in related U.S. Appl. No. 15/267,153).
Ghodsi, Ali, et al., Dominant Resource Fairness: Fair Allocation of Multiple Resource Types, Proceedings of NSDI 11: 8th USENIX Symposium on Networked Systems Design and Implementation, Mar. 30, 2011, pp. 323-336. (previously submitted in related U.S. Appl. No. 15/267,153).
Han, Wei, et al., Multi-core Architectures with Dynamically Reconfigurable Array Processors for the WiMAx Physical layer, pp. 115-120, 2008. (previously submitted in related U.S. Appl. No. 15/267,153).
Hindman, Benjamin, et al., Mesos: A Platform for Fine-Grained Resource Sharing in the Data Center, Proceedings of NSDI '11: 8th USENIX Symposium on Networked Systems Design and Implementation, Mar. 30, 2011, pp. 295-308. (previously submitted in related U.S. Appl. No. 15/267,153).
Isard, Michael et al., Quincy: Fair Scheduling for Distributed Computing Clusters, Accessed May 18, 2018, 20 pages, https://www.sigops.org/sosp/sosp09/papers/isard-sosp09.pdf. (previously submitted in related U.S. Appl. No. 15/267,153).
Ismail, M. I., et al., "Program-based static allocation policies for highly parallel computers," Proceedings International Phoenix Conference on Computers and Communications, Scottsdale, AZ, 1995, pp. 61-68. (previously submitted in related U.S. Appl. No. 15/267,153).
Jean, J et al., Dynamic reconfirmation to support concurrent applications, IEEE Transactions on Computers, vol. 48, Issue 6, pp. 591-602, Jun. 1999. (previously submitted in related U.S. Appl. No. 15/267,153).
Lamonnier et al., Accelerate Partial Reconfiguration with a 100% Hardware Solution, Xcell Journal, Issue 79, Second Quarter 2012, pp. 44-49. (previously submitted in related U.S. Appl. No. 15/267,153).
Lim, Harold C. et al., Automated Control in Cloud Computing: Challenges and Opportunities, Jun. 19, 2009, 6 pages, ACM, https://www2.cs.duke.edu/nicl/pub/papers/acdc09-lim.pdf. (previously submitted in related U.S. Appl. No. 15/267,153).

(56) References Cited

OTHER PUBLICATIONS

Loh, Gabriel H., 3 D-Stacked Memory Architectures for Multi-Core Processors, IEEE Computer Society, pp. 153-464, 2008. (previously submitted in related U.S. Appl. No. 15/267,153).
McCan, Cathy, et al., A Dynamic Processor Allocation Policy for Multiprogrammed Shared-Memory Multiprocessors, 1993, ACM, 33 pages (146-178). (previously submitted in related U.S. Appl. No. 15/267,153).
Mohan, Shiwali et al., Towards a Resource Aware Scheduler in Hadoop, Dec. 21, 2009, 10 pages, Computer Science and Engineering, University of Michigan, Ann Arbor, https://pdfs.semanticscholar.org/d2e3/c7b60967934903f0837219772c6972ede93e.pdf (previously submitted in related U.S. Appl. No. 15/267,153).
Morishita, et al., Design of a multiprocessor system supporting interprocess message communication, Journal of the Faculty of Engineering, University of Tokyo, Series A, No. 24, 1986, pp. 36-37. (previously submitted in related U.S. Appl. No. 15/267,153).
Murthy, Arun C., et al., Architecture of Next Generation Apache Hadoop MapReduce Framework, 2011, 14 pages. (previously submitted in related U.S. Appl. No. 15/267,153).
Non-Final Rejection issued in related U.S. Appl. No. 15/267,153 dated Jun. 19, 2014, 15 pages. (previously submitted in related U.S. Appl. No. 15/267,153).
Non-Final Rejection issued in related U.S. Appl. No. 15/267,153 dated Mar. 14, 2013, 23 pages. (previously submitted in related U.S. Appl. No. 15/267,153).
Non-Final Rejection issued in related U.S. Appl. No. 15/267,153 dated Oct. 3, 2014, 29 pages. (previously submitted in related U.S. Appl. No. 15/267,153).
Non-Final Rejection issued in related U.S. Appl. No. 15/267,153 dated Feb. 12, 2016, 25 pages. (previously submitted in related U.S. Appl. No. 15/267,153).
Non-Final Rejection issued in related U.S. Appl. No. 15/267,153 dated Jun. 1, 2016, 18 pages. (previously submitted in related U.S. Appl. No. 15/267,153).
Non-Final Rejection issued in related U.S. Appl. No. 15/267,153 dated May 17, 2018, 23 pages. (previously submitted in related U.S. Appl. No. 15/267,153).
Non-Final Rejection issued in related U.S. Appl. No. 15/267,153 dated May 4, 2017, 19 pages. (previously submitted in related U.S. Appl. No. 15/267,153).
Non-Final Rejection issued in related U.S. Appl. No. 17/195,174 dated Aug. 24, 2018, 54 pages. (previously submitted in related U.S. Appl. No. 17/195,174).
Non-Final Rejection issued in related U.S. Appl. No. 17/195,174 dated Mar. 9, 2018, 23 pages. (previously submitted in related U.S. Appl. No. 17/195,174).
Notice of Allowance issued in U.S. Appl. No. 17/195,174 dated Jan. 17, 2019. (previously submitted in related U.S. Appl. No. 17/195,174).
Partial Reconfiguration Tutorial, PlanAhead Design Tool, a Xilinx, Inc. User Guide UG743 (v14.1) May 8, 2012. (previously submitted in related U.S. Appl. No. 15/267,153).
Partial Reconfiguration User Guide, a Xilinx, Inc. user document UG702 (v14.2) Jul. 25, 2012. (previously submitted in related U.S. Appl. No. 15/267,153).
Sandholm, Thomas et al., Dynamic Proportional Share Scheduling in Hadoop, Accessed May 18, 2018, 20 pages, Hewlett-Packard Laboratories, http://citeseerx.ist.psu.edu/viewdoc/download?doi=10.1.1.591.4477&rep=rep1&type=pdf. (previously submitted in related U.S. Appl. No. 15/267,153).
Shankar, Uma, Oracle Grid Engine Administration Guide, Release 6.2 Update 7, Aug. 2011, 202 pages, Oracle Corporation. (previously submitted in related U.S. Appl. No. 15/267,153).
Shieh, Alan, et al., Sharing the Data Center Network, Proceedings of NSDI '11: 8th USENIX Symposium on Networked Systems Design and Implementation, Mar. 30, 2011, pp. 309-322. (previously submitted in related U.S. Appl. No. 15/267,153).
Singh, Deshanand, Implementing FPGA Design with the OpenCL Standard, an Altera Corporation White Paper NP-01173-2.0, Nov. 2012. (previously submitted in related U.S. Appl. No. 15/267,153).
Tam et al., Fast Configuration of PCI Express Technology through Partial Reconfiguration, a Xilinx, Inc. Application Note XAPP883 (v1.0) Nov. 19, 2010. (previously submitted in related U.S. Appl. No. 15/267,153).
Tian, Chao et al., A Dynamic MapReduce Scheduler for Heterogeneous Workloads, 2009, pp. 218-224, IEEE Computer Society, https://pdfs.semanticscholar.org/679f/73d810e2ac9e2e84de798d853b6fb0b0206a.pdf. (previously submitted in related U.S. Appl. No. 15/267,153).
Tsai, Chang-Hao, System Architectures with Virtualized Resources in a Large-Scale Computing Infrastructure, 2009, 146 pages, Computer Science and Engineering, The University of Michigan, https://kabru.eecs.umich.edu/papers/thesis/chtsai-thesis.pdf (previously submitted in related U.S. Appl. No. 15/267,153).
Warneke et al., "Nephele: efficient parallel data processing in the cloud," MTAGS '09 Proceedings of the 2nd Workshop on Many-Task Computing on Grids and Supercomputers, Article No. 8 (2009). (previously submitted in related U.S. Appl. No. 17/195,174).
Wen et al., "Minimizing Migration on Grid Environments: an Experience on Sun Grid Engine" Journal of Information Technology and Applications, vol. 1, No. 4, pp. 297-304 (2007). (previously submitted in related U.S. Appl. No. 15/267,153).
Zaharia, Matei et al., Job Scheduling for Multi-User MapReduce Clusters, Apr. 30, 2009, actual publication date unknown, 18 pages, Electrical Engineering and Computer Sciences, University of California at Berkeley, https://www2.eecs.berkeley.edu/Pubs/TechRpts/2009/EECS-2009-55.pdf. (previously submitted in related U.S. Appl. No. 15/267,153).
Al-Fares et al., "Hedera: Dynamic Flow Scheduling for Data Center Networks", Nsdi, vol. 10, No. 8, Apr. 28, 2010. (previously submitted in related U.S. Appl. No. 17/195,174).
Binotto et al., "Dynamic Self-Rescheduling of Tasks over a Heterogeneous Platform," 2008 International Conference on Reconfigurable Computing and FPGAs, 2008, pp. 253-258. (previously submitted in related U.S. Appl. No. 17/195,174).
Clemente et al., "A Task-Graph Execution Manager for Reconfigurable Multi-tasking Systems," pp. 73-83, 2010, Microprocessors and Microsystems, vol. 34, Issues 2-4. (previously submitted in related U.S. Appl. No. 17/195,174).
Ebrahimi et al., "Fairness via Source Throttling: A Configurable and High-Performance Fairness Substrate for MultiCore Memory Systems", ACM SIGPLAN Notices, vol. 45, No. 3, Mar. 2010, pp. 335-346. (previously submitted in related U.S. Appl. No. 17/195,174).
George et al., "Novo-G: At the Forefront of Scalable Reconfigurable Supercomputing", Computing in Science Engineering, vol. 13, Issue 1, Dec. 30, 2010, pp. 82-86. (previously submitted in related U.S. Appl. No. 17/195,174).
Gohringer et al., "CAP-OS: Operating system for runtime scheduling, task mapping and resource management on reconfigurable multiprocessor architectures," 2010 IEEE International Symposium on Parallel & Distributed Processing, Workshops and Phd Forum (IPDPSW), 2010, pp. 1-8, doi: 10.1109/IPDPSW.2010.5470732 (previously submitted in related U.S. Appl. No. 17/195,174).
Gohringer et al., "Operating System for Runtime Reconfigurable Multiprocessor Systems," International Journal of Reconfigurable Computing, Feb. 14, 2011, pp. 1-17, vol. 2011, Hindawi Publishing Corporation, (previously submitted in related U.S. Appl. No. 17/195,174).
Jacobs et al., "Reconfigurable Fault Tolerance: A Comprehensive Framework for Reliable and Adaptive FPGA-Based Space Computing," ACM Trans. Reconfigurable Technol. Syst. 5, 4, Article 21 (Dec. 2012), 30 pages. (previously submitted in related U.S. Appl. No. 17/195,174).
Joselli et al., "An architecture with automatic load balancing for real-time simulation and visualization systems," Journal of Computational Interdisciplinary Sciences, 2010, 1(3): 207-224. (previously submitted in related U.S. Appl. No. 17/195,174).
May et al., "Queueing Theory Modeling of a CPU-GPU System," Northrup Grumman Corporation, Electronic Systems Sector, May 11, 2010, 2 pages. (previously submitted in related U.S. Appl. No. 17/195,174).
Notice of Allowance issued in U.S. Appl. No. 17/195,174 dated Oct. 27, 2020. (previously submitted in related U.S. Appl. No. 17/195,174).

(56) References Cited

OTHER PUBLICATIONS

Odajima et al., "GPU/CPU Work Sharing with Parallel Language XcalableMP-dev for Parallelized Accelerated Computing," 2012 41st International Conference on Parallel Processing Workshops, Pittsburgh, PA, 2012, pp. 97-106, doi: 10.1109/ICPPW.2012.16. (previously submitted in related U.S. Appl. No. 17/195,174).
Ranjan et al., "Parallelizing a Face Detection and Tracking System for Multi-Core Processors," Proceedings of the 2012 9th Conference on Computer and Robot Vision, CRV 2012 (2012), pp. 290-297, 10.1109/CRV.2012.45. (previously submitted in related U.S. Appl. No. 17/195,174).
Roy et al., "Efficient Autoscaling in the Cloud using Predictive Models for Workload Forecasting", 2011 IEEE 4th International Conference on Cloud Computing, Washington DC, Jul. 4-9, 2011, pp. 500-507. (previously submitted in related U.S. Appl. No. 17/195,174).
Supplemental Notice of Allowability issued in U.S. Appl. No. 17/195,174 dated Sep. 18, 2018, 34 pages. (previously submitted in related U.S. Appl. No. 17/195,174).
Supplemental Notice of Allowability issued in U.S. Appl. No. 17/195,174 dated Sep. 7, 2018, 26 pages. (previously submitted in related U.S. Appl. No. 17/195,174).
Toss, Julio, "Work Stealing Inside GPUs," Universidade Federal do Rio Grande do Sul. Instituto de Informática, 39 pages, 2011, Curso de Ciência da Computação: Ênfase em Ciência da Computação: Bacharelado. (previously submitted in related U.S. Appl. No. 17/195,174).
Wu et al., "Runtime Task Allocation in Multicore Packet Processing Systems," IEEE Transactions on Parallel and Distributed Systems, vol. 23, No. 10, pp. 1934-1943, Oct. 2012, doi: 10.1109/TPDS.2012.56. (previously submitted in related U.S. Appl. No. 17/195,174).
Ziermann et al., "Adaptive Traffic Scheduling Techniques for Mixed Real-Time and Streaming Applications on Reconfigurable Hardware," 2010 IEEE International Symposium on Parallel & Distributed Processing, Workshops and Phd Forum (IPDPSW), 2010, pp. 1-4, doi: 10.1109/IPDPSW.2010.5470738 (previously submitted in related U.S. Appl. No. 17/195,174).
Notice of Allowance issued in U.S. Appl. No. 17/470,926 dated May 14, 2021. (previously submitted in related U.S. Appl. No. 17/470,926).
Hutchings et al., "Implementation approaches for reconfigurable logic applications," Field-Programmable Logic and Applications. Springer Berlin/Heidelberg, 1995. <http://citeseerx.ist.psu.edu/viewdoc/download?doi=10.1.1.17.3063&rep=rep1&type=pdf>. (previously submitted in related U.S. Appl. No. 17/470,926).
"Introduction to Implementing Design Security with Microsemi SmartFusion2 and IGLOO2 FPGAs," by Microsemi, Nov. 2013, 13 pages (previously submitted in related U.S. Appl. No. 17/470,926).
Shin et al., "AVANT-GUARD: Scalable and Vigilant Switch Flow Management in Software-Defined Networks," 2013. (previously submitted in related U.S. Appl. No. 17/470,926).
"Design of a Secure Plane Bridge," Microsemi, 2013. (previously submitted in related U.S. Appl. No. 17/470,926).
Unnikrishnan et al., "ReClick—A Modular Dataplane Design Framework for FPGA-Based Network Virtualization," 2011 ACM/IEEE Seventh Symposium on Architectures for Networking and Communications Systems, 2011, pp. 145-155, doi: 10.1109/ANCS.2011.31. (previously submitted in related U.S. Appl. No. 17/470,926).
Notice of Allowance issued in U.S. Appl. No. 17/470,926 dated Oct. 14, 2021. (previously submitted in related U.S. Appl. No. 17/470,926).
Supplemental Notice of Allowability issued in U.S. Appl. No. 17/470,926 dated Nov. 5, 2021. (previously submitted in related U.S. Appl. No. 17/470,926).
Non-Final Office Action issued in U.S. Appl. No. 17/470,926 dated Nov. 26, 2021. (previously submitted in related U.S. Appl. No. 17/470,926).
Non-Final Rejection issued in related U.S. Appl. No. 17/859,657 dated Aug. 16, 2022. (previously submitted in related U.S. Appl. No. 17/859,657).
Notice of Allowance issued in U.S. Appl. No. 17/859,657 dated Sep. 21, 2022.
Supplemental Notice of Allowability issued in U.S. Appl. No. 17/859,657 dated Oct. 13, 2022.
Decision Granting Institution of Inter Partes Review in IPR2022-00527 dated Sep. 19, 2022.
Decision Granting Institution of Inter Partes Review in IPR2022-00528 dated Sep. 19, 2022.
Decision Granting Institution of Inter Partes Review in IPR2022-00574 dated Sep. 19, 2022.
Decision Denying Institution of Inter Partes Review in IPR2022-00757 dated Nov. 1, 2022.
Decision Denying Institution of Inter Partes Review in IPR2022-00758 dated Oct. 11, 2022.
Agrawal et al "Adaptive scheduling with parallelism feedback." Proceedings of the eleventh ACM SIGPLAN symposium on Principles and practice of parallel programming. Mar. 29, 2006. pp. 100-109.
Aron et al "Cluster reserves: A mechanism for resource management in cluster-based network servers." Proceedings of the 2000 ACM SIGMETRICS international conference on Measurement and modeling of computer systems. Jun. 1, 2000. pp. 90-101.
Blelloch et al "Provably efficient scheduling for languages with fine-grained parallelism." Journal of the ACM (JACM) vol. 46, Issue 2, Mar. 1, 1999, pp. 281-321.
Chen et al "Configuration-sensitive process scheduling for FPGA-based computing platforms." Proceedings Design, Automation and Test in Europe Conference and Exhibition. vol. 1. IEEE, Feb. 16, 2004, pp. 486-493.
Coffman Jr., E.G. and Whitt, W., "Recent asymptotic results in the probabilistic analysis of schedule makespans." (1995).
Compton, K., and Hauck, S., "Reconfigurable computing: a survey of systems and software." ACM Computing Surveys (csuR) vol. 34, Issue 2 (Jun. 1, 2002), pp. 171-210.
Feitelson, D. G., "Job Scheduling In Multiprogrammed Parallel Systems", Institute of Computer Science, The Hebrew University, Aug. 1997.
Gabor et al, "Service Level Agreement for Multithreaded Processors", ACM Transactions on Architecture and Code Optimization, vol. 6, Issue 2, Jun. 2009, pp. 1-33.
Gregori, E. et al., eds. NETWORKING 2002: Networking Technologies, Services, and Protocols; Performance of Computerand Communication Networks; Mobile and Wireless Communications: Second International IFIP-TC6 Networking Conference, Pisa, Italy, May 19-24, 2002 Proceedings. vol. 2345. Springer Science & Business Media, 2007. (Partial reference submitted, pp. 65-68).
Karam, et al, "Trends In Multi-Core DSP Platforms", IEEE Signal Processing Magazine, vol. 26, No. 6, Nov. 2009, pp. 38-49.
Kumar, et al, "Single-ISA Heterogeneous Multi-Core Architectures: The Potential for Processor Power Reduction". Proceedings 36th Annual IEEE/ACM International Symposium on Microarchitecture, Dec. 5, 2003, pp. 81-92.
Lety, et al, "MiMaze, a 3D Multi-Player Game on the Internet", Proceedings of the 4th International Conference on Virtual System and Multimedia, Gifu, Japan. vol. 1. 1998.
Dingchao et al, "Scheduling Task Graphs Onto Heterogeneous Multiprocessors," Proceedings of TENCON'94 —1994 IEEE Region 10's 9th Annual International Conference on: 'Frontiers of Computer Technology', vol. 2, 1994, pp. 556-563.
Magro et al, "Hyper-Threading Technology: Impact on Compute-Intensive Workloads", Intel Technology Journal, vol. 6, Issue 1, Feb. 14, 2002.
Taylor, D. et al., "Dynamic Hardware Plugins: Exlpoiting Reconfigurable Hardware For High Performance Programmable Routers" Computer Networks 38, 3 (Feb. 2002) pp. 295-310.
Anwer, M. and Feamster, N., "Building A Fast, Virtualized Data Plane With Programmable Hardware", Proceedings of the 1st ACM Workshop on Virtualized Infrastructure Systems and Architectures, Aug. 17, 2009, pp. 1-8.
Balkan, A. et al., "Mesh-of-Trees and Alternative Interconnection Networks for Single-Chip Parallelism", IEEE Transactions on Very Large Scale Integration (VLSI) Systems, vol. 17, No. 10, Oct. 10, 2009, pp. 1419-1432.

(56) References Cited

OTHER PUBLICATIONS

Banerjee, S. and Gupta, T., "Multi-Stage Parallel Processing of Design Element Access Tasks in FPGA-based Logic Emulation Systems", 2011 3rd Asia Symposium on Quality Electronic Design (ASQED), IEEE, Jul. 19, 2011, pp. 301-309.
Bell, S. et al., "TILE64 Processor: A 64-Core SoC with Mesh Interconnect", 2008 IEEE International Solid-State Circuits Conference—Digest of Technical Papers, Feb. 3, 2008, pp. 88-598.
Dally, W. and Towles, B., "Route Packets, Not Wires: On-Chip Interconnection Networks", Proceedings of the 38th Annual Design Automation Conference, Jun. 22, 2001, pp. 684-689.
Lockwood, J. et al., "NetFPGA—An Open Platform for Gigabit-rate Network Switching and Routing", 2007 IEEE International Conference on Microelectronic Systems Education, Jun. 3, 2007, pp. 160-161.
Mallik, A. et al., "Automated Task Distribution in Multicore Network Processors using Statistical Analysis", Proceedings of the 3rd ACM/IEEE Symposium on Architecture for Networking and Communications Systems, Dec. 3, 2007, pp. 67-76.
Ouaiss, I. and Vemuri, R., "Hierarchical Memory Mapping During Synthesis in FPGA-Based Reconfigurable Computers", Proceedings Design, Automation and Test in Europe. Conference and Exhibition, Mar. 13, 2001, pp. 650-657.
Plishker, W. et al., "Automated Task Allocation for Network Processors", Network System Design Conference Proceedings, Oct. 2004, pp. 235-245.
Wolf et al., "Runtime support for multicore packet processing systems," IEEE Network. Jul. 23, 2007;21(4):29-37.
Wu, Q., "Dynamic Resource Management For High-Performance Many-Core Packet Processing Systems", University of Massachusetts Amherst, Feb. 2011.
Qiang, W. and Wolf, T., "Dynamic Workload Profiling and Task Allocation in Packet Processing Systems", 2008 International Conference on High Performance Switching and Routing, IEEE, May 15, 2008, pp. 123-130.
Ye, X et al., "MAPS: Multi-Algorithm Parallel Circuit Simulation", 2008 IEEE/ACM International Conference on Computer-Aided Design, IEEE, Nov. 10, 2008, pp. 73-78.
Non-Final Office Action issued in U.S. Appl. No. 17/979,542 dated Mar. 20, 2023, 54 pages.
Notice of Allowance issued in U.S. Appl. No. 17/979,542 dated Mar. 29, 2023, 10 pages.
Non-Final Office Action issued in U.S. Appl. No. 18/116,389 dated May 11, 2023, 7 pages.
Final Office Action mailed in U.S. Appl. No. 17/746,636 dated Aug. 2, 2023.
Zynq-7000 Extensible Processing Platform: Technical Reference Manual, Xilinx, May 8, 2012.
Ostler, Patrick Sutton, FPGA Bootstrapping Using Partial Reconfiguration, Theses and Dissertations, BYU Scholars Archive, Sep. 28, 2011.
Lockwood, John W., et al., A Low-Latency Library in FPGA Hardware for High-Frequency, 2012 IEEE 20th Annual Symposium on High Performance Interconnects, 2012.
Zeineddini, Amir & Wesselkamper, Jim, PRC/ERPC: Data Integrity and Security Controller for Partial Reconfiguration, Xilinx, Jun. 7, 2012.
Blott, Michaela, et al., FPGA Research Design Platform Fuels Network Advances, Xcell Journal, Fourth Quarter 2010, pp. 24-29.
Morris, Kevin, Xilinx Spartan-6 FPGAs Enable PCI Express Complaint System Design for Low-Power, Low-Cost Connectivity Applications, Electronic Engineering Journal, 2009 <https://www.eejournal.com/article/20091005_03/>.
Xilinx, Virtex-4 Family Overview, DS112 (ve. 1), Aug. 30, 2010.
Sporull, Todd, et.al., Control and Configuration Software for a Reconfigurable Networking Hardware Platform, 2002 10th Annual Symposium on Field-Programmable Custom Computing Machines, 2002.
Moscola, James, et al., Implementation of a Content-Scanning Module for an Internet Firewall, 2003 11th Annual Symposium on Field-Programmable Custom Computing Machines, 2003.
Lockwood, John W., et al., An Extensible, System-On-ProgrammableChip, Content-Aware Internet Firewall, 2003.
Lockwood, John W., et al., Reprogrammable Network Packet Processing on the Field Programmable Port Extender (FPX), FGPA 2001, Feb. 11-12, 2001.
Lockwood, John W., Network Packet Processing in Reconfigurable Hardware, Reconfigurable Computing: the Theory and Practice of FPGA-Based Computation (Scott Hauck & Andre DeHon eds., 2008).
Attig, Michael & Lockwood, John, SIFT: Snort Instrusion Filter for TCP, IICC Symposium on High Performance Interconnects (Hot Interconnects-13), Aug. 17-19, 2005.
Xilinx, Virtex-II Pro and Virtex-II Pro X Platform FPGAs: Complete Data Sheet, SD (v5.0) Jun. 21, 2011.
Xilinx, Virtex-II Platform FPGA User Guide, UG002 (v2.0) Mar. 23, 2005.
Xilinx, Virtex E1.8 V Field Programmable Gate Arrays, DS022-1 (v2.3) Jul. 17, 2002.
Xilinx, 7 Series FPGAs Configuration: User Guide, UG470 (v1.7) Oct. 22, 2013.
Nielson, Matt, Using a Microprocessor to Configure 7 Series FPGAs via Slave Serial or Slave SelectMap Mode, Xilinx, XAPP583 (v. 10), May 31, 2012.
Lin, Mingjie, The Amorphous FPGA Architecture, FGPA '08, Feb. 24-26, 2008.

\* cited by examiner

CONFIGURABLE LOGIC PLATFORM WITH RECONFIGURABLE PROCESSING CIRCUITRY

CROSS-REFERENCE TO RELATED APPLICATIONS

This application is a continuation of U.S. application Ser. No. 17/859,657 filed Jul. 7, 2022 (now U.S. Pat. No. 11,500,682), which is a continuation of U.S. application Ser. No. 17/470,926 filed Sep. 9, 2021 (now U.S. Pat. No. 11,385,934), which is a continuation application of U.S. application Ser. No. 17/463,098 filed Aug. 31, 2021 (now U.S. Pat. No. 11,347,556), which is a continuation application of U.S. application Ser. No. 17/344,636 filed Jun. 10, 2021 (now U.S. Pat. No. 11,188,388), which is a continuation application of U.S. application Ser. No. 17/195,174 filed Mar. 8, 2021 (now U.S. Pat. No. 11,036,556), which is a continuation application of U.S. application Ser. No. 16/434,581 filed Jun. 7, 2019 (now U.S. Pat. No. 10,942,778), which is a continuation application of U.S. application Ser. No. 15/267,153 filed Sep. 16, 2016 (now U.S. Pat. No. 10,318,353), which is a continuation application of U.S. application Ser. No. 14/318,512 filed Jun. 27, 2014 (now U.S. Pat. No. 9,448,847), which claims the benefit and priority of the following provisional applications:

[1] U.S. Provisional Application No. 61/934,747 filed Feb. 1, 2014; and
[2] U.S. Provisional Application No. 61/869,646 filed Aug. 23, 2013; This application is also related to the following or patented applications:
[3] U.S. Utility application Ser. No. 13/184,028, filed Jul. 15, 2011;
[4] U.S. Utility application Ser. No. 13/270,194, filed Oct. 10, 2011;
[5] U.S. Utility application Ser. No. 13/277,739, filed Nov. 21, 2011;
[6] U.S. Utility application Ser. No. 13/297,455, filed Nov. 16, 2011;
[7] U.S. Utility application Ser. No. 13/684,473, filed Nov. 23, 2012;
[8] U.S. Utility application Ser. No. 13/717,649, filed Dec. 17, 2012;
[9] U.S. Utility application Ser. No. 13/901,566, filed May 24, 2013; and
[10] U.S. Utility application Ser. No. 13/906,159, filed May 30, 2013.

All above identified applications are hereby incorporated by reference in their entireties for all purposes.

BACKGROUND

Technical Field

This invention pertains to the field of information processing, particularly to techniques for managing execution of multiple concurrent, multi-task software programs on parallel processing hardware.

Descriptions of the Related Art

Conventional microprocessor and computer system architectures rely on system software for handling runtime matters relating to sharing processing resources among multiple application programs and their instances, tasks etc., as well as orchestrating the concurrent (parallel and/or pipelined) execution between and within the individual applications sharing the given set of processing resources. However, the system software consumes by itself ever increasing portions of the system processing capacity, as the number of applications, their instances and tasks and the pooled processing resources would grow, as well as the more frequently the optimizations of the dynamic resource management among the applications and their tasks would be needed to be performed, in response to variations in the applications' and their instances' and tasks' processing loads etc. variables of the processing environment. As such, the conventional approaches for supporting dynamic execution of concurrent programs on shared processing capacity pools will not scale well.

This presents significant challenges to the scalability of the networked utility ('cloud') computing model, in particular as there will be a continuously increasing need for greater degrees of concurrent processing also at intra-application levels, in order to enable increasing individual application on-time processing throughput performance, without the automatic speed-up from processor clock rates being available due to the practical physical and economic constraints faced by the semiconductor etc. physical hardware implementation technologies.

To address the challenges per above, there is a need for inventions enabling scalable, multi-application dynamic concurrent execution on parallel processing systems, with high resource utilization efficiency, high application processing on-time throughput performance, as well built-in, architecture-based security and reliability.

SUMMARY

An aspect of the invention provides systems and methods for arranging secure and reliable, concurrent execution of a set of internally parallelized and pipelined software programs on a pool of processing resources shared dynamically among the programs, wherein the dynamic sharing of the resources is based at least in part on i) processing input data loads for instances and tasks of the programs and ii) contractual capacity entitlements of the programs.

An aspect of the invention provides methods and systems for intelligent, destination task defined prioritization of inter-task communications (ITC) for a computer program, for architectural ITC performance isolation among a set of programs executing concurrently on a dynamically shared data processing platform, as well as for prioritizing instances of the program tasks for execution at least in part based on which of the instances have available to them their input data, including ITC data, enabling any given one of such instances to execute at the given time.

An aspect of the invention provides a system for prioritizing instances of a software program for execution. Such a system comprises: 1) a subsystem for determining which of the instances are ready to execute on an array of processing cores, at least in part based on whether a given one of the instances has available to it input data to process, and 2) a subsystem for assigning a subset of the instances for execution on the array of cores based at least in part on the determining. Various embodiments of that system include further features such as features whereby a) the input data is from a data source such that the given instance has assigned a high priority for purposes of receiving data; b) the input data is such data that it enables the given program instance to execute; c) the subset includes cases of none, some as well as all of the instances of said program; d) the instance is: a process, a job, a task, a thread, a method, a function, a procedure or an instance any of the foregoing, or an independent copy of the given program; and/or e) the system is implemented by hardware logic that is able to operate without software involvement.

An aspect of the invention provides a hardware logic implemented method for prioritizing instances of a software program for execution, with such a method involving: classifying instances of the program into the following classes, listed in the order from higher to lower priority for execution, i.e., in their reducing execution priority order: (I) instances indicated as having high priority input data for processing, and (II) any other instances. Various embodiments of that method include further steps and features such as features whereby a) the other instances are further classified into the following sub-classes, listed in their reducing execution priority order: (i) instances indicated as able to execute presently without the high priority input data, and (ii) any remaining instances; b) the high priority input data is data that is from a source where its destination instance, of said program, is expecting high priority input data; c) a given instance of the program comprises tasks, with one of said tasks referred to as a destination task and others as source tasks of the given instance, and for the given instance, a unit of the input data is considered high priority if it is from such one of the source tasks that the destination task has assigned a high priority for inter-task communications to it; d) for any given one of the instances, a step of computing a number of its non-empty source task specific buffers among its input data buffers such that belong to source tasks of the given instance indicated at the time as high priority source tasks for communications to the destination task of the given instance, with this number referred to as an H number for its instance, and wherein, within the class I), the instances are prioritized for execution at least in part according to magnitudes of their H numbers, in descending order such that an instance with a greater H number is prioritized before an instance with lower H number; e) in case of two or more of the instances tied for the greatest H number, such tied instances are prioritized at least in part according to their respective total numbers of non-empty input data buffers, and/or f) at least one of the instances is either a process, a job, a task, a thread, a method, a function, a procedure, or an instance any of the foregoing, or an independent copy of the given program.

An aspect of the invention provides a system for processing a set of computer programs instances, with inter-task communications (ITC) performance isolation among the set of program instances. Such a system comprises: 1) a number of processing stages; and 2) a group of multiplexers connecting ITC data to a given stage among the processing stages, wherein a multiplexer among said group is specific to one given program instance among said set. The system hosts each task of the given program instance at different one of the processing stages, and supports copies of same task software code being located at more than one of the processing stages in parallel. Various embodiments of this system include further features such as a) a feature whereby at least one of processing stages comprises multiple processing cores such as CPU execution units, with, for any of the cores, at any given time, one of the program instances assigned for execution; b) a set of source task specific buffers for buffering data destined for a task of the given program instance located at the given stage, referred to as a destination task, and hardware logic for forming a hardware signal indicating whether sending ITC is presently permitted to a given buffer among the source task specific buffers, with such forming based at least in part on a fill level of the given buffer, and with such a signal being connected to a source task for which the given buffer is specific to; c) a feature providing, for the destination task, a set of source task specific buffers, wherein a given buffer is specific to one of the other tasks of the program instance for buffering ITC from said other task to the destination task; d) feature wherein the destination task provides ITC prioritization information for other tasks of the program instance located at their respective ones of the stages; d) a feature whereby the ITC prioritization information is provided by the destination task via a set of one or more hardware registers, with each register of the set specific to one of the other tasks of the program instance, and with each register configured to store a value specifying a prioritization level of the task that it is specific to, for purposes of ITC communications to the destination task; e) an arbitrator controlling from which source task of the program instance the multiplexer specific to that program instance will read its next ITC data unit for the destination task; and/or f) a feature whereby the arbitrator prioritizes source tasks of the program instance for selection by the multiplexer to read its next ITC data unit based at least in part on at least one of: (i) source task specific ITC prioritization information provided by the destination task, and (ii) source task specific availability information of ITC data for the destination task from the other tasks of the program instance.

Accordingly, aspects of the invention involve application-program instance specific hardware logic resources for secure and reliable ITC among tasks of application program instances hosted at processing stages of a multi-stage parallel processing system. Rather than seeking to inter-connect the individual processing stages or cores of the multi-stage manycore processing system as such, the invented mechanisms efficiently inter-connect the tasks of any given application program instance using the per application program instance specific inter-processing stage ITC hardware logic resources. Due to the ITC being handled with such application program instance specific hardware logic resources, the ITC performance experience by one application instance does not depend on the ITC resource usage (e.g., data volume and inter-task communications intensiveness) of the other applications sharing the given data processing system per the invention. This results in effective inter-application isolation for ITC in a multi-stage parallel processing system shared dynamically among multiple application programs.

An aspect of the invention provides systems and methods for scheduling instances of software programs for execution based at least in part on (1) availability of input data of differing priorities for any given one of the instances and/or (2) availability, on their fast-access memories, of memory contents needed by any given one of the instances to execute.

An aspect of the invention provides systems and methods for optimally allocating and assigning input port capacity to a data processing system among data streams of multiple software programs based at least in part on input data load levels and contractual capacity entitlements of the programs.

An aspect of the invention provides systems and methods for resolution of resource access contentions, for resources including computing, storage and communication resources such as memories, queues, ports or processors. Such methods enable multiple potential user systems for a shared resource, in a coordinated and fair manner, to avoid conflicting resource access decisions, even while multiple user systems are deciding on access to set of shared resources concurrently, including at the same clock cycle.

An aspect of the invention provides systems and methods for load balancing, whereby the load balancer is configured to forward, by its first layer, any packets without destination instance within its destination application specified (referred to as no-instance-specified packets or NIS packets for short) it receives from its network input to such one of the processing systems in the local load balancing group that presently has the highest score for accepting NIS packets for the destination app of the given NIS packet. The load balancers further have destination processing system (i.e., for each given application, instance group) specific submodules, which, for NIS packets forwarded to them by the first layer balancing logic, specify a destination instance among the available, presently inactive instance resources of the destination app of a given NIS packet to which to forward the given NIS packet. In at least some embodiments of the invention, the score for accepting NIS packets for a destination processing system among the load balancing group is based at least in part on the amount of presently inactive instance resources at the given processing system for the destination application of a given NIS packet.

DETAILED DESCRIPTION

Figure 1:
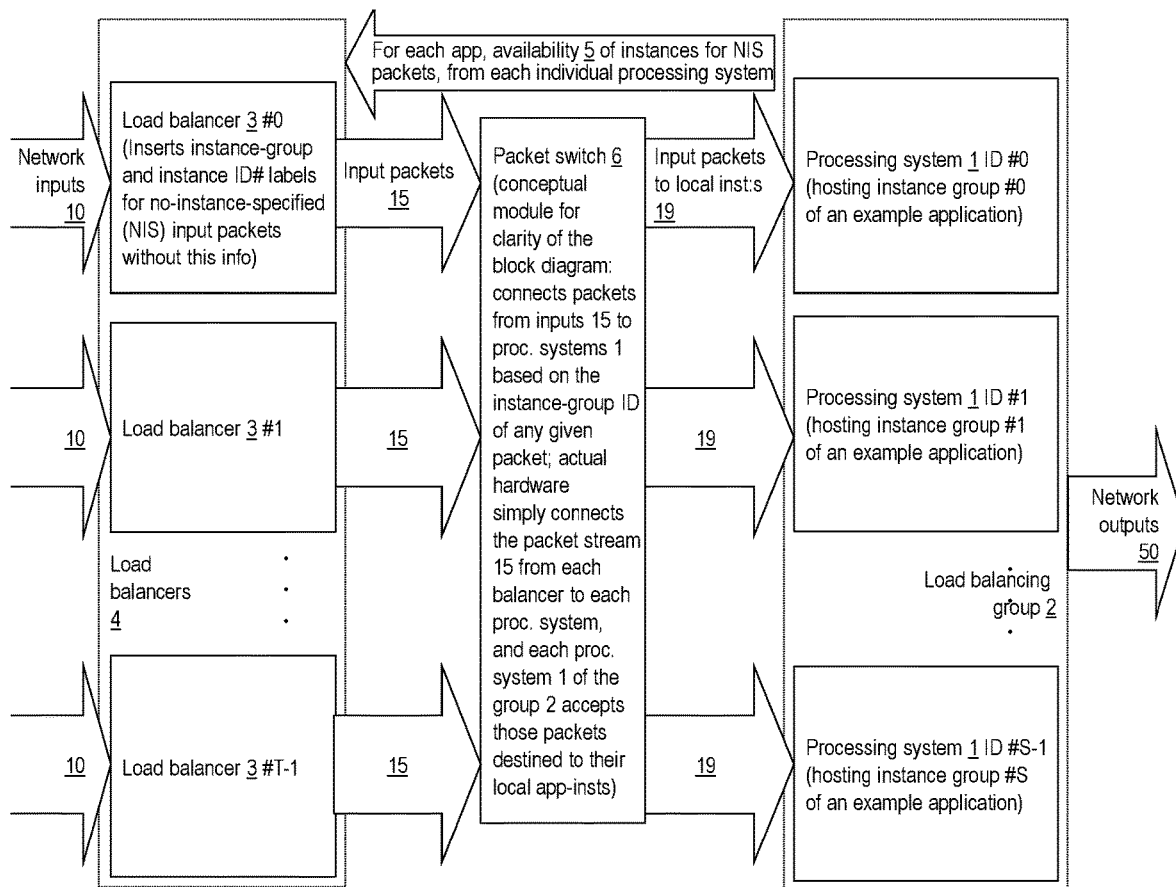
FIG. 1 shows, in accordance with an embodiment of the invention, a functional block diagram for a load balancing architecture for a bank of processor systems, such as those discussed in the following with reference to the remaining FIGS.

FIGS. and related descriptions in the following provide specifications for embodiments and aspects of hardware-logic based systems and methods for inter-task communications (ITC) with destination task defined source task prioritization, for input data availability based prioritization of instances of a given application task for execution on processing cores of a processing stage hosting the given task, for architecture-based application performance isolation for ITC in multi-stage manycore data processing system, as well as for load balancing of incoming processing data units among a group of such processing systems.

The invention is described herein in further detail by illustrating the novel concepts in reference to the drawings. General symbols and notations used in the drawings:

Boxes indicate a functional module comprising digital hardware logic.

Arrows indicate a digital signal flow. A signal flow may comprise one or more parallel bit wires. The direction of an arrow indicates the direction of primary flow of information associated with it with regards to discussion of the system functionality herein, but does not preclude information flow also in the opposite direction.

A dotted line marks a border of a group of drawn elements that form a logical entity with internal hierarchy.

An arrow reaching to a border of a hierarchical module indicate connectivity of the associated information to/from all sub-modules of the hierarchical module.

Lines or arrows crossing in the drawings are decoupled unless otherwise marked.

For clarity of the drawings, generally present signals for typical digital logic operation, such as clock signals, or enable, address and data bit components of write or read access buses, are not shown in the drawings.

General notes regarding this specification (incl. text in the drawings):

For brevity: 'application (program)' is occasionally written in as 'app', 'instance' as 'inst' and 'application-task/instance' as 'app-task/inst' and so forth.

Terms software program, application program, application and program are used interchangeably in this specification, and each generally refers to any type of executable computer program.

Figure 5:
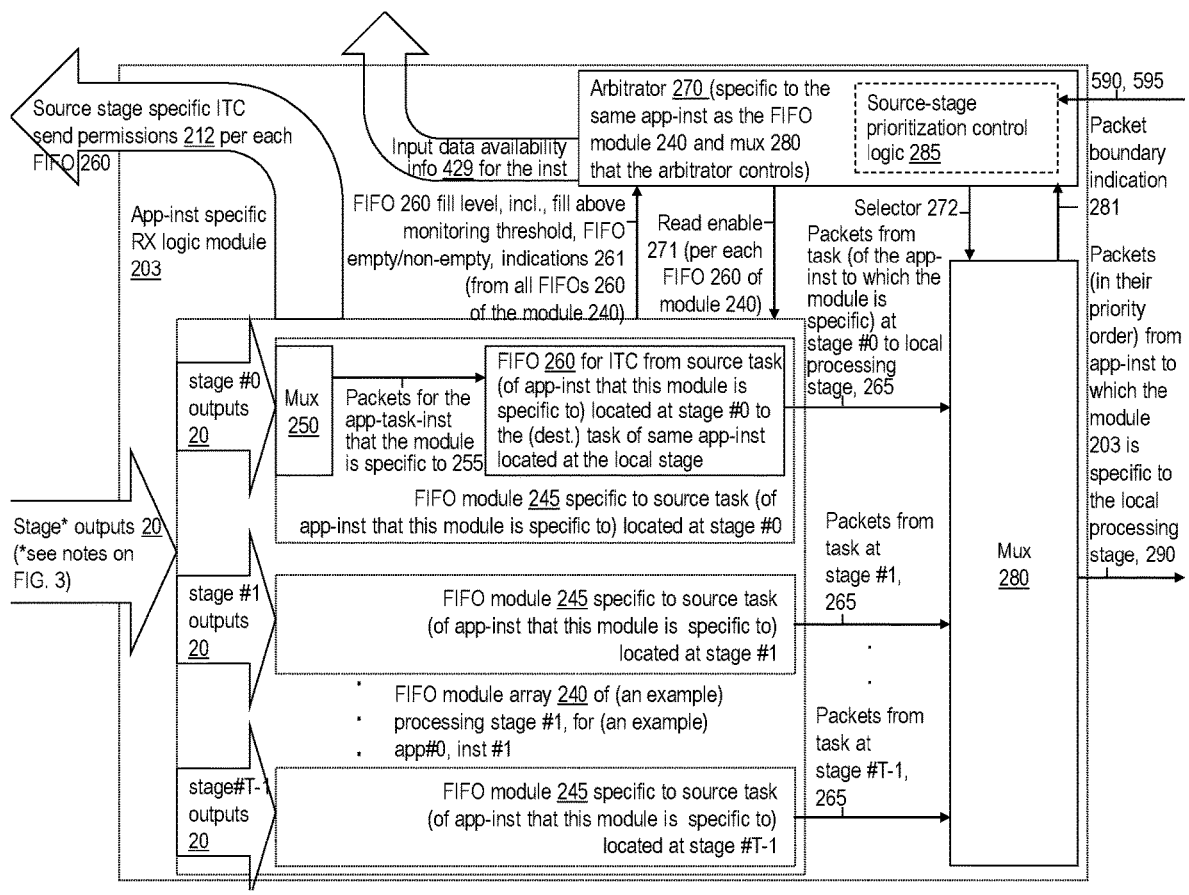
FIG. 5 shows, in accordance with an embodiment of the invention, a functional block diagram for an application program instance specific submodule of the application program specific submodule per FIG. 4.

In FIG. 5, and through the related discussions, the buffers 260 are considered to be First-in First-Out buffers (FIFO); however also other types than first-in first-out buffers can be used in various embodiments.

Illustrative embodiments and aspects of the invention are described in the following with references to the FIGS.

Platform Overview

Figure 8:
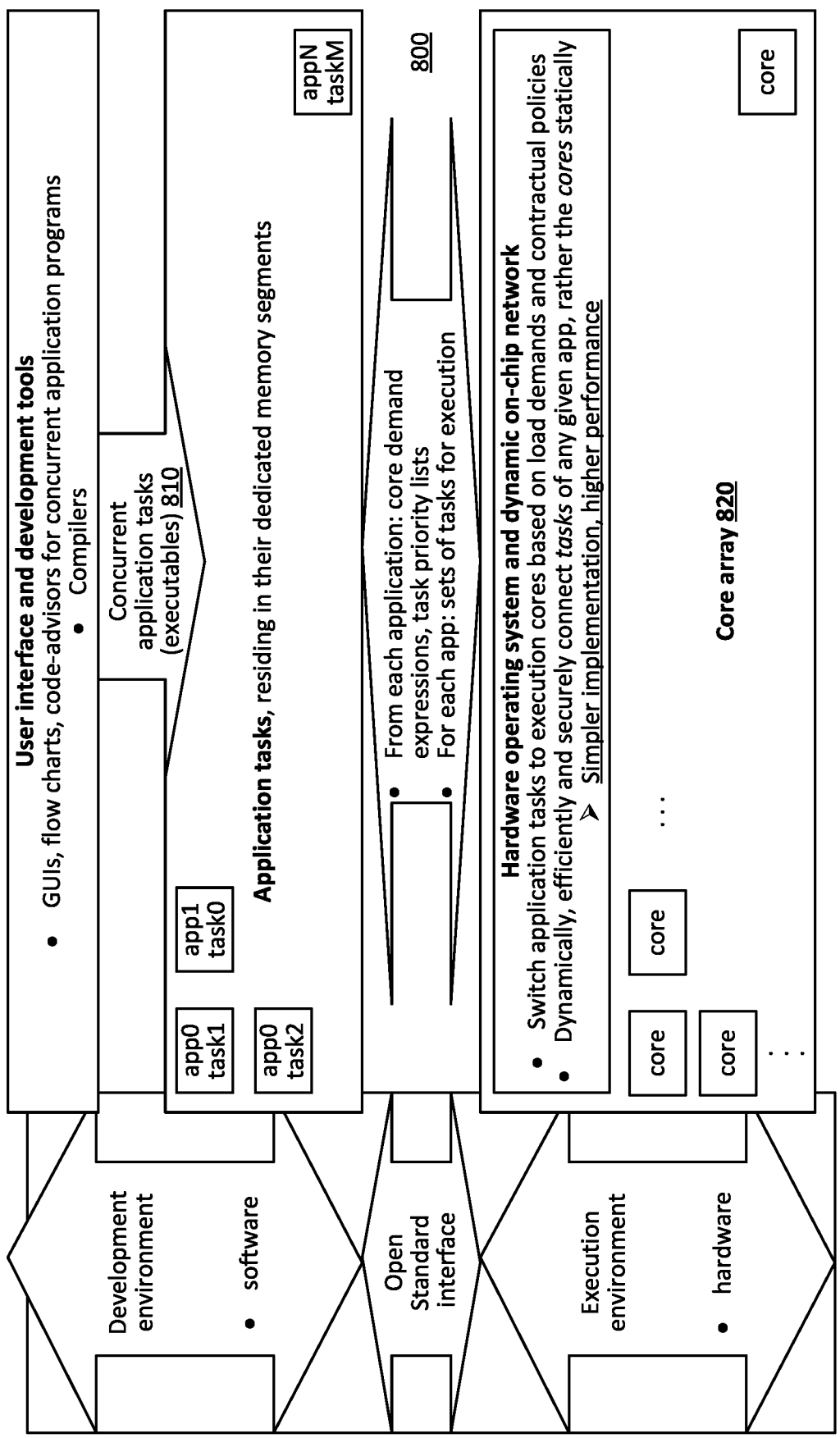
FIG. 8 shows, in accordance with an embodiment of the invention, a platform overview of a multi-application dynamic parallel program execution environment for a parallel program development and execution platform-as-a-service (PaaS).

This embodiment provides a functionality and architecture oriented, end-to-end technical description of the multi-application dynamic parallel program execution environment for a parallel program development and execution platform-as-as-service (PaaS) 800. FIG. 8 depicts a platform overview for PaaS 800.

The parallel program development and execution PaaS 800 enables application software developers and service providers to develop, test and deploy their application programs on the manycore processors per this description with high productivity and cost-efficiency, taking advantage of the dynamic parallel program execution features of the manycore processors as described in the following.

A major productivity and cost-efficiency challenge facing many high-performance application software developers and service providers is the need to keep improving the application program processing throughput performance as it is becoming economically and physically infeasible to increase the processor hardware (CPU) clock rates. Moreover, conventional software development tools, operating systems and manycore processor hardware architectures do not enable the type of dynamic parallelized processing, especially in environments of multi-user shared processors that are becoming the norm in the cloud-computing age, that would be needed to keep cost-efficiently scaling up the application processing throughput.

The PaaS 800 based on the herein described dynamic parallel execution technology addresses this pressing challenge of the application software developers and service providers by offering an end-to-end platform that automates and optimizes the back-end development and execution of the customers' application programs on the manycore processors per this description that are designed for optimized-throughput, dynamic parallel processing of client applications.

Optimizing resource usage dynamically in a large capacity parallel processing system among a large number of applications and their instances and tasks, in pursuing both predictable, high performance for each individual application as well as efficient system resource utilization, does present a complex problem, resolving which would consume plenty of the system's resources if handled in software. It is not trivial to answer the question: To which application task instance should any given processing resource be assigned at any given time, to achieve optimal system-wide application processing throughput?

To address the above challenge, the dynamic parallel execution environment described herein is based on an architecture for extensible, application program load and type adaptive, multi-stage manycore processing systems (FIG. 1). The presented architecture takes the following approach to enable scaling the dynamic resource optimization for increasing numbers (and types) of pooled processing resources and applications and their instances/tasks sharing the pooled resources:

1) The processing resources and program processing is partitioned into (manycore processor based) processing stages, which, per any given application program, can be arranged to support various combinations of pipelined and parallelized processing. This brings the following benefits:

a. The system has to support, per each processing stage, just one task 810 per each of the programs dynamically sharing the system. At each processing stage, there naturally will be a dynamically optimized number of active instances of the locally hosted tasks 810. The resource management for each stage is thus simpler than it would be for the full system, where there are multiple tasks 810 per each app.

b. The resource management is done independently for any given stage, which, besides being simpler due to there being just one task per app, limits the scope of the function, adding to the scalability of the architecture. Note that the dynamic resource optimization at each processing stage of the system, while done independently, is adaptive to the applications' processing load variations (incl. the processing input volumes received by any given stage from the other stages/external network inputs), so that the per-stage distributed dynamic resource management still achieves full system scope resource usage optimization.

2) The processing core resource management at each manycore based processing stage is further partitioned as follows:

a. First, the allocation of the cores (of core array 820 of the local manycore processor) among the applications (i.e., their local tasks at that stage) is optimized periodically, based (in part) on the input processing load variations among the applications.

b. Based on such core allocations, highest priority instances of the local app tasks are assigned for processing on a number of array 820 cores allocated to each given app. To minimize task switching overhead, continuing app-task instances are kept at their existing cores, and activating app-task instances are mapped to cores occupied by de-activating app-task instances—on processors supporting multiple (dynamically reconfigurable) core types, so that the core types demanded by incoming app-task instances match, to the extent possible, the core type of their assigned core slots occupied by outgoing app-task instances.

Figure 2:
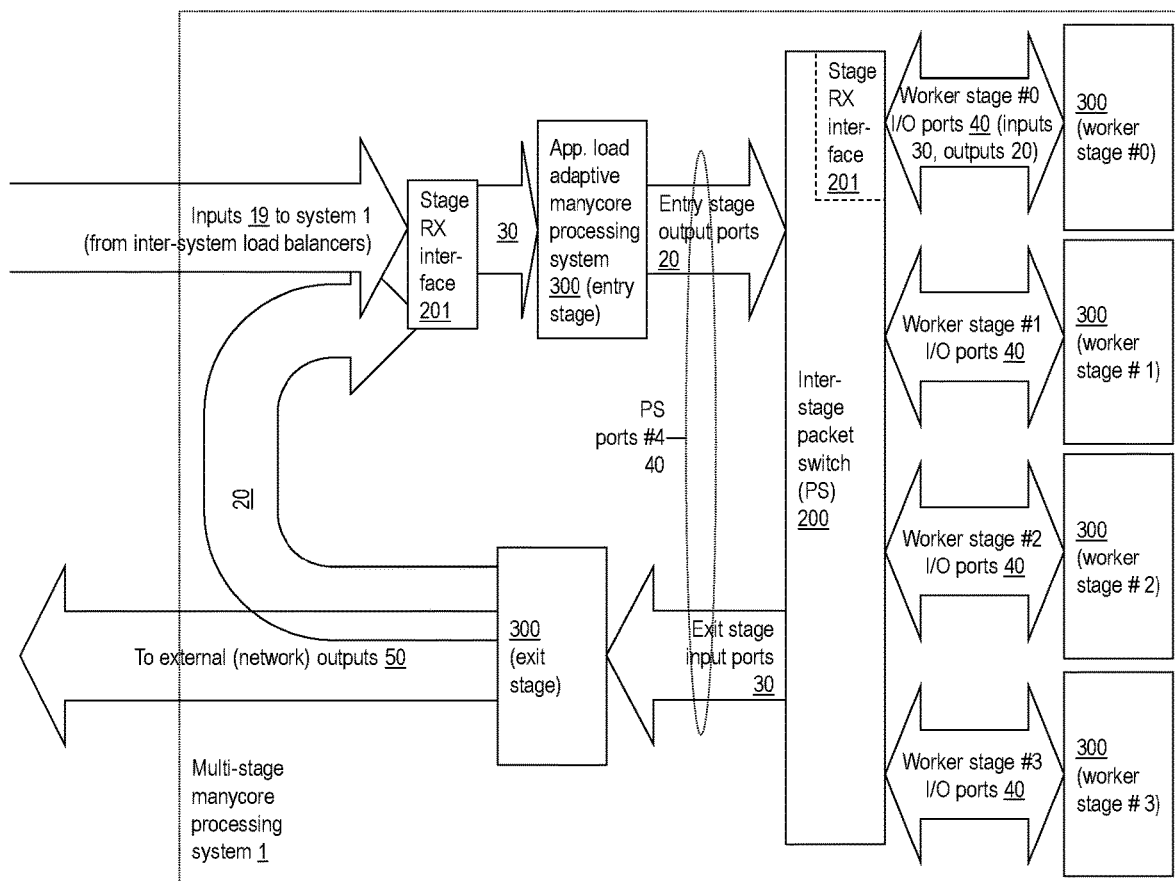
FIG. 2 shows, in accordance with an embodiment of the invention, a functional block diagram for a multi-stage manycore processing system shared dynamically among a set of software program instances, with the system providing capabilities for optimally scheduling inter-task communications (ITC) units between various tasks of any one of the program instances, as well as scheduling and placing instances of a given program task for execution on the processing stages of the system, at least in part based on which of the instances have available for them the input data, e.g., ITC data, needed by them to execute.
Figure 9:
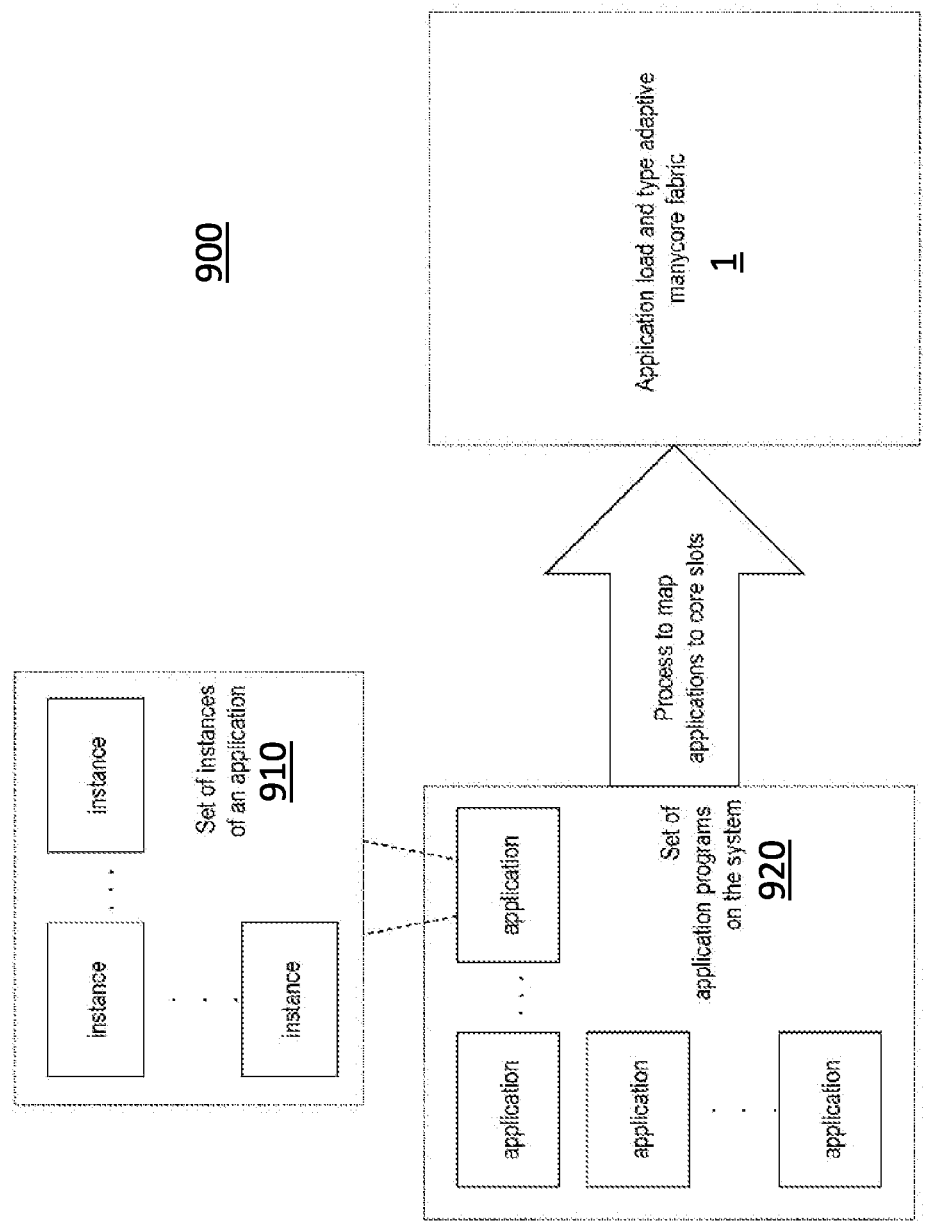
FIG. 9 shows, in accordance with an embodiment of the invention, a process diagram for assigning instances of locally hosted tasks of applications to processing cores at a processing stage in a multi-stage system architecture per FIG. 2.

FIG. 9 shows a process diagram 900 for the allocating and assigning of instances 910 of (locally hosted tasks) of applications 920 to processing cores in a multi-stage system architecture 1 per FIG. 2. Note that, per each app on the system, just one task is hosted at any given processing stage.

By partitioning the system-wide dynamic resource management functionality per above, the individual functions of resource management for dynamically shared manycore arrays become feasible (e.g., in terms of complexities of data structures needed) for direct hardware (e.g., FPGA) implementation. The all-hardware implementation of such system functions further adds to the scalability of the architecture system software overhead reduction. Since the hardware automated system functions do not consume any of the system processor capacity no matter how frequently the capacity is reallocated, and since the hardware algorithms run in just a few clock cycles, as well as since hardware automated task switching for the processor cores is non-visible to software, this architecture also enables re-optimizing the system resource assignment as frequently as useful to accommodate the applications' processing load variations.

The main structures and elements of the architecture, and their operation, are described in the following, following generally the flow of data through the system, starting from the load balancers in front of an array of the multi-stage manycore processors.

System Dimensioning

Sizing cloud processing platforms based on the multi-stage manycore processing systems per this description involves setting a set of parameter values as follows:

A number (S) of the multi-stage manycore processing systems for a load balancing group. The size S of the load balancing group should ideally be equal to, and shall not exceed, the number T of processing stages within any of the processing system, with the pair of entry and exit stages (FIG. 2) counted as one processing stage for this purpose. The reasons that the size of the load balancing group should equal (and shall not exceed) the number (T) of stages in a multi-stage processing system include that the number of source-stage specific input ports to any given processing stage is equal to the number of processing stages in the multi-stage processor per FIG. 2, and that the processing stages of the processing system per FIG. 2 are identical in hardware; the same HDL design is instantiated for each of the processing stages of each processing system, including for cases of entry, worker and exit stages. Thus, also the entry-stage processor of a given multi-stage processing system has T source 'stage'—(in that case, actually load balancer stage) specific input ports, and therefore a processing system can be a forwarding destination for up to T load balancers. Thus, unrestricted connectivity can be supported between up to T load balancers and processing systems in the architecture per FIG. 1.

A number (T>2) of processing stages in the multi-stage processing system. Each multi-stage system will thus support up to T pipelined and/or parallel tasks per each of its apps, wherein any number among the up to T tasks of any given app can be parallel 'workers' of same type. I.e., the term 'stage' shall not be understood to impose a purely T-stage pipelined app processing architecture, though also such processing flow is supported for any given app. In fact, regardless of how great the value of T, the system supports also a plain scatter/gather app processing architecture having a master task (on entry and exit stages) and a parallel collection of T-2 copies of the worker task. Naturally, the multi-stage processing systems support also any pipelined and parallelized app processing flow architectures (for up to T-tasks per a system) in between the mentioned extremes.

A number (X) of processing cores per a processing stage. The system will support up to X apps, and X parallel instances per each one of its apps. The processing stages further have X (e.g., 10 Gbps full duplex) data IO ports, as well as a dedicated external SRAM access interface for each of the supported apps, plus a common (arbitrated) interface to the non-volatile storage.

Load Balancing

FIG. 1 presents the load balancing architecture for a row of processing systems per this description, comprising a set 4 of T load balancers 3 and a load balancing group 2 of S processing systems 1 (T and S are positive integers). Per this architecture, each of the balancers forward any no-instance-specific (NIS) packets (i.e., packets without a specific instance of their destination applications identified) arriving to them via their network inputs to one of the processing systems of the group, based on the NIS packet forwarding preference scores (for the destination app of the given NIS packet) of the individual processing systems of the load balancing group 2.

The load balancing per FIG. 1 for a bank 2 of the processing systems operates as follows:

The processing systems 1 count, for each of the application programs (apps) hosted on them:
  a number X of their presently inactive instance resources, i.e., the number of additional parallel instances of the given app at the given processing system that could be activated at the time; and
  from the above number, the portion Y (if any) of the additional activatable instances within the Core Entitlement (CE) level of the given app, wherein the CE is a number of processing cores at (any one of) the processing stages of the given processing system up to which the app in question is assured to get its requests for processing cores (to be assigned for its active instances) met;
  the difference W=X−Y. The quantities X and/or W and Y, per each of the apps hosted on the load balancing group 2, are signaled 5 from each processing system 1 to the load balancers 4.

In addition, load balancing logic 4 computes the collective sum Z of the Y numbers across all the apps (with this across-apps-sum Z naturally being the same for all apps on a given processing system).

From the above numbers, for each app, the load balancer module 4 counts a no-instance-specified (NIS) packet forwarding preference score (NIS score) for each processing system in the given load balancing group with a formula of: $A*Y+B*W+C*Z$, where A, B and C are software programmable, defaulting to e.g., A=4, B=1 and C=2.

In forming the NIS scores for a given app (by formula per above), a given instance of the app under study is deemed available for NIS packets at times that the app instance software has set an associated device register bit (specific to that app-inst) to an active value, and unavailable otherwise. The multiplexing (muxing) mechanism used to connect the app-instance software, from whichever core at its host manycore processor it may be executing at any given time, to its app-instance specific memory, is used also for connecting the app-instance software to its NIS-availability control device register. These muxing mechanisms are described in the section on task-switching. The NIS availability control registers are located at the muxing modules per FIG. 12 that connect the cores to app-instance memory segments of the manycore processors.

The app-instance NIS availability control register of a given app-instance is reset (when the app-instance software otherwise would still keep its NIS availability control register at its active stage) also automatically by processing stage RX logic hardware whenever there is data at the input buffer for the given app-instance.

Each of the processing systems in the given load balancing group signals their NIS scores for each app hosted on the load balancing group to each of the load balancers 4 in the row 2 of processing systems. Also, the processing systems 1 provide to the load balancers app specific vectors (as part of info flows 9) indicating which of their local instance resources of the given app are available for receiving NIS packets (i.e., packets with no destination instance specified).

Data packets from the network inputs 10 to the load balancing group include bits indicating whether any given packet is a NIS packet such that has its destination app but not any particular instance of the app specified. The load balancer 3 forwards any NIS packet it receives from its network input 10 to the processing system 1 in the local load balancing group 2 with the highest NIS score for the destination app of the given NIS packet. (In case of ties among the processing systems for the NIS score for the given destination app, the logic forwards the packet to the processing system among such tied systems based on their ID #, e.g., to the system with lowest ID #.) The forwarding of a NIS packet to a particular processing system 1 (in the load balancing group 2 of such systems) is done by this first layer of load balancing logic by forming packet write enable vectors where each given bit is a packet write enable bit specific to the processing system within the given load balancing group of the same system index # as the given bit in its write enable bit vector. For example, the processing system ID #2 from a load balancing group of processing systems of ID #0 through ID #4 takes the bit at index 2 of the packet write enable vectors from the load balancers of the given group. In a straightforward scheme, the processing system #K within a given load balancing group hosts the instance group #K of each of the apps hosted by this group of the processing systems (where K=0, 1, . . . , max nr of processing systems in the load balancing group less 1).

The load balancers 3 further have destination processing system 1 (i.e., for each given app, instance group) specific submodules, which, for NIS packets forwarded to them by the first layer balancing logic (per above), specify a destination instance among the available (presently inactive) instance resources of the destination app of a given NIS packet to which to forward the given NIS packet. In a straightforward scheme, for each given NIS packet forwarded to it, this instance group specific load balancing submodule selects, from the at-the-time available instances of the of the destination app, within the instance group that the given submodule is specific to, the instance resource with lowest ID #.

For other (not-NIS) packets, the load balancer logic 3 simply forwards a given (non-NIS) packet to the processing system 1 in the load balancing group 2 that hosts, for the destination app of the given packet, the instance group of the identified destination instance of the packet.

According to the forwarding decision per above bullet points, the (conceptual, actually distributed per the destination processing systems) packet switch module 6 filters packets from the output buses 15 of the load balancers 3 to input buses 19 of the destination processing systems, so that each given processing system 1 in the load balancing group 2 receives as active packet transmissions (marked e.g., by write by write enable signaling) on its input bus 19, from the packets arriving from the load balancer inputs 10, those packets that were indicated as destined to the given system 1 at entry to the load balancers, as well as the NIS packets that the load balancers of the set 4 forwarded to that given system 1.

Note also that the network inputs 10 to the load balancers, as well as all the bold data path arrows in the FIGURES, may comprise a number of parallel of (e.g., 10 Gbps) ports; the I/O data volume for each of the processing systems in a given load balancing group thus presently targets 16×10 Gbps full-duplex raw data, with all applicable overhead bits (data enable, start/end of packet, destination app instance identifiers) carried as parallel bit wires to the (Q-byte wide, where Q is configurable) data, but without any carrier signal or other in-band overhead needed by the processing systems.

The load balancing logic implements coordination among port modules of the same balancer, so that any given NIS packet is forwarded, according to the above destination instance selection logic, to one of such app-instances that is not, at the time of the forwarding decision, already being forwarded a packet (incl. forwarding decisions made at the same clock cycle) by port modules with higher preference rank (e.g., based on lower port #) of the same balancer. Note that each processing system supports receiving packets destined for the same app-instance concurrently from different load balancers (as explained below).

The load balancers 3 support, per each app-inst, a dedicated input buffer per each of the external input ports (within the buses 10) to the load balancing group. The system thus supports multiple packets being received (both via the same load balancer module 3, as well as across the different load balancer modules per FIG. 1) simultaneously for the same app-instances via multiple external input ports. From the load balancer input buffers, data packets are muxed to the processing systems 1 of the load balancing group so that the entry stage processor of each of the multi-stage systems (see FIG. 2) in such group receives data from the load balancers similarly as the non-entry-stage processors receive data from the other processing stages of the given multi-stage processing system—i.e., in a manner that the entry stage (like the other stages) will get data per each of its app-instances at most via one of its input ports per a (virtual) source stage at any given time; the load balancer modules of the given load balancing group (FIG. 1) appear thus as virtual source processing stages to entry stage of the multi-stage processing systems of such load balancing group. The aforesaid functionality is achieved by logic at module 4 as detailed below:

To eliminate packet drops in cases where packets directed to same app-inst arrive in a time-overlapping manner through multiple input ports (within the buses 10) of same balancer 3, destination processing system 1 specific submodules at modules 3 buffer input data 15 destined for the given processing system 1 at app-inst specific buffers, and assign the processing system 1 input ports (within the bus 19 connecting to their associated processing system 1) among the app-insts so that each app-inst is assigned at any given time at most one input port per a load balancer 3. (Note that inputs to a processing system 1 from different load balancers 3 are handled by the entry stage (FIG. 2) the same way as the other processing stages 300 handle inputs from different source stages, as detailed in connection to FIG. 5—in a manner that supports concurrent reception of packets to the same destination app-inst from multiple source stages.) More specifically, the port capacity 19 for transfer of data from load balancers 4 to the given processing system 1 entry-stage buffers gets assigned using the same algorithm as is used for assignment of processing cores between the app-instances at the processing stages (FIG. 7), i.e., in a realtime input data load adaptive manner, while honoring the contractual capacity entitlements and fairness among the apps for actually materialized demands. This algorithm, which allocates at most one of the cores per each of the app-insts for the core allocation periods following each of its runs—and similarly assigns at most one of the ports at buses 19 to the given processing system 1 per each of the app-inst specific buffers queuing data destined for that processing system from any given source load balancer 3—is specified in detail in the section below detailing the algorithm for allocating the cores among the applications. By this logic, the entry stage of the processing system (FIG. 2) will get its input data same way as the other stages, and there thus is no need to prepare for cases of multiple packets to the same app-inst arriving simultaneously at any destination processing stage from any of its source stages or load balancers. This logic also ensures that any app with moderate input bandwidth consumption will gets its contractually entitled share of the processing system input bandwidth (i.e., the logic protects moderate bandwidth apps from more input data intensive neighbors).

Note that since packet transfer within a load balancing group (incl. within the sub-modules of the processing systems) is between app-instance specific buffers, with all the overhead bits (incl. destination app-instance ID) transferred and buffered as parallel wires besides the data, core allocation period (CAP) boundaries will not break the packets while being transferred from the load balancer buffers to a given processing system 1 or between the processing stages of a given multi-stage system 1.

The mechanisms per the above three bullet points are designed to eliminate all packet drops in the system such that are avoidable by system design, i.e., for reasons other than app-instance specific buffer overflows caused be systemic mismatches between input data loads to a given app-inst and the capacity entitlement level subscribed to by the given app.

FIG. 2 provides, according to an embodiment of the invention, a functional block diagram for a multistage manycore processor system 1 shared dynamically between multiple concurrent application programs (apps), with hardware logic implemented capabilities for scheduling tasks of application program instances and prioritizing inter-task communications (ITC) among tasks of a given app instance, based at least in part on, for any given app-inst, at a given time, which tasks are expecting input data from which other tasks and which tasks are ready to execute on cores of the multi-stage manycore processing system, with the ready-to-execute status of a given task being determined at least in part based on whether the given task has available to it the input data from other tasks or system 1 inputs 19 so as to enable it to execute at the given time, including producing its processing outputs, such as ITC communications 20 to other tasks or program processing results etc. communications for external parties via external outputs 50. Operation and internal structure and elements of FIG. 2, according to at least some embodiments of the invention, are described herein.

In the architecture per FIG. 2, the multi-stage manycore processor system 1 is shared dynamically among tasks of multiple application programs (apps) and instances (insts) thereof, with, for each of the apps, each task located at one of the (manycore processor) based processing stages 300. Note however that, for any given app-inst, copies of same task software (i.e., copies of same software code) can be located at more than one of the processing stages 300 of a given system 1; thus the architecture per FIG. 2, with its any-to-any ITC connectivity between the stages 300, supports organizing tasks of a program flexibly for any desirable mixes or matches of pipelined and/or parallelized processing.

General operation of the application load adaptive, multi-stage parallel data processing system per FIG. 2, focusing on the main inputs to outputs data flows, is as follows: The system provides data processing services to be used by external parties (e.g., by clients of the programs hosted on the system) over networks. The system 1 receives data units (e.g., messages, requests, data packets or streams to be processed) from its users through its inputs 19, and transmits the processing results to the relevant parties through its network outputs 50. Naturally the network ports of the system of FIG. 2 can be used also for connecting with other (intermediate) resources and services (e.g., storage, databases etc.) as desired for the system to produce the requested processing results to the relevant external parties.

The application program tasks executing on the entry stage manycore processor are typically of 'master' type for parallelized/pipelined applications, i.e., they manage and distribute the processing workloads for 'worker' type tasks running (in pipelined and/or parallel manner) on the worker stage manycore processing systems (note that the processor system hardware is similar across all instances of the processing stages 300). The instances of master tasks typically do preliminary processing (e.g., message/request classification, data organization) and workflow management based on given input data units (packets), and then typically involve appropriate worker tasks at their worker stage processors to perform the data processing called for by the given input packet, potentially in the context of and in connection with other related input packets and/or other data elements (e.g., in memory or storage resources accessible by the system) referred to by such packets. (The processors have access to system memories through interfaces also additional to the IO ports shown in FIG. 2, e.g., as described in the Memory Access Subsystem section below. Accordingly, the master tasks typically pass on the received data units (using direct connection techniques to allow most of the data volumes being transferred to bypass the actual processor cores) through the (conceptual) inter-stage packet-switch (PS) to the worker stage processors, with the destination application-task instance (and thereby, the destination worker stage) identified for each data unit as described in the following.

To provide isolation among the different applications configured to run on the processors of the system, by default the hardware controller of each processor 300, rather than any application software (executing on a given processor), inserts the application ID # bits for the data packets passed to the PS 200. That way, the tasks of any given application running on the processing stages in a system can trust that the packets they receive from the PS are from its own application. Note that the controller determines, and therefore knows, the application ID # that each given core within its processor is assigned to at any given time, via the application-instance to core mapping info that the controller produces. Therefore the controller is able to insert the presently-assigned app ID # bits for the inter-task data units being sent from the cores of its processing stage over the core-specific output ports to the PS.

While the processing of any given application (server program) at a system per FIG. 2 is normally parallelized and/or pipelined, and involves multiple tasks (many of which tasks and instances thereof can execute concurrently on the manycore arrays of the processing stages 300), the system enables external parties to communicate with any such application hosted on the system without knowledge about any specifics (incl. existence, status, location) of their internal tasks or instances. As such, the incoming data units to the system are expected to identify just their destination application, and when applicable, the application instance. Moreover, the system enables external parties to communicate with any given application hosted on a system through any of the network input ports 10 of any of the load balancers 3, without such external parties knowing whether or at which cores 520 (FIG. 7) or processing stages 300 any instance of the given application task (app-task) may be executing at any time.

Notably, the architecture enables the aforesaid flexibility and efficiency through its hardware logic functionality, so that no system or application software running on the system needs to either keep track of whether or where any of the instances of any of the app-tasks may be executing at any given time, or which port any given inter-task or external communication may have used. Thus the system, while providing a highly dynamic, application workload adaptive usage of the system processing and communications resources, allows the software running on and/or remotely using the system to be designed with a straightforward, abstracted view of the system: the software (both remote and local programs) can assume that all the applications, and all their tasks and instances, hosted on the given system are always executing on their virtual dedicated processor cores within the system. Also, where useful, said virtual dedicated processors can also be considered by software to be time-share slices on a single (unrealistically high speed) processor.

The presented architecture thereby enables achieving, at the same time, both the vital application software development productivity (simple, virtual static view of the actually highly dynamic processing hardware) together with high program runtime performance (scalable concurrent program execution with minimized overhead) and resource efficiency (adaptively optimized resource allocation) benefits. Techniques enabling such benefits of the architecture are described in the following through more detailed technical description of the system 1 and its subsystems.

The any-to-any connectivity among the app-tasks of all the processing stages 300 provided by the PS 200 enables organizing the worker tasks (located at the array of worker stage processors) flexibly to suit the individual demands (e.g., task inter-dependencies) of any given application program on the system: the worker tasks can be arranged to conduct the work flow for the given application using any desired combinations of parallel and pipelined processing. E.g., it is possible to have the same task of a given application located on any number of the worker stages in the architecture per FIG. 2, to provide a desired number of parallel copies of a given task per an individual application instance, i.e., to support also data-parallelism, along with task concurrency.

The set of applications configured to run on the system can have their tasks identified by (intra-app) IDs according to their descending order of relative (time-averaged) workload levels. Under such (intra-app) task ID assignment principle, the sum of the intra-application task IDs, each representing the workload ranking of its tasks within its application, of the app-tasks hosted at any given processing system is equalized by appropriately configuring the tasks of differing ID #s, i.e., of differing workload levels, across the applications for each processing system, to achieve optimal overall load balancing. For instance, in case of T=4 worker stages, if the system is shared among M=4 applications and each of that set of applications has four worker tasks, for each application of that set, the busiest task (i.e., the worker task most often called for or otherwise causing the heaviest processing load among tasks of the app) is given task ID #0, the second busiest task ID #1, the third busiest ID #2, and the fourth ID #3. To balance the processing loads across the applications among the worker stages of the system, the worker stage #t gets task ID #t+m (rolling over at 3 to 0) of the application ID #m (t=0, 1, . . . T−1; m=0, 1, . . . M−1) (note that the master task ID #4 of each app is located at the entry/exit stages). In this example scenario of four application streams, four worker tasks per app as well as four worker stages, the above scheme causes the task IDs of the set of apps to be placed at the processing stages per Table 1 below:

TABLE 1

| App ID# m (to right) Processing worker stage# t (below) | 0 | 1 | 2 | 3 |
|---|---|---|---|---|
| 0 | 0 | 1 | 2 | 3 |
| 1 | 1 | 2 | 3 | 0 |
| 2 | 2 | 3 | 0 | 1 |
| 3 | 3 | 0 | 1 | 2 |

As seen in the example of Table 1, the sum of the task ID #s (with each task ID # representing the workload ranking of its task within its app) is the same for any row i.e., for each worker stage. This load balancing scheme can be straightforwardly applied for differing numbers of processing stages/tasks and applications, so that the overall task processing load is to be, as much as possible, equal across all worker-stage processors of the system. Advantages of such schemes include achieving optimal utilization efficiency of the processing resources and eliminating or at least minimizing the possibility and effects of any of the worker-stage processors forming system-wide performance bottlenecks.

A non-exclusive alternative task to stage placement principle targets grouping tasks from the apps in order to minimize any variety among the processing core types demanded by the set of app-tasks placed on any given individual processing stage; that way, if all app-tasks placed on a given processing stage optimally run on the same processing core type, there is no need for reconfiguring the core slots of the manycore array at the given stage regardless which of the locally hosted app-tasks get assigned to which of its core slots (see the Task-type Adaptive Core Reconfiguration section below for task type adaptive core slot reconfiguration, which may be used when the app-task located on the given processing stage demand different execution core types).

Figure 3:
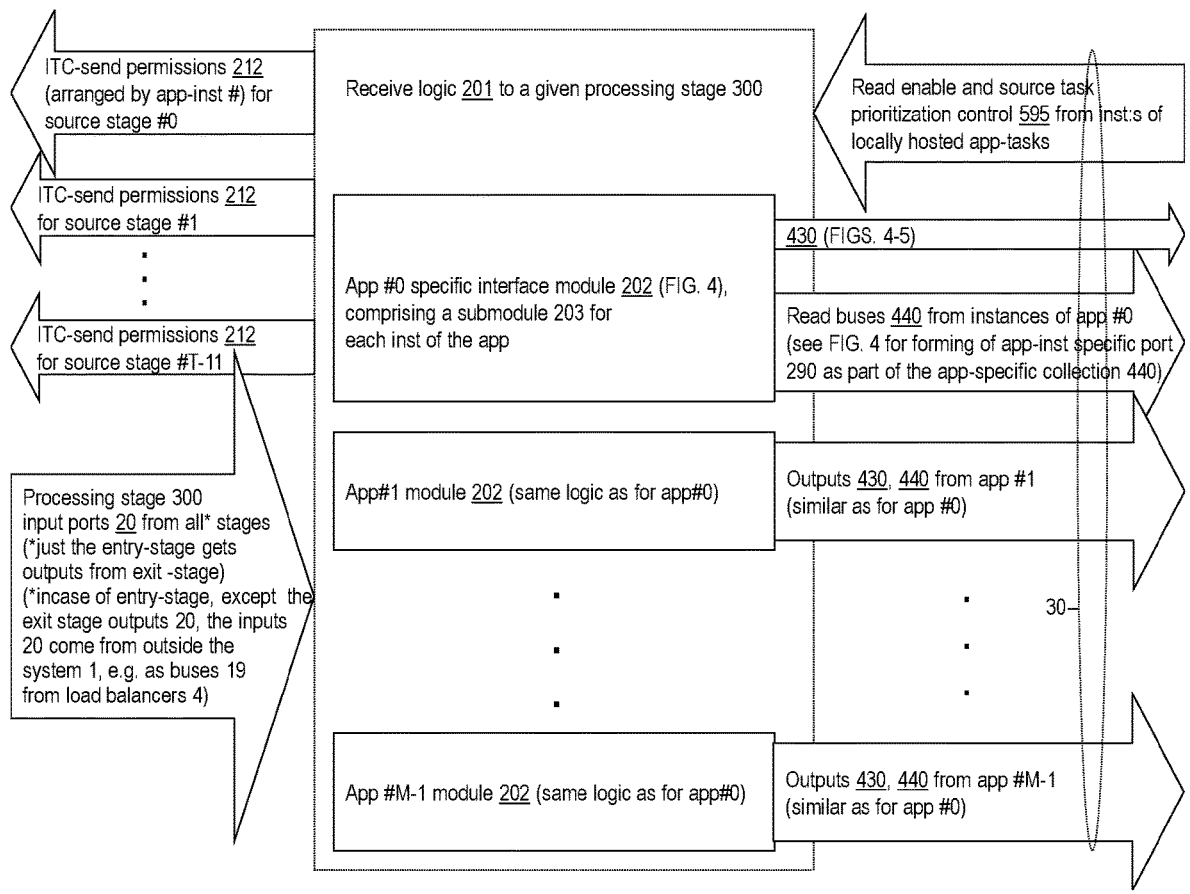
FIG. 3 shows, in accordance with an embodiment of the invention, a functional block diagram for a receive (RX) logic module of any of the processing stages of the multi-stage manycore processor system per FIG. 2.
Figure 4:
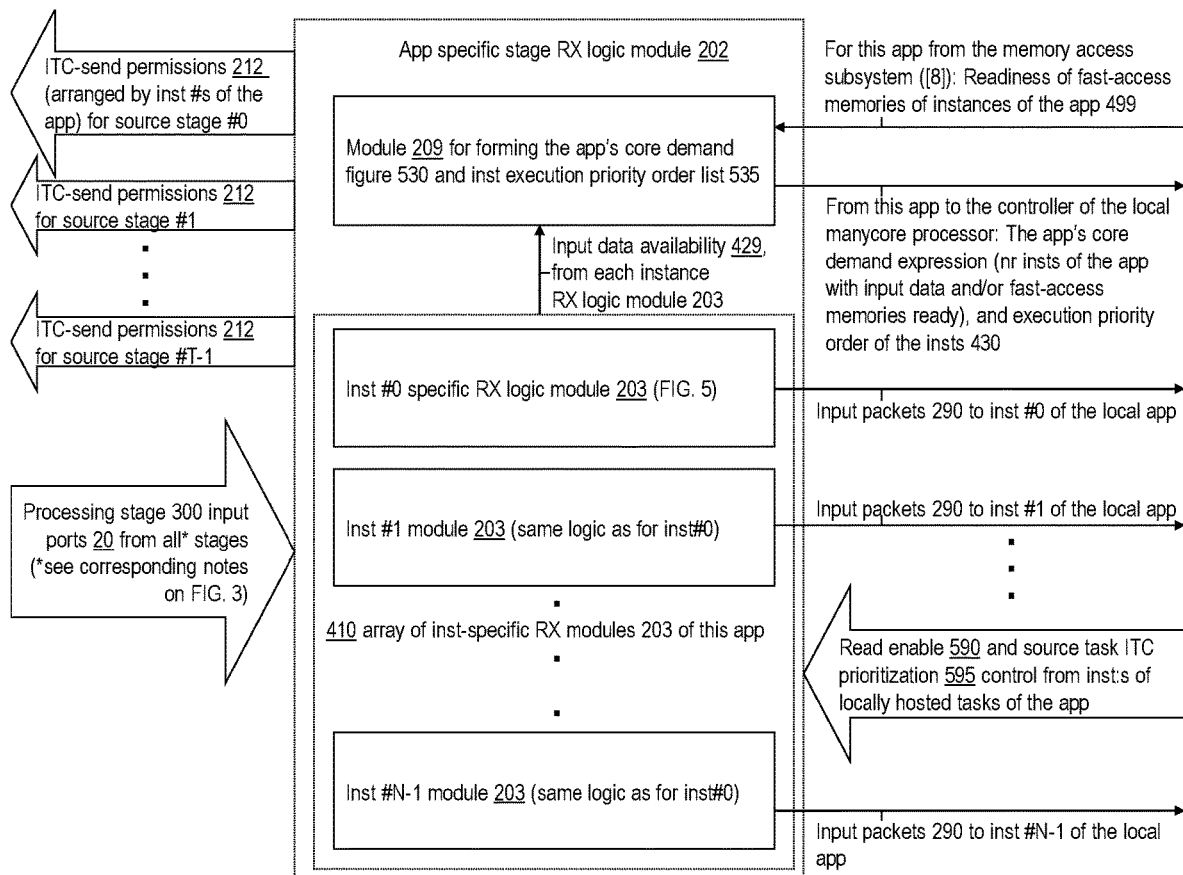
FIG. 4 shows, in accordance with an embodiment of the invention, a functional block diagram for an application program specific submodule of the processing stage RX logic module per FIG. 3.

FIGS. 3-5 present the processing stage, app, app-instance level microarchitectures for the processing stage receive (RX) logic modules 201 (which collectively accomplish the functionality of the conceptual inter-stage packet-switch (PS) module of FIG. 2).

For a system of FIG. 2, note that the functionality of the conceptual inter-stage PS 200 is actually realized by instantiating the logic per FIG. 3 (and its submodules) as the RX logic of each manycore processing system 300 (referred to as a stage) in the multi-stage architecture; there is no need for other logic to the PS. Accordingly, in the hardware implementation, the stage RX logic 201 per FIG. 3-5 is part of the processing stage 300 that it interfaces to; i.e., in an actual hardware implementation, there is no PS module as its functionality is distributed to the individual processing stages.

Besides the division of the app-specific submodules 202 of the stage RX logic per FIG. 3 further to the array 410 of app-instance specific sub-modules 203, FIG. 4 shows how the app-specific RX logic forms, for purposes of optimally assigning the processing cores of the local manycore processor among insts of the apps sharing the system, the following info for the given app:

Formation of a request for a number of processing cores (Core Demand Figure, CDF) at the local processing stage by the given app. The logic forms the CDF for the app based on the number of instances of the app that presently have (1) input data at their input buffers (with those buffers located at the instance specific stage RX logic submodules 203 per FIG. 5) and (2) their on-chip fast-access memory contents ready for the given instance to execute without access to the slower-access off-chip memories. In FIG. 4, (1) and (2) per above are signaled to the app-specific RX logic module 209 via the info flows 429 and 499 from the app-inst specific modules 203 (FIG. 5) and 800 (FIG. 7), respectively, per each of the insts of the app under study.

The priority order of instances of the app for purposes of selecting such instances for execution on the cores of the local manycore processor.

The info per the above two bullet points are sent from the RX logic 202 of each app via the info flow 430 to the controller 540 (FIG. 7) of the local manycore processor 500, for the controller to assign optimal sets of the app-insts for execution on the cores 520 of the processor 500.

The app-instance specific RX logic per FIG. 5 performs multiplexing 280 ITC packets from the source stage, i.e., source task (of a given app-inst) specific First-in First-Out buffers (FIFOs) 260 to the local manycore processor via the input port 290 of that processor dedicated to the given app instance.

Note that when considering the case of RX logic of the entry-stage processing system of the multi-stage architecture per FIG. 2, note that in FIG. 5 and associated descriptions the notion of source stage/task naturally is replaced by the source load balancer, except in case of the ITC 20 from the exit stage to entry-stage, in which case the data source naturally is the exit stage processing system. However, the same actual hardware logic is instantiated for each occurrence of the processing stages 300 (incl. for the RX logic 201 of each stage) in this multi-stage architecture, and thus the operation of the stage RX logic can be fully explained by (as is done in the following) by assuming that the processing stage under study is instantiated as a worker or exit stage processing system, such that receives its input data from the other processing stages of the given multi-stage manycore processor, rather than from the load balancers of the given load balancing group, as in the case of the entry-stage processors; the load balancers appear to the entry-stage as virtual processing stages. Accordingly, when the RX logic of the entry stage manycore processor is considered, the references to 'source stage' are to be understood as actually referring to load balancers, and the references to ITC mean input data 19 to the multi-stage manycore processor system—except in case of the ITC 20 from the exit stage, as detailed above and as illustrated in FIG. 2. With this caveat, the description of the stage RX logic herein is written considering the operating context of worker and exit stage processors (with the same hardware logic being used also for the entry-stage).

Before the actual multiplexer, the app-instance specific RX logic per FIG. 5 has a FIFO module 245 per each of the source stages. The source-stage specific FIFO module comprises:

The actual FIFO 260 for queuing packets from its associated source stage that are destined to the local task of the app-instance that the given module per FIG. 5 is specific to.

A write-side multiplexer 250 (to the above referred FIFO) that (1) takes as its data inputs 20 the processing core specific data outputs 210 (see FIG. 7) from the processing stage that the given source-stage specific FIFO module is specific to, (2) monitors (via the data input overhead bits identifying the app-instance and destination task within it for any given packet transmission) from which one of its input ports 210 (within the bus 20) it may at any given time be receiving a packet destined to the local task of the app-instance that the app-instance specific RX logic under study is specific to, with such an input referred to as the selected input, and (3) connects 255 to its FIFO queue 260 the packet transmission from the present selected input. Note that at any of the processing stages, at any given time, at most one processing core will be assigned for any given app instance. Thus any of the source stage specific FIFO modules 245 of the app-instance RX logic per FIG. 5 can, at any given time, receive data destined to the local task of the app-instance that the given app-instance RX logic module is specific to from at most one of the (processing core specific) data inputs of the write-side multiplexer (mux) 250 of the given FIFO module. Thus there is no need for separate FIFOs per each of the (e.g., 16 core specific) ports of the data inputs 20 at these source stage specific FIFO modules, and instead, just one common FIFO suffices per each given source stage specific buffering module 245.

For clarity, the "local" task refers to the task of the app-instance that is located at the processing stage 300 that the RX logic under study interfaces to, with that processing stage or processor being referred to as the local processing stage or processor. Please recall that per any given app, the individual tasks are located at separate processing stages. Note though that copies of the same task for a given app can be located at multiple processing stages in parallel. Note further that, at any of the processing stages, there can be multiple parallel instances of any given app executing concurrently, as well as that copies of the task can be located in parallel at multiple processing stages of the multi-stage architecture, allowing for processing speed via parallel execution at application as well as task levels, besides between the apps.

The app-instance RX module 203 per FIG. 5 further provides arbitrating logic 270 to decide, at multiplexing packet boundaries 281, from which of the source stage FIFO modules 245 to mux 280 out the next packet to the local manycore processor via the processor data input port 290 specific to the app-instance under study. This muxing process operates as follows:

Each given app-instance software provides a logic vector 595 to the arbitrating logic 270 of its associated app-instance RX module 203 such that has a priority indicator bit within it per each of its individual source stage specific FIFO modules 245: while a bit of such a vector relating to a particular source stage is at its active state (e.g., logic '1'), ITC from the source stage in question to the local task of the app-instance will be considered to be high priority, and otherwise normal priority, by the arbitrator logic in selecting the source stage specific FIFO from where to read the next ITC packet to the local (destination) task of the studied app-instance.

The arbitrator selects the source stage specific FIFO 260 (within the array 240 of the local app-instance RX module 203) for reading 265, 290 the next packet per the following source priority ranking algorithm:

The source priority ranking logic maintains three logic vectors as follows:
1) A bit vector wherein each given bit indicates whether a source stage of the same index as the given bit is both assigned by the local (ITC destination) task of the app-instance under study a high priority for ITC to it and has its FIFO 260 fill level above a configured monitoring threshold;
2) A bit vector wherein each given bit indicates whether a source stage of the same index as the given bit is both assigned a high priority for ITC (to the task of the studied app-instance located at the local processing stage) and has its FIFO non-empty;
3) A bit vector wherein each given bit indicates whether a source stage of the same index as the given bit has its FIFO fill level above the monitoring threshold; and
4) A bit vector wherein each given bit indicates whether a source stage of the same index as the given bit has data available for reading.

The FIFO 260 fill level and data-availability is signaled in FIG. 5 via info flow 261 per each of the source-stage specific FIFO modules 245 of the app-inst specific array 240 to the arbitrator 270 of the app-inst RX module, for the arbitrator, together with its source stage prioritization control logic 285, to select 272 the next packet to read from the optimal source-stage specific FIFO module 245 (as detailed below).

The arbitrator logic 270 also forms (by logic OR) an indicator bit for each of the above vectors 1) through 4) telling whether the vector associated with the given indicator has any bits in its active state. From these indicators, the algorithm searches the first vector, starting from vector 1) and proceeding toward vector 4), that has one or more active bits; the logic keeps searching until such a vector is detected.

From the detected highest priority ranking vector with active bit(s), the algorithm scans bits, starting from the index of the current start-source-stage (and after reaching the max bit index of the vector, continuing from bit index 0), until it finds a bit in an active state (logic '1'); the index of such found active bit is the index of the source stage from which the arbitrator controls its app-instance port mux 280 to read 265 its next ITC packet for the local task of the studied app-instance.

The arbitrator logic uses a revolving (incrementing by one at each run of the algorithm, and returning to 0 from the maximum index) starting source stage number as a starting stage in its search of the next source stage for reading an ITC packet.

When the arbitrator has the appropriate data source (from the array 240) thus selected for reading 265, 290 the next packet, the arbitrator 270 directs 272 the mux 280 to connect the appropriate source-stage specific signal 265 to its output 290, and accordingly activates, when enabled by the read-enable control 590 from the app-inst software, the read enable 271 signal for the FIFO 260 of the presently selected source-stage specific module 245.

Note that the ITC source task prioritization info 595 from the task software of app-instances to their RX logic modules 203 can change dynamically, as the processing state and demands of input data for a given app-instance task evolve over time, and the arbitrator modules 270 (FIG. 5) apply the current state of the source task prioritization info provided to them in selecting from which of the source stages to multiplex 280 out the next ITC packet over the output port 290 of the app-instance RX logic. In an embodiment, the local task of a given app-inst, when a need arises, writes 575, 595 the respective ITC prioritization levels for its source tasks (of the given app-inst) on its source-task specific ITC prioritization hardware registers, which are located at (or their info connected to) source-stage prioritization control logic submodule 285 of the arbitrator 270 of the RX module 203 of that given app-inst. Please see FIG. 7 for the muxing 580 of the input data read control info (incl. source prioritization) from the app-insts executing at the cores of the array to their associated RX modules 203.

In addition, the app-instance RX logic per FIG. 5 participates in the inter-stage ITC flow-control operation as follows:

Each of the source stage specific FIFO modules 245 of a given app-instance at the RX logic for a given processing stage maintains a signal 212 indicating whether the task (of the app instance under study) located at the source stage that the given FIFO 260 is specific to is presently permitted to send ITC to the local (destination) task of the app-instance under study: the logic denies the permit when the FIFO fill level is above a defined threshold, while it otherwise grants the permit.

As a result, any given (source) task, when assigned for execution at a core 520 (FIG. 7) at the processing stage where the given task is located, receives the ITC sending permission signals from each of the other (destination) tasks of its app-instance. Per FIG. 7, these ITC permissions are connected 213 to the processing cores of the (ITC source) stages through multiplexers 600, which, according to the control 560 from the controller 540 at the given (ITC source) processing stage identifying the active app-instance for each execution core 520, connect 213 the incoming ITC permission signals 212 from the other stages of the given multi-stage system 1 to the cores 520 at that stage. For this purpose, the processing stage provides core specific muxes 600, each of which connects to its associated core the incoming ITC send permit signals from the 'remote' (destination) tasks of the app-instance assigned at the time to the given core, i.e., from the tasks of that app-instance located at the other stages of the given processing system. The (destination) task RX logic modules 203 activate the ITC permission signals for times that the source task for which the given permission signal is directed to is permitted to send further ITC data to that destination task of the given app-inst.

Each given processing stage receive and monitor ITC permit signal signals 212 from those of the processing stages that the given stage actually is able to send ITC data to; please see FIG. 2 for ITC connectivity among the processing stages in the herein studied embodiment of the presented architecture.

The ITC permit signal buses 212 will naturally be connected across the multi-stage system 1 between the app-instance specific modules 203 of the RX logic modules 202 of the ITC destination processing stages and the ITC source processing stages (noting that a given stage 300 will be both a source and destination for ITC as illustrated in FIG. 2), though the inter-stage connections of the ITC flow control signals are not shown in FIG. 2. The starting and ending points of the of the signals are shown, in FIG. 5 and FIG. 7 respectively, while the grouping of these ITC flow control signals according to which processing stage the given signal group is directed to, as well as forming of the stage specific signal groups according to the app-instance # that any given ITC flow control signal concerns, are illustrated also in FIGS. 3-4. In connecting these per app-instance ID # arranged, stage specific groups of signals (FIG. 3) to any of the processing stages 300 (FIG. 7), the principle is that, at arrival to the stage that a given set of such groups of signals is directed to, the signals from said groups are re-grouped to form, for each of the app-instances hosted on the system 1, a bit vector where a bit of a given index indicates whether the task of a given app-instance (that the given bit vector is specific to) hosted at this (source) stage under study is permitted at that time to send ITC data to its task located at the stage ID # of that given index. Thus, each given bit in these bit vectors informs whether the studied task of the given app-instance is permitted to send ITC to the task of that app-instance with task ID # equal to the index of the given bit. With the incoming ITC flow control signals thus organized to app-instance specific bit vectors, the above discussed core specific muxes 600 (FIG. 7) are able to connect to any given core 520 of the local manycore array the (task-ID-indexed) ITC flow control bit vector of the app-instance presently assigned for execution at the given core. By monitoring the destination stage (i.e., destination task) specific bits of the ITC permission bit vector thus connected to the present execution core of a task of the studied app-instance located at the ITC (source) processing stage under study (at times that the given app-instance actually is assigned for execution), that ITC source task will be able to know to which of the other tasks of its app-instance sending ITC is permitted at any given time.

Note that, notwithstanding the functional illustration in FIG. 5, in actual hardware implementation, the FIFO fill-above-threshold indications from the source stage specific FIFOs 260 of the app-instance specific submodules of the RX logic modules of the (ITC destination) processing stages of the present multi-stage system are wired directly, though as inverted, as the ITC send permission indication signals to the appropriate muxes 600 of the (ITC source) stages, without going through the arbitrator modules (of the app-instance RX logic modules at the ITC destination stages). Naturally, an ITC permission signal indicating that the destination FIFO for the given ITC flow has its fill level presently above the configured threshold is to be understood by the source task for that ITC flow as a denial of the ITC permission (until that signal would turn to indicate that the fill level of the destination FIFO is below the configured ITC permission activation threshold).

Each source task applies these ITC send permission signals from a given destination task of its app-instance at times that it is about to begin sending a new packet over its (assigned execution core specific) processing stage output port 210 to that given destination task. The ITC destination FIFO 260 monitoring threshold for allowing/disallowing further ITC data to be sent to the given destination task (from the source task that the given FIFO is specific to) is set to a level where the FIFO still has room for at least one ITC packet worth of data bytes, with the size of such ITC packets being configurable for a given system implementation, and the source tasks are to restrict the remaining length of their packet transmissions to destination tasks denying the ITC permissions according to such configured limits.

The app-level RX logic per FIG. 4 arranges the instances of its app for the instance execution priority list 535 (sent via info flow 430) according to their descending order of their priority scores computed for each instance based on their numbers 429 of source stage specific non-empty FIFOs 260 (FIG. 5) as follows. To describe the forming of priority scores, we first define (a non-negative integer) H as the number of non-empty FIFOs of the given instance whose associated source stage was assigned a high ITC priority (by the local task of the given app-instance hosted at the processing stage under study). We also define (a non-negative integer) L as the number of other (non-high ITC priority source task) non-empty FIFOs of the given instance. With H and L thus defined, the intra-app execution priority score P for a given instance specific module (of the present app under study) is formed with equations as follows, with different embodiments having differing coefficients for the factors H, L and the number of tasks for the app, T:

for H>0, P=T−1+2H+L; and for H=0, P=L.

The logic for prioritizing the instances of the given app for its execution priority list 535, via a continually repeating process, signals (via hardware wires dedicated for the purpose) to the controller 540 of the local manycore processor 500 (FIG. 7) this instance execution priority list using the following format:

The process periodically starts from priority order 0 (i.e., the app's instance with the greatest priority score P), and steps through the remaining priority orders 1 through the maximum supported number of instances for the given application (specifically, for its task located at the processing stage under study) less 1, producing one instance entry per each step on the list that is sent to the controller as such individual entries. Each entry of such a priority list comprises, as its core info, simply the instance ID #(as the priority order of any given instance is known from the number of clock cycles since the bit pulse marking the priority order 0 at the start of a new list). To simplify the logic, also the priority order (i.e., the number of clock cycles since the bit pulse marking the priority order 0) of any given entry on these lists is sent along with the instance ID #.

At the beginning of its core to app-instance assignment process, the controller 540 of the manycore processor uses the most recent set of complete priority order lists 535 received from the application RX modules 202 to determine which (highest priority) instances of each given app to assign for execution for the next core allocation period on that processor.

Per the foregoing, the ITC source prioritization, program instance execution prioritization and ITC flow control techniques provide effective program execution optimization capabilities for each of a set of individual programs configured to dynamically share a given data processing system 1 per this description, without any of the programs impacting or being impacted by in any manner the other programs of such set. Moreover, for ITC capabilities, also the individual instances (e.g., different user sessions) of a given program are fully independent from each other. The herein described techniques and architecture thus provide effective performance and runtime isolation between individual programs among groups of programs running on the dynamically shared parallel computing hardware.

Figure 6:
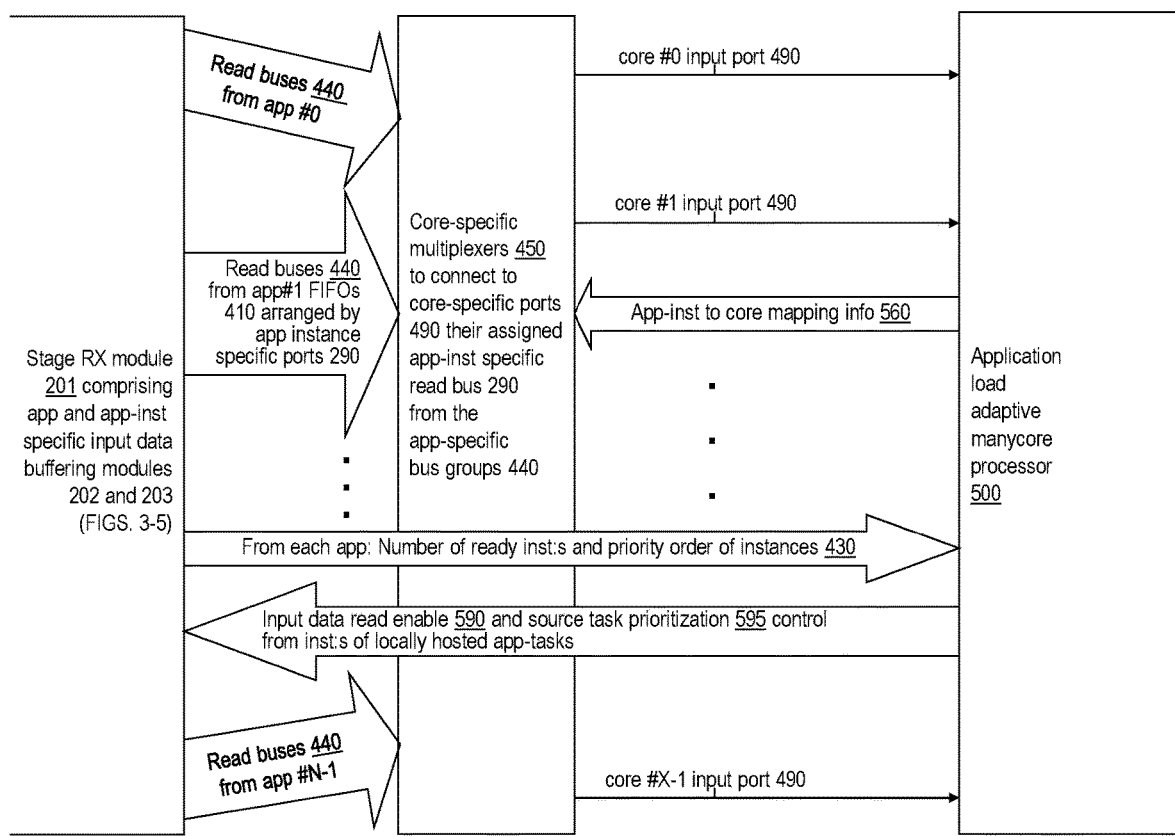
FIG. 6 shows, in accordance with an embodiment of the invention, a functional block diagram for logic resources within one of the processing stages of a system 1 per FIG. 2 for connecting ITC data from input buffers of the RX logic (per FIGS. 3-5) to the manycore processor of the local processing stage.
Figure 7:
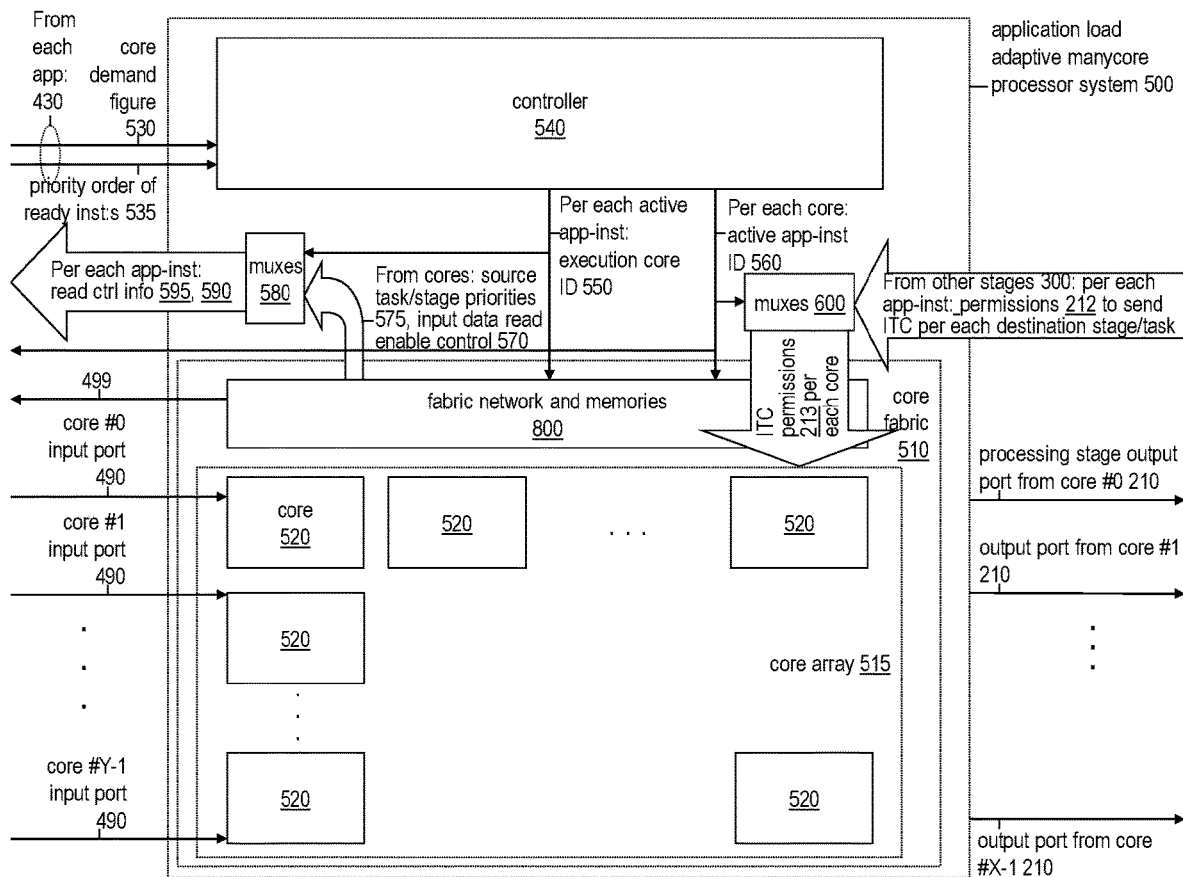
FIG. 7 shows, in accordance with an embodiment of the invention, a functional block diagram for the application load adaptive manycore processor of a processing stage of the multi-stage processing system per preceding FIGS.

From here, we continue by exploring the internal structure and operation of a given processing stage 300 beyond its RX logic per FIGS. 3-5, with references to FIGS. 6 and 7.

Per FIG. 6, any of the processing stages 300 of the multi-stage system 1 per FIG. 2 has, besides the RX logic 201 and the actual manycore processor system (FIG. 7), an input multiplexing subsystem 450, which connects input data packets from any of the app-instance specific input ports 290 to any of the processing cores 520 of the processing stage, according to which app-instance is executing at any of the cores at any given time.

The monitoring of the buffered input data availability 261 at the destination app-instance FIFOs 260 of the processing stage RX logic enables optimizing the allocation of processing core capacity of the local manycore processor among the application tasks hosted on the given processing stage. Since the controller module 540 of the local manycore processor determines which instances of the locally hosted tasks of the apps in the system 1 execute at which of the cores of the local manycore array 515, the controller is able to provide the dynamic control 560 for the muxes 450 per FIG. 6 to connect the appropriate app-instance specific input data port 290 from the stage RX logic to each of the core specific input data ports 490 of the manycore array of the local processor.

Figure 10:
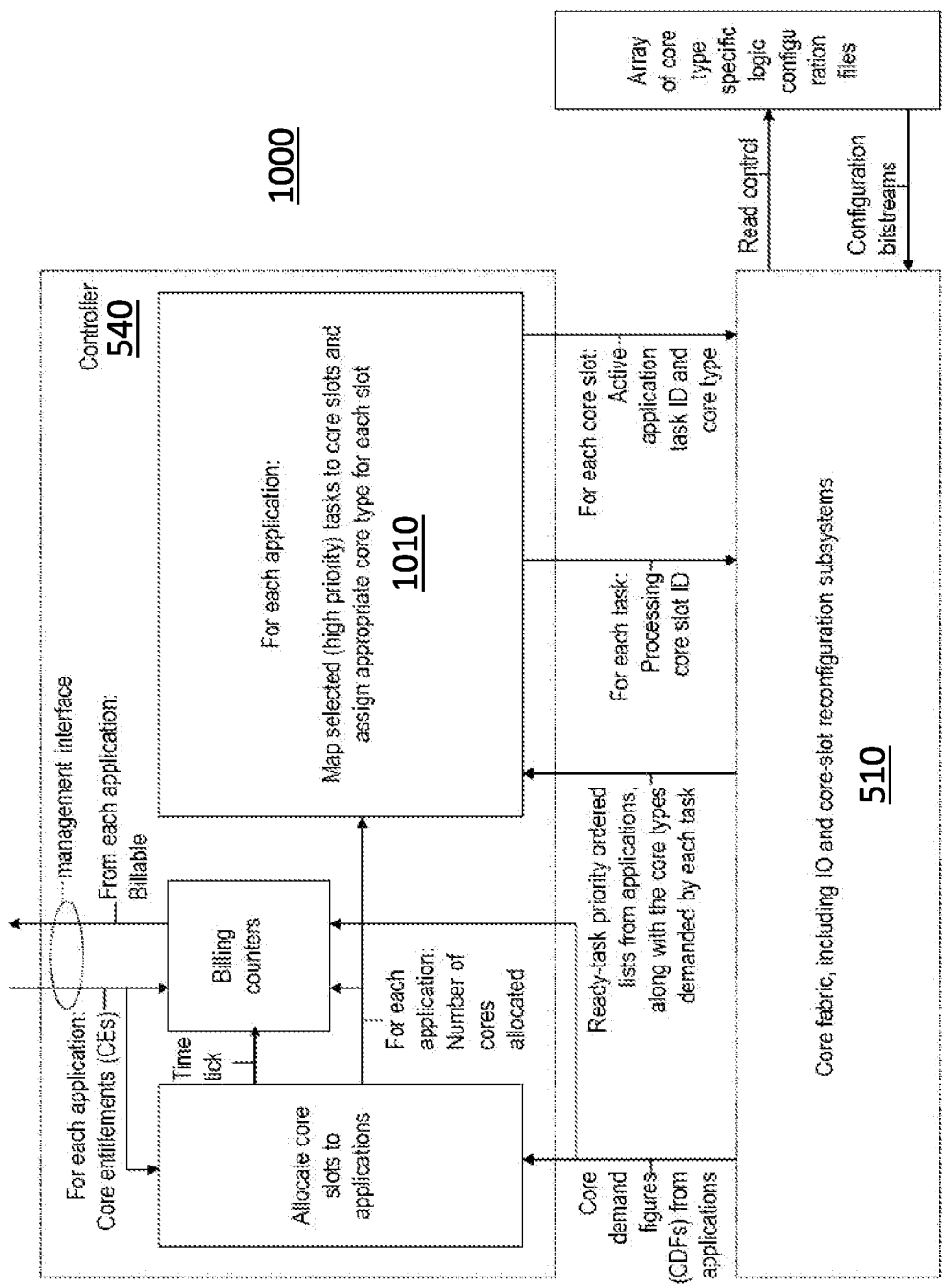
FIG. 10 shows, in accordance with an embodiment of the invention, a functional block diagram for a manycore processor with a hardware-automated multi-application parallel processing optimized operating system.

Internal elements and operation of the application load adaptive manycore processor system 500 are illustrated in FIG. 7 and FIG. 10. For the intra processing stage discussion, it shall be recalled that there is no more than one task located per processing stage per each of the apps, though there can be up to X (a positive integer) parallel instances of any given app-task at its local processing stage (having an array 515 of X cores). With one task per application per processing stage 300, the term app-instance in the context of a single processing stage means an instance of an app-task hosted at the given processing stage under study.

FIG. 7 provides a functional block diagram for the manycore processor system dynamically shared among instances of the locally hosted app-tasks, with capabilities for application input data load adaptive allocation of the cores 520 among the applications and for app-inst execution priority based assignment of the cores (per said allocation), as well as for accordingly dynamically reconfigured 550, 560 I/O and memory access by the app-insts.

As illustrated in FIG. 7, the processor system 500 comprises an array 515 of processing cores 520, which are dynamically shared among instances of the locally hosted tasks of the application programs configured to run on the system 1, under the direction 550, 560 of the hardware logic implemented controller 540. Application program specific logic functions at the RX module (FIG. 3-5) signal their associated applications' capacity demand indicators 430 to the controller. Among each of these indicators, the core-demand-figures (CDFs) 530, express how many cores their associated app is presently able utilize for its (ready to execute) instances. Each application's capacity demand expressions 430 for the controller further include a list of its ready instances in an execution priority order 535.

Any of the cores 520 of a processor per FIG. 7 can comprise any types of software program and data processing hardware resources, e.g., central processing units (CPUs), graphics processing units (GPUs), digital signal processors (DSPs) or application specific processors (ASPs) etc., and in programmable logic (FPGA) implementation, the core type for any core slot 520 is furthermore reconfigurable per expressed demands of its assigned app-task, e.g., per the section below titled Task-type Adaptive Core Reconfiguration.

The hardware logic-based controller 540 module within the processor system, through a periodic process, allocates and assigns the cores 520 of the processor among the set of applications and their instances based on the applications' core demand figures (CDFs) 530 as well as their contractual core capacity entitlements (CEs). This application instance to core assignment process is exercised periodically, e.g., at intervals such as once per a defined number (for instance 64, 256 or 1024, or so forth) of processing core clock or instruction cycles. The app-instance to core assignment algorithms of the controller produce, per the app-instances on the processor, identification 550 of their execution cores (if any, at any given time), as well as per the cores of the fabric, identification 560 of their respective app-instances to execute. Moreover, the assignments 550, 560 between app-insts and the cores of the array 515 control the access between the cores 520 of the fabric and the app-inst specific memories at the fabric network and memory subsystem 800 (which can be implemented e.g., per the section below titled Memory Access Subsystem).

The app-instance to core mapping info 560 also directs the muxing 450 of input data from the RX buffers 260 of an appropriate app-instance to each core of the array 515, as well as the muxing 580 of the input data read control signals (570 to 590, and 575 to 595) from the core array to the RX logic submodule (FIG. 5) of the app-instance that is assigned for any given core 520 at any given time.

Similarly, the core to app-inst mapping info 560 also directs the muxing 600 of the (source) app-instance specific ITC permit signals (212 to 213) from the destination processing stages to the cores 520 of the local manycore array, according to which app-instance is presently mapped to which core.

Controller

Control Process

FIG. 10 provides a data flow diagram 1000 for the hardware implemented controller 540 process, which periodically, e.g., once per microsecond, selects app-insts for execution, and places each selected-to-execute app-instance to one of the cores of the local manycore processor.

The app-instance to core mapping process implemented by the controller 540 of the manycore processor (of any given processing stage in the given multi-stage system) is used for maximizing the (value-add of the) application program processing throughput of the manycore fabric 510 shared among a number of software programs. This process, periodically selecting and mapping the to-be-executing instances of the set of app-tasks to the array of processing cores of the local processor, involves the following steps:

1) allocating the array of cores 510 among the set of applications, based on CDFs and contractual entitlements of the applications, to produce for each application a number of cores allocated to it (for the next core allocation period i.e., the time between the current and the next run of the process); and
2) based at least in part on the allocating, for each given application that was allocated one or more cores:
   a) selecting, according to the instance priority list of the given application, the highest priority instances of the application for execution corresponding to the number of cores allocated to the given application, and b) mapping each selected app-instance to one of the available cores of the array 510, to produce,
   i) per each core of the array 510, an identification of the app-instance that the given core was assigned to, and
   ii) per each app-instance selected for execution on the fabric, an identification of its assigned core.

The periodically produced and updated outputs of the controller process will be used for periodically reconfiguring connectivity through the processor input data and read control multiplexers as well as the manycore fabric memory access subsystem.

Hardware Automation of Dynamic Resource Management

To enable rapidly re-optimizing the allocation and assignment of the system processing core capacity among the instances and tasks of the applications sharing the processing system per FIG. 2 according to the realtime processing load variations among the app-task-insts, the dynamic resource management processes are implemented by hardware logic in the manycore processor controller modules per FIG. 10. Similar processes are run (independently) for each of the processing stages of a given multi-stage manycore processor system per FIG. 2. The application processing load adaptive, dynamic core assignment process per FIG. 10 comprises algorithms for core allocation, app-instance selection and mapping, as detailed in the following.

Algorithm for Allocating the Cores Among the Applications

Objectives for the core allocation algorithm include maximizing the processor core utilization (i.e., generally minimizing, and so long as there are ready app-insts, eliminating, core idling), while ensuring that each application gets at least up to its entitled (e.g., a contract-based minimum) share of the processor core capacity whenever it has processing load to utilize such amount of cores. Each application configured for a given manycore processor is specified its entitled quota of the cores, at least up to which number of cores it is to be allocated whenever it is able to execute on such number of cores in parallel. Naturally, the sum of the applications' core entitlements (CEs) is not to exceed the total number of core slots in the given processor. Each application program on the processor gets from each run of the core allocation algorithm:

(1) at least the lesser of its (a) CE and (b) Core Demand Figure (CDF) worth of the cores; plus (2) as much beyond that to match its CDF as is possible without violating either condition (1) for any application on the processor or fairness among apps whose CDF is not fully met; plus (3) the application's fair share of any cores remaining unallocated after conditions (1) and (2) are satisfied for all applications sharing the processor.

This algorithm allocating the cores to application programs runs as follows:

(i) First, any CDFs by all application programs up to their CE of the cores within the array are met. E.g., if a given program #P had its CDF worth zero cores and entitlement for four cores, it will be allocated zero cores by this step (i). As another example, if a given program #Q had its CDF worth five cores and entitlement for one core, it will be allocated one core by this stage of the algorithm. However, to ensure that each app-task will be able at least communicate with other tasks of its application at some defined minimum frequency, the step (i) of the algorithm allocates for each application program, regardless of the CDFs, at least one core once in a specified number (e.g., sixteen) of process runs.

(ii) Following step (i), any processing cores remaining unallocated are allocated, one core per program at a time, among the application programs whose CDF had not been met by the amounts of cores so far allocated to them by preceding iterations of this step (ii) within the given run of the algorithm. For instance, if after step (i) there remained eight unallocated cores and the sum of unmet portions of the program CDFs was six cores, the program #Q, based on the results of step (i) per above, will be allocated four more cores by this step (ii) to match its CDF.

(iii) Following step (ii), any processing cores still remaining unallocated are allocated among the application programs evenly, one core per program at time, until all the cores of the array are allocated among the set of programs. Continuing the example case from steps (i) and (ii) above, this step (iii) will allocate the remaining two cores to certain two of the programs (one for each). Programs with zero existing allocated cores, e.g., program #P from step (i), are prioritized in allocating the remaining cores at the step (iii) stage of the algorithm.

Moreover, the iterations of steps (ii) and (iii) per above are started from a revolving application program ID #s within the set, e.g., so that the application ID # to be served first by these iterations is incremented by one (and returning to 0 after reaching the highest application ID #) for each successive run of the algorithm. Furthermore, the revolving start app ID #s for the steps (ii) and (iii) are kept at offset from each other equal to the number of apps sharing the processor divided by two.

Accordingly, all cores of the array are allocated on each run of the above algorithm according to applications' processing load variations while honoring their contractual entitlements. I.e., the allocating of the array of cores by the algorithm is done in order to minimize the greatest amount of unmet demands for cores (i.e., greatest difference between the CDF and allocated number of cores for any given application) among the set of programs, while ensuring that any given program gets its CDF at least within its CE met on each successive run of the algorithm.

Algorithm for Assigning App-Insts for the Cores

Following the allocation of the array of cores among the applications, for each application on the processor that was allocated one or more cores by the latest run of the core allocation algorithm, the individual ready-to-execute app-insts are selected and mapped to the number of cores allocated to the given application at module 1010 of FIG. 10. One of the selected app-insts is assigned per one core by each run of this algorithm.

The app-instance to core assignment algorithm for each given application begins by keeping any continuing app-insts, i.e., app-insts selected to run on the core array both on the present and the next core allocation period, mapped to their current cores. After that rule is met, any newly selected app-insts for the given application are mapped to available cores. Specifically, assuming that a given application was allocated k (a positive integer) cores beyond those used by its continuing app-insts, k highest priority ready but not-yet-mapped app-insts of the application are mapped to k next available (i.e., not-yet-assigned) cores within the array. In case that any given application had less than k ready but not-yet-mapped app-insts, the highest priority other (e.g., waiting) app-insts are mapped to the remaining available cores among the number of cores allocated to the given application; these other app-insts can thus directly begin executing on their assigned cores once they become ready.

Note further that, when the app-instance to core mapping module 1010 of the controller gets an updated list of selected app-insts for the applications (following a change in either or both of core to application allocations or app-instance priority lists of one or more applications), it will be able to identify from them the following:

I. The set of activating, to-be-mapped, app-insts, i.e., app-insts within lists not mapped to any core by the previous run of the placement algorithm. This set I is produced by taking those app-insts from the updated selected app-instance lists whose 'present assignment core' in the latest app-instance assignment table was indicated as presently not mapped;

II. The set of deactivating app-insts, i.e., app-insts that were included in the previous, but not in the latest, selected app-instance lists. This set II is produced by taking those app-insts from the latest assignment table whose core ID # indicated the app-instance as presently mapped, but that were not included in the updated selected app-instance lists; and III. The set of available cores, i.e., cores which in the latest assignment table were assigned to the set of deactivating app-insts (set II above).

The app-instance to core assignment algorithm uses the above info to map the active app-insts to cores of the array in a manner that keeps the continuing app-insts executing on their present cores, to maximize the utilization of the core array for processing the user applications. Specifically, the placement algorithm maps the individual app-insts within the set I of activating app-insts in their increasing app-instance ID # order for processing at core instances within the set III of available cores in their increasing core ID # order.

Moreover, regarding placement of activating app-insts (set I as discussed above), the assignment algorithm seeks to minimize the amount of core slots for which the activating app-instance demands a different execution core type than the deactivating app-instance did. I.e., the app-instance to core assignment algorithm will, to the extent possible, place activating app-insts to such core slots (within the core array of the local processor) where the deactivating app-instance had the same execution core type. E.g., activating app-instance demanding the DSP type execution core will be placed to the core slots where the deactivating app-insts also had run on DSP type cores. This sub-step in placing the activating app-insts to their target core slots uses as one of its inputs the new and preceding versions of the core slot ID indexed active app-instance ID and core type arrays, to allow matching the activating app-insts and the available core slots according to the core type, in order to minimize the need for core slot reconfigurations. For details on the core slot dynamic reconfiguration, please see the section below titled Task-type Adaptive Core Reconfiguration.

Summary of Process Flow and Information Formats for the App-Instance to Core Mapping Process The production of updated mappings and control signals between the selected-for-execution app-instances and the processing core slots of the manycore array and the controller (of a given processing stage) from the core demand figures (CDFs) and app-instance priority lists of the apps (sharing the given manycore processor), as functionally detailed above, proceeds through the following stages and (intermediate) results.

The logic at the core allocation module 1010 of the controller 540 periodically samples the applications' CDF bits and, based on such samples, forms an application ID-indexed table (per Tbl. 2 below) as a 'snapshot' of the application CDFs as an input for next exercising of the core allocation algorithm (which is the first phase of the app-instance to core slot mapping process of the controller). An example of such format of the information is provided in Tbl. 2 below note however that in the hardware logic implementation, the application ID index, e.g., for range A through P, is represented by a digital number, e.g., in range 0 through 15, and as such, the application ID # serves as the index for the CDF entries of this array, eliminating the need to actually store any representation of the application ID for the app-ID indexed look-up Tbl. 2:

TABLE 2

| App ID Index | CDF value |
|---|---|
| A | 0 |
| B | 12 |
| C | 3 |
| ... | ... |
| P | 1 |

Regarding Tbl. 2 above, note that the values of entries shown naturally are simply examples of possible values of some of the application CDFs, and that the CDF values of the applications can change arbitrarily for each new run of the controller process.

Based on the app ID # indexed CDF array per Tbl. 2 above (and on the CEs of the app:s), the core allocation algorithm produces another similarly formatted app ID indexed table, whose entries at this stage are the number of cores allocated to each application, as shown in Tbl. 3 below:

TABLE 3

| App ID Index | Number of cores allocated |
|---|---|
| A | 0 |
| B | 6 |
| C | 3 |
| ... | ... |
| P | 1 |

Regarding Tbl. 3 above, note again that the values of entries shown are simply examples of possible number of cores allocated to some of the applications after a given run on the core allocation algorithm, as well as that in hardware logic this look-up-table is simply the numbers of cores allocated per application, since the application ID # for any given entry of this array is knowable from the index # of the given entry in the array.

The app-instance selection sub-process, done individually for each app, uses as its inputs the per-application core allocations per Tbl. 3 above, as well as priority ordered lists of ready app-instance IDs of each given app. Each such app specific list has the (descending) app-instance priority level as its index, and, as values stored at each such indexed element, the intra-application scope instance ID #, plus where applicable, an indication of the target core type (e.g., CPU, DSP, GPU or a specified ASP) demanded by the app-inst, per the example of Tbl. 4 below:

TABLE 4

| App-instance priority index # - application internal (lower index value signifies more urgent app-inst) | App-instance ID# | Target core type (e.g., 0 denotes CPU, 1 denotes DSP, 2 denotes GPU, 3 ... 15 denotes an ASP for a particular function, etc.) |
|---|---|---|
| 0 | 0 | 0 |
| 1 | 8 | 2 |
| 2 | 5 | 2 |
| 3 | 14 | 4 |
| ... | ... | |
| 15 | 2 | 1 |

Notes regarding implicit indexing and non-specific examples used for values per Tbl:s 2 and 3 apply also for Tbl. 4.

The input data receive (RX) logic writes per each app the intra-app instance priority list per 4 to controller 540, to be used as an input for the active app-instance selection sub-process, which produces per-app listings of selected app-instances, along with their corresponding target core types where applicable. Based at least on the app specific lists of selected app-instances, the core to app-instance assignment algorithm produces a core ID # indexed array indexed with the app and instance IDs, and provides as its contents the assigned processing core ID (if any) for the app-instance with ID equal to the index of the given entry, per Tbl. 5 below:

TABLE 5

| App ID - MSBs of index | Instance ID (within the application of column to the left) - LSBs of index | Processing core slot ID (value 'Y' here indicates that the given app-instance is not presently selected for execution at any of the cores) |
|---|---|---|
| A | 0 | 0 |
| A | 1 | Y |
| ... | ... | ... |
| A | 15 | 3 |
| B | 0 | 1 |
| B | 1 | Y |
| ... | ... | ... |
| B | 15 | 7 |
| C | 0 | 2 |
| ... | ... | ... |
| P | 0 | 15 |
| ... | ... | ... |
| P | 15 | Y |

Finally, by inverting the roles of index and contents from Tbl. 5, an array expressing to which app-instance ID # each given core of the manycore array got assigned, per Tbl. 6 below, is formed. Specifically, the Tbl. 6 format can be formed by using as its index the contents of Tbl. 5, i.e., the core ID numbers (other than those marked 'Y'), and as its contents the app-instance ID index from Tbl. 5 corresponding to each core ID # along with, where applicable, the core type demanded by the given app-inst, with the core type for any given selected app-instance being denoted as part of the information flow produced from a data array per Tbl. 4. The format for the app-instance to core mapping info, along with demanded core slot type info (noting that in the logic implementation, the app ID # bits are used as such to determine the demanded core type), is illustrated in the example below:

TABLE 6

| Core ID index | Application ID | Instance ID (within the application of column to the left) | Core type (e.g., 0 denotes CPU, 1 denotes DSP, 2 denotes GPU, 3 ... 15 denotes an ASP for a particular function, etc.) |
|---|---|---|---|
| 0 | P | 0 | 0 |
| 1 | B | 0 | 0 |
| 2 | B | 8 | 2 |
| ... | ... | ... | ... |
| 14 | F | 1 | 5 |
| 15 | N | 1 | 1 |

Regarding Tbl:s 5 and 6 above, note that the symbolic application IDs (A through P) used here for clarity will in digital logic implementation map into numeric representations, e.g., in the range from 0 through 15. Also, the notes per Tbl:s 2-4 above regarding the implicit indexing (e.g., core ID for any given app-instance ID entry is given by the index of the given entry, eliminating the need to store the core IDs in this array) apply for the logic implementation of Tbl:s 5 and 6 as well.

By comparing Tbl:s 5 and 6 above, it is seen that the information contents at Tbl. 5 are the same as at Tbl. 6; the difference in purposes between them is that while Tbl. 6 gives for any core slot its active app-instance ID # to process, along with the demanded core type, Tbl. 5 gives for any given app-instance its processing core slot (if any at a given time).

Note further that when the app-instance to core placement module gets an updated list of selected app-instances for one or more applications (following a change in either or both of core to application allocations or app-instance priority lists of one or more applications), it will be able to identify from Tbl:s 5 and 6 the sets I, II and III discussed in the section above titled Algorithm for assigning app-insts for the cores.

Finally, note that the primary purpose of the description of the specific info formats and the associated processing in this subchapter is to give a concrete example of the operation of the controller algorithms. The actual hardware logic implementation differs somewhat from these (illustration purposes info formats) in order to achieve higher efficiency of the logic implementation.

Task-Switching

Figure 11:
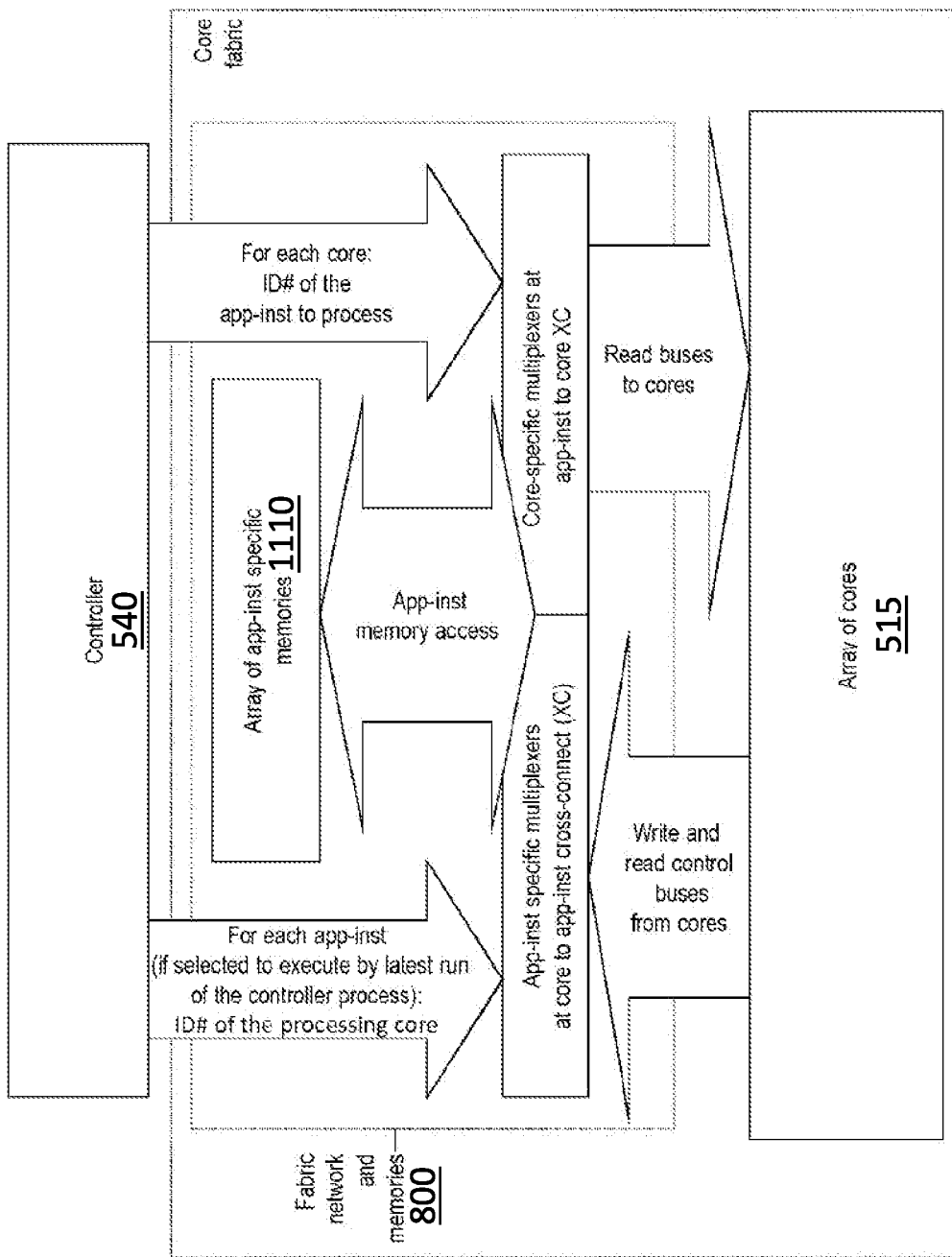
FIG. 11 shows, in accordance with an embodiment of the invention, a representation of dynamically configured connectivity between processing cores and task memories in a manycore processor.
Figure 12:
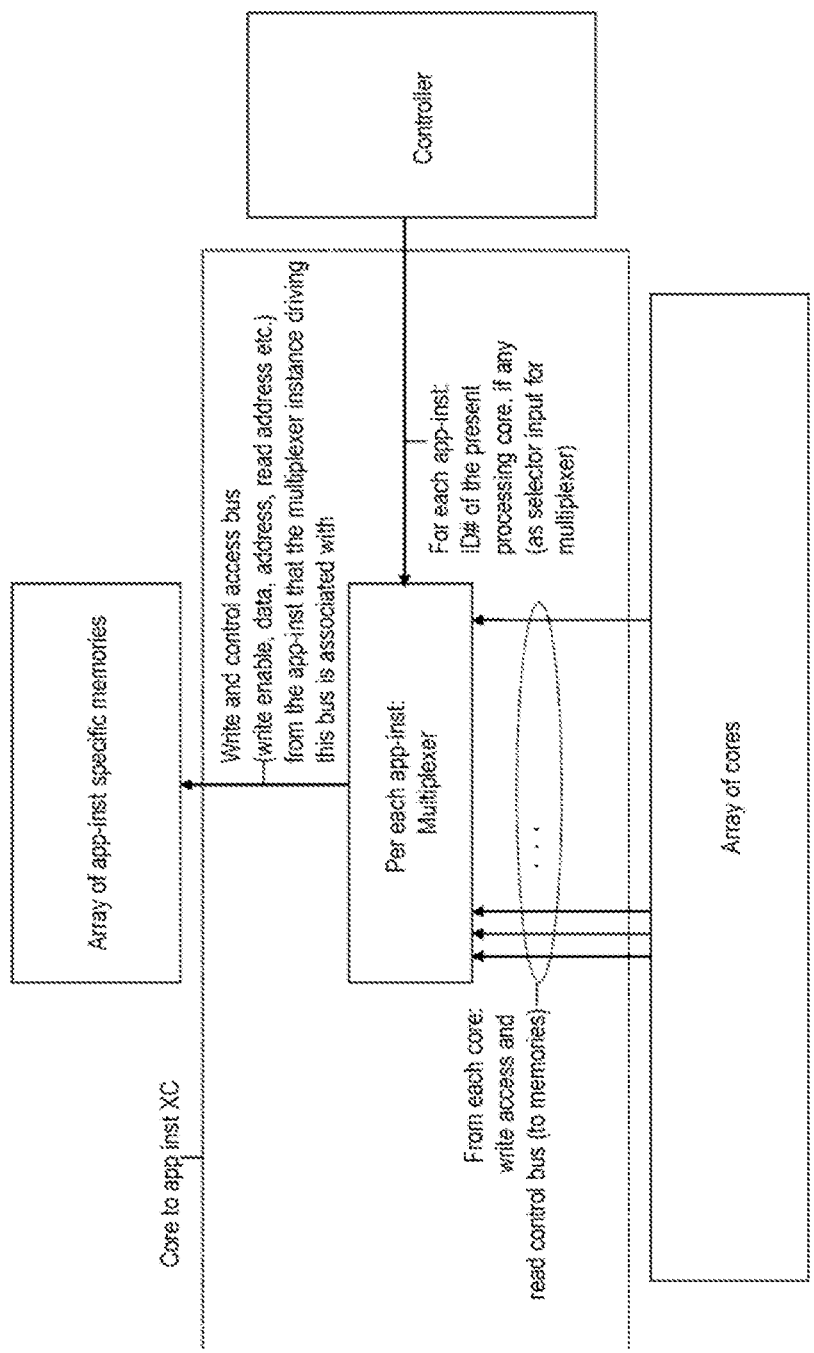
FIG. 12 shows, in accordance with an embodiment of the invention, a representation of dynamically configured write access connectivity between processing cores and app-instance memories in a manycore processor.
Figure 13:
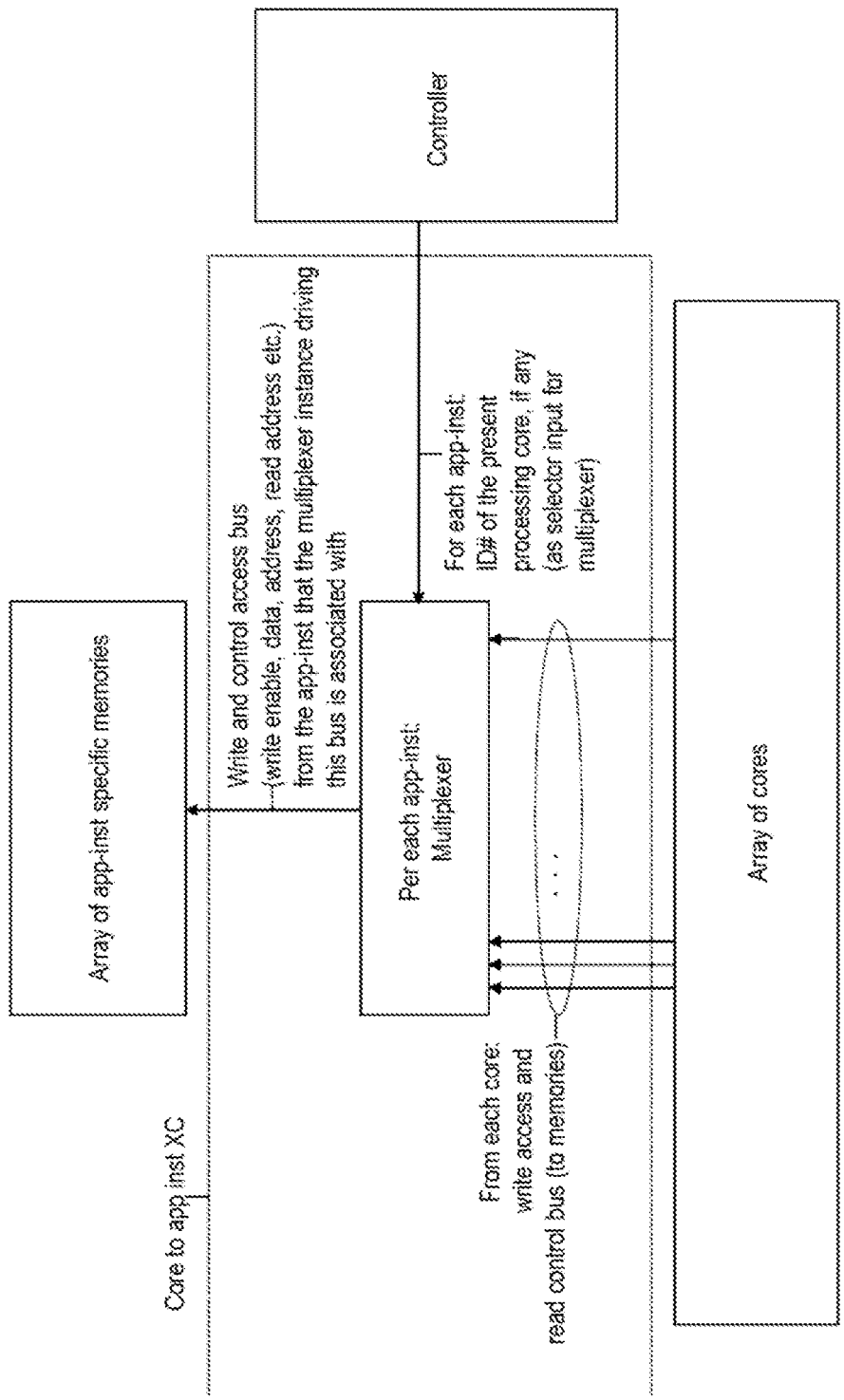
FIG. 13 shows, in accordance with an embodiment of the invention, a representation of dynamically configured read access connectivity between processing cores and app-instance memories in a manycore processor.

FIGS. 11-13 and related specifications below describe the manycore processor on-chip memory access subsystem providing non-blocking processing memory access (incl. for program instructions and interim processing results) between the app-insts dynamically assigned to cores of the array 515 and the app-instance specific memories at the memory array 1110 of the core fabric 800.

The capabilities per FIG. 11 provide logic, wiring, memory, etc., system resource efficient support for executing any app-instance at any core within its host manycore processor at any given time (as determined by the controller of the given processing stage that periodically optimizes the allocation and assignment of cores of the local manycore array among the locally hosted app-instances), while keeping each given app-instance transparently connected to its own (program instruction and interim processing results containing) memory element at memory array.

To direct write and read control access from the array of cores 515 to the array of app-instance specific memories 1110, the controller 540 identifies, for app-instance specific muxes (FIG. 12) at the cross-connect (XC) between the core array and memory array, the presently active source core (if any) for write and read control access to each given app-instance specific segment within the fabric memory array. Similarly, to direct read access by the array of cores to the array of app-instance specific memories, the controller identifies, for core specific muxes (FIG. 12) at the XC, the memory segment of the app-instance presently assigned for each given core of the array.

Based on the control by the controller 540 for a given core indicating that it will be subject to an app-instance switchover, the currently executing app-instance is made to stop executing and its processing state from the core is backed up to the segment of that exiting app-instance at the memory array, while the processing state of the next instance assigned to execute on the given core is retrieved to the core from the memory array. Note that 'processing state' herein refers to processing status data, if any, stored at the core, such as the current executing app-instance-specific processor register file contents. During these app-instance-switching proceedings the operation of the cores subject to instance switchover is controlled through the controller and switchover logic at the cores, with said switchover logic backing up and retrieving the outgoing and incoming app-instance processing states from the memories. Cores not indicated by controller as being subject to instance switchover continue their processing uninterruptedly through the core allocation period transitions.

Note that applying of updated app-instance ID # configurations for the core specific mux:s of the XC (FIG. 13), as well as applying of the updated processing core ID # configurations for the app-instance specific mux:s at the XC, can be safely and efficiently done by the hardware logic without software involvement, since none of the app-insts needs to know whether or at which core itself or any other app-instance is executing within the system at any given time. Instead of relying on knowledge of their respective previous, current (if any at any given time) or future execution cores by either the application or any system software, the architecture enables flexibly running any instances of any app-tasks at any core of their local processing stage.

Memory Access Subsystem
Architecture

Each processing stage of the herein described multi-stage manycore processing system includes a memory access subsystem per FIG. 14 below.

A key benefit of the herein described fast-access memory content optimization and associated task instance scheduling optimizations, as is the case with the rest of the system runtime functionality per this description, is that neither any user or system software running on the processors utilizing these inventive techniques needs to get involved with or even be aware of the these hardware automated routines handling the dynamic optimization of the execution environment for the user programs. This system architecture thus enables scaling the application program capacities and processing performance beyond the limits of conventional systems where the increase in system software overhead would place a limit on scalability.

Figure 14:
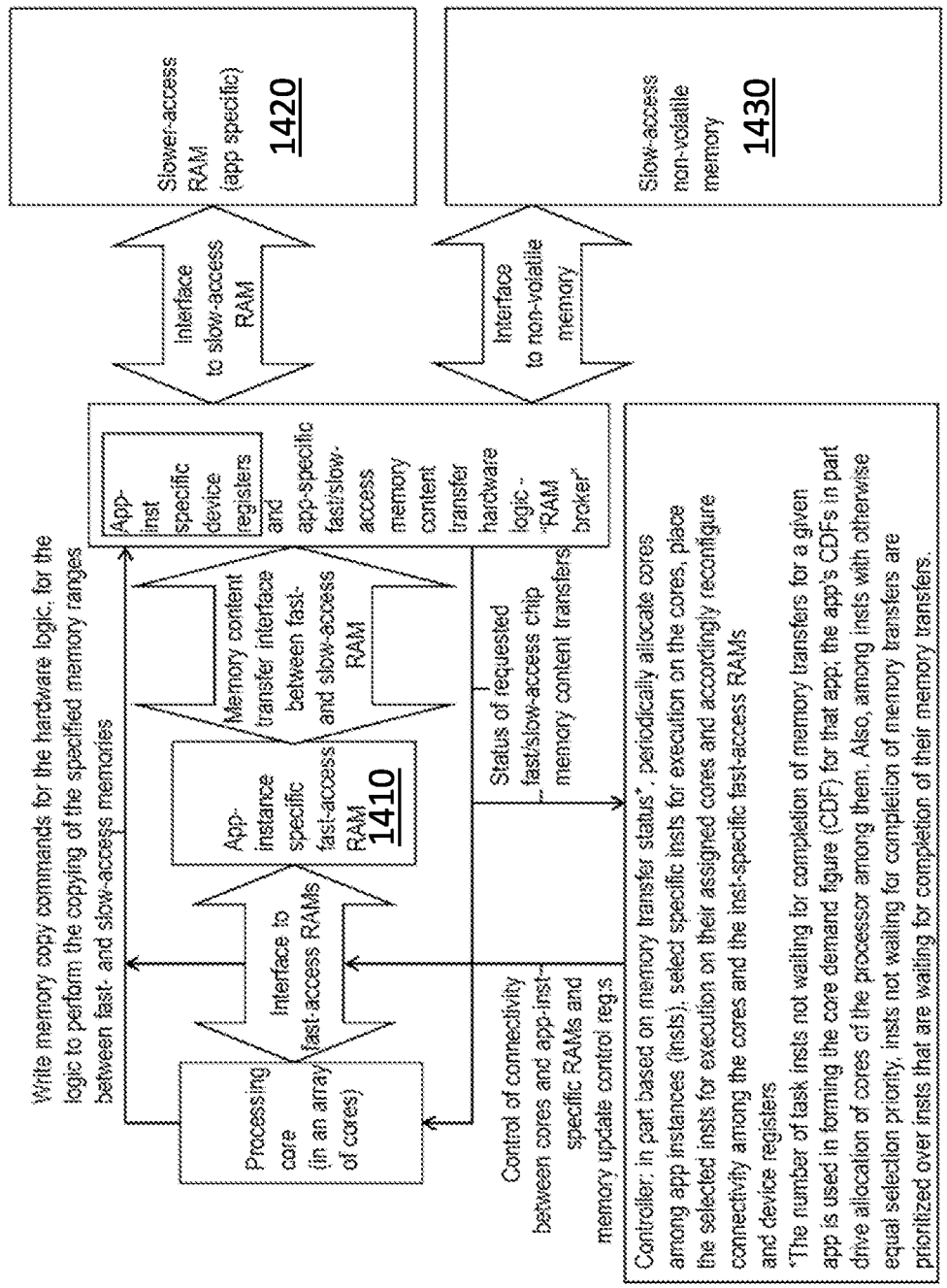
FIG. 14 shows, in accordance with an embodiment of the invention, a memory access subsystem for a processing stage.

Regarding the text in FIG. 14 and the related descriptions herein, note that the terms on-chip and off-chip memories as used herein (incl. reference elements in FIG. 14) are not necessarily in all implementation scenarios on or off chip, respectively. Specifically, going forward, increasing amounts of what is here referred to as slower-access off chip memory can become integrated to the processor chip.

Since the different application instances are isolated from each other in accessing their memories, the operation of the memory access system per FIG. 14 is described in the following mainly from the perspective of a given instance of one of the app-tasks hosted on a given processing stage on the multi-stage manycore processing system per this description.

Updating On-Chip RAMs

The processing stage controller periodically assigns an instance of one of the app-tasks hosted at the local processor for execution on one of the cores within its manycore fabric. The given task instance executing on its assigned core accesses its program instructions and processing data from its dedicated fast-access, e.g., on-chip, random access memory 1410. The task, with the hardware resources per FIG. 14, seeks to keep the instructions segments and the data blocks it uses most frequently on its fast-access RAM 1410 for reduced access latency. However, for cases where the entire volume of instructions and data that the given task needs access to cannot be held on the fast-access RAM 1410, a larger, slower-access, e.g., off-chip, RAM 1420 is provided for storing the entirety of the code and processing data of the task. For context, a possible scenario when it may be more advantageous to have more RAM (fast-access and slow-access combined) per an app-task-instance than what can fit into its fast-access RAM, than to distribute the application processing to a greater number of (e.g., pipelined) 'smaller' tasks whose instructions and processing data would fit into their (similarly sized) fast-access RAMs, can occur in circumstances where the volume of inter-task data transfers would exceed a level beyond which the costs (e.g., data transfer time) of such inter-task communications among such smaller tasks would exceed the costs (e.g., task idle time) of having to reshuffle contents between the fast and slow RAMs of the combined task as the processing context or phase of that 'larger' task changes. I.e., considering the relative costs (e.g., differential energy consumption, completion time of given processing activity, shared system resource usage etc.) of breaking the processing to a greater number of smaller tasks vs. having a smaller number of bigger tasks who (more frequently) need to update their fast-access RAM contents, an optimum break down of a given application processing into concurrently executable tasks can be found, and in at least some scenarios, such an optimum breakdown of application processing can involve both the division of the application into separate tasks as well as the use of both fast-access on-chip and slower-access but higher capacity off-chip RAM for at least some of the tasks, with capabilities, per this system description, for high performance and resource efficient updating of fast-access RAM contents of such tasks.

When a task thus needs access to instructions or data that has to be fetched from the slow-access RAM 1420, the task writes to specified hardware device registers (at defined addresses within the task's memory space) information that is used by the associated hardware logic, referred to as the "RAM broker" in FIG. 14 and in the following, to carry out the demanded memory content transfers between the fast-access RAM 1410 and the slow-access RAM 1420 over their respective interfaces connecting the fast-access RAM 1410, the hardware logic performing the memory content transfers, and the slow-access RAM 1420. Note that the control info from the controller per FIG. 14 is used to dynamically connect a given application task instance software, from whichever execution core that the given software instance may be presently executing at, to its dedicated RAM as well as to its dedicated memory content transfer control device registers. In a typical scenario, the memory content transfer performed by the RAM broker logic involves:

i) copying the contents from a memory range specified by the task software in the fast-access RAM 1410 to another specified memory range in the slow-access RAM 1420 to make room for demanded other instructions and/or data to be fetched from the slow-access RAM 1420, and ii) copying contents from a further-specified memory range in the slow-access RAM 1420 to the specified memory range in the fast-access RAM 1410 of the task instance.

A specification for the task-instance specific hardware device registers (in the RAM broker logic module) writeable and readable by software executing on a core assigned at that time for the given application task instance, controlling the memory transfer operations performed by the RAM broker, is provided in Tbl. 7 below:

TABLE 7

| Register name [address 16-LSB offset in hex] in the processor core address space | Contents of the bits in the register |
| --- | --- |
| Memory content transfer status [1000] | Status, e.g., 1 = active, 0 = completed or never activated; settable by task software, resettable by hardware. Hardware provided estimate of the number of clock cycles until completion of the transfer specified in below registers, expressed as a number data units yet to be transferred, e.g., in units of bytes, words etc, or whatever the amount of data bits that are transferred between memories as specified via below registers per a clock cycle. |
| Command for copying contents from fast-access memory to larger capacity, slower-access memory [1004] | Length (e.g., in bytes, words, etc) of the content block to be copied; value 0 indicates no copying needed in this direction. Start address of the block in the read-from memory. Start address in the write-to memory. |
| Command for copying contents from larger capacity, slower-access memory to fast-access memory [1008] | Same bit fields as above. |

Regarding the example fast/slow-access memory content transfer control and status device registers in Tbl. 7, note that in various scenarios, multiple types of variations of the information formats are possible. For instance, it is possible that the software configuring the commands for copying contents between certain blocks at fast and slow access memories, instead of specifying the actual hardware memory address ranges, uses e.g., enumerated references to memory blocks to be copied, with the hardware providing a look-up table storing the physical memory address ranges corresponding to any given target memory block referred to by the software via such shorthand notations. That way, the software requesting a slow/fast access memory transfer by configuring this device register does not need to know the actual source or destination physical memory addresses of the content block to be transferred.

As illustrated in Tbl. 7, in addition to specifying the memory ranges to be copied between fast- and slow-access RAMs, the app instance software also sets a device register bit indicating, when applicable, that the app instance is waiting for requested memory content transfers to be completed before it can resume executing. While it has that way signaled (through an associated bit to the controller) that it is waiting for updating of its fast-access memory, the app instance software can however back up its state (e.g., processor register file contents) from its present execution core to its dedicated RAM. The RAM broker module resets this memory contents transfer status bit once the specified transfers are completed, and this status bit is provided as a status back to the app instance software (readable by the task from the same device register location to where the task set that bit). This memory content transfer completion status is also provided from the RAM broker to the controller, so that the controller knows which program task instances at any given time are waiting for updating of their fast-access RAM contents before such task instances are able to resume their execution.

Forming and Usage of App Core Demand Figures and Instance Priority Lists Based on App-Instance Fast-Access RAM Status The processing stage controller uses (among any other relevant info, incl. the input data availability as described in previous chapters), these fast-access memory contents ready/not ready status bits from the application task instances hosted on its local processor in deciding which task instances to select for execution on the cores of the local processor at any given time. To minimize core idling, the controller task selection algorithm gives greater selection priority, at least among instances which otherwise would have equal selection priority, to such task instances whose status indicates that the task is not waiting for a completion of fast/slow-access memory content transfers before it can continue its execution.

The controller process uses the fast-access memory ready status indications of the application task instances sharing the array of processing cores as follows:

a) The core demand figure (CDF) for a given application program for the given processor is formed in part based on the number of its local task instances whose fast-access memory is indicated as up-to-date (i.e., not waiting for a completion of a fast/slow-access memory content transfer). As previously described, the CDFs of the application programs sharing the given processor in turn are used by the controller in periodically optimizing the allocation of the cores of the processor among the applications hosted on it, in order to maximize the system-wide value-add of the application processing throughput.

b) Once the controller has run its core to application allocation algorithm, for each given application hosted on the local processor that got allocated at least one core for the following core allocation period (CAP), the logic assigns specific selected task instances for execution on the number of cores allocated to the given application, according to an execution priority order of the instances of the application. The final priority order of the instances of a given application is based in part on the fast-access memory contents ready status indicators of the instances.

Specifically, the execution priority order of the instances of the given application is determined according to their decreasing order of prio_index signals per the below Verilog code (TOP STAGE INDEX equals the count of worker stages in the processing system):

wire prio_index_pre=(high_prio_data_avail)?(TOP STAGE INDEX+nr high_prio stage avail+nr stage avail): nr)stage)avail;

wire prio_index_pre_gtel=(prio_index_pre>0)? prio_index pre: 1;
wire prio_index=(ram_rdy)? prio index pre gtel: 0;

Accordingly, the intra-app instance execution order prioritization is done per the below steps:

i) The instances are first classified into four groups: (1) instances that are fully ready to execute, e.g., they are not waiting for either arrival of input data or completion of memory content transfers to update their fast-access RAM; (2) instances that have input data to be processed but are waiting for completion of memory content transfers between their slow- and fast-access RAMs, (3) instances whose fast-access RAM contents are ready for resuming their execution but who are waiting for input data to process; (4) the rest of the instances.

ii) After the grouping per step i) above, within the group (2), the instances that have their fast-access memory status indicating readiness for execution are prioritized ahead of the instances within that group whose status indicates the instance as waiting for completion of its slow/fast access memory content transfers. Moreover, in implementations where the fast memory readiness status indicates the time (if any) remaining, e.g., in clock cycles, for completion of the requested memory content transfer for its task instance, the instances with the indicated time until completion of the requested memory content transfer greater than the duration of the CAP are moved to the group (4) for the instance prioritization algorithm per above. Furthermore, in such implementations, within the group (2), the instances are prioritized for execution according to their ascending indicated time until completion of their present requested memory content transfers. Otherwise, the instances within each of the groups (1) and (2) are prioritized according to their availability of input data per the description of prioritizing instances of an app for execution. iii) With the intra-group prioritization per step ii) done, the controller selects instances of the application for execution starting from the group (1) and proceeding toward the group (4) as long as there are cores remaining in the number of cores allocated for the given application by the latest run of the core allocation algorithm.

Note that, per FIG. 4, the actual logic for producing the app CDF and instance priority list, based on the readiness of the fast-access memory contents and availability of input data per each instance of the given app, is included at the app-specific RX logic modules for each given processing stage.

The app-task-instance to core assignment algorithms that the controller periodically performs result in the controller providing dynamic configuration for the interface logic between the cores of its local processor and its app-task-instance specific RAMs as well as device registers so that each given core has read and write access to the RAM and the device registers of the app-task-instance assigned presently for execution on the given core, and so that external input and inter-task communication data gets connected dynamically to that core where any given app-task-instance may be executing at any given time.

The control outputs from the controller also include indications for presently executing task instances that were not selected for execution on the next CAP to back up their processing context from their present execution cores to their memories before the assigned tasks are switched for these cores. Note that this minimal interaction between the software and the processor hardware fabric can also be replaced by hardware routines, as follows: When an app-task-instance software is signaled by the controller to exit its present execution core, the software running on it configures a given device register at its present core to launch a hardware routine to automatically copy the state variables (e.g., processor core register file contents) from the core to a specified address range of the RAM associated with the app-task-instance signaled to exit. Moreover, as the exiting app-task-instance's processing state thus gets transferred to the existing app-task-instance's RAM, another hardware routine copies the previously backed up processing state for the next app-task-instance assigned for the given core (e.g., to the core's register file) from the RAM of such incoming app-task-instance.

Access to Off-Chip RAMs

In addition to a dedicated fast-access RAM on the processor for each of its locally hosted application task instances, there is a dedicated slow-access RAM for each application program hosted on the given processor. Such an application-program specific RAM has memory segments within for each of its task instances dynamically executing on that processor. Note that the input and output (IO) pin capacity limits of the processor chip may not allow providing separate slow-access RAMs for each application task instance hosted on the given processor, and that's why the task instances of any given application may have to share the same application-specific slow-access RAM. The RAM broker logic in such implementation scenarios also are specific to a given application program, and for each given application, its specific RAM broker arbitrates the write and read accesses to the slow-access RAM of the application requested by its local task instances.

In such implementations, the RAM broker, in arbitrating access among the memory content transfer requests of the instances of its associated application to the slow-access RAM of that application, uses the a request priority index formed from following criteria in selecting the next memory transfer request to be performed: (1) the time that a given requested memory context transfer has been waiting to be served, with longer elapsed waiting times increasing the priority of the request, (2) the execution priority of the requesting instance as considered without regard to whether any given instance is waiting for completion of its memory content transfer requests, and (3) the indicated length of the requested memory content transfer, with the longer transfers getting reduced priority. With such prioritization and (dynamic) scheduling of the memory transfer requests, the RAM broker can determine the present expected total time until the completion of any given fast/slow-access RAM content transfer requested by an app instance, and accordingly advertise this as the memory content transfer status (as a number of clock cycles until completion of updating the fast-access RAM for a given app instance) to the controller of the local processing stage, for the controller to take as an input in prioritizing and selecting the task instances for execution on the cores under its control for the successive CAPs.

Access to Non-Volatile Memory

Furthermore, besides the slow-access RAM, also a non-volatile media for storing the application programs hosted on a given processor that utilizes the invented memory management techniques. Note that in certain implementation scenarios, what is in FIG. 14 labeled as slow-access RAM 1420, may itself already provide non-volatile storage, i.e., in such scenarios, the functionalities of the memories and per FIG. 14 may be provided by the same memory device (per a given application). However, typically non-volatile memories have longer (write) access latencies than volatile memories (static RAM) and thus in many cases a slow-access SRAM (a volatile memory with greater storage capacity than the fast-access RAM) is used besides a non-volatile backup memory (e.g., flash). In implementation scenarios with a separate non-volatile memory accessible by the RAM brokers of the processor chip, the RAM brokers further provide device registers that the software application programs running on the cores of the processor can configure to command their associated hardware modules to perform copying of contents of specified memory ranges between their non-volatile (e.g., flash) and volatile (e.g., SRAM) slow-access memories. Similar device register bit fields can be used for a given application program to control the memory content transfers between the non-volatile and volatile slow-access memories of the given application as the example in Tbl. 7 regarding the control of content transfers between the fast and slow access RAMs of a given application task instance. In addition, in these implementations with a further non-volatile memory accessible 1430 by the RAM brokers, the device registers per Tbl. 7 format can further include a bit or bits accompanying the start address for the slow-access memory whose values tell the hardware logic performing the memory content transfers whether the slow-access memory to be used as source/target of the transfer is the non-volatile memory or volatile memory of the application. Also, for the device registers controlling memory content transfers between the non-volatile and volatile slow-access memories of a given application program, the program configuring that device register is to also specify, via values it writes in an associated device register bit, whether the RAM broker is to signal to the controller the application instance(s) behind the requested memory content transfer between the slow-access memories as waiting for completion of such a transfer. While the RAM broker will in any case provide a status of completion for the program that issued the request for the memory content transfer between the non-volatile memory and volatile slow-access memory of the program, including optionally the (expected) time remaining until completion, during times of an active memory content transfer between these slow-access memories, the module will report the program (instances) as waiting for completion of such requested memory content transfer, if the program issuing such a request so specified via the associated device register bit.

While there is dedicated fast-access RAM for each supported instance of each application task hosted on a given processor, along with a dedicated slow-access RAM for each application hosted on that processor, there is a common volatile memory for storing the program code and any back up data for all the applications dynamically sharing the given manycore processor. This practice reduces the IO pin count for the processor chip while still providing sufficient memory access performance, since accesses by the applications to their (slowest-access of the three memories discussed) slow-access non-volatile memory will in practice be relatively infrequent, and can in certain cases be limited to mainly application start up periods. In cases of such common non-volatile memory being shared among all the applications running on a given processor, the application specific RAM brokers interact through a per-processor-chip common arbitrator hardware logic module which provides for each application its fair share of interface bandwidth to the common backup memory as well as enforces write and read access rules between the different applications, e.g., by keeping any given application-specific segments of the memory as non-writeable and/or non-readable by the other applications, as well as potentially non-writeable also by the application to whom such memory segments belong to. In a particular implementation scenario, the arbitrator connecting the processor to common backup memory interface simply time-divides the access to the memory among the applications on the processor either evenly or according to contractual entitlements to such interface capacity by the applications. In an alternative implementation, the arbitrator for accessing the memory allows any given application to get as much of its demand for the interface bandwidth (e.g., time share over a specified monitoring period) as is possible without violating any other application's actually-materialized demand for access to its fair or contractually entitled share of the interface capacity. In alternative implementation scenarios still, there is a dedicated non-volatile memory for each application hosted on a given processor, with no need for arbitration among the applications for access to the interfaces.

Inter-App Isolation

Together, the memory architecture and resource access systems and methods per above keep the individual applications among a set of application dynamically sharing a given manycore processor effectively, as desired, isolated from each other's. Such isolation means that, e.g., the resource access levels available for any given application among such set the will not be negatively impacted by the behavior of any of other application among that set, at least compared to a case of static resource allocation among the applications and possibly their tasks and instances. Moreover, the hardware based dynamic resource management techniques per these disclosures do not enable any undesired or unauthorized interaction between the applications sharing the manycore processor systems according to these specifications. However, the applications running on the processors using the described inventive techniques benefit from the cost-efficiencies created by the secure, deterministic, yet dynamically optimized sharing of the processing resources.

Task-Type Adaptive Core Reconfiguration

BACKGROUND

Note: This chapter applies to programmable logic (FPGA) implementations of the manycore array (of a processing stage as otherwise described herein).

The following publications provide 3rd party (FPGA vendor created) material for the description in this chapter:

[X1] Partial Reconfiguration User Guide, a Xilinx, Inc. user document UG702 (v 14.2) Jul. 25, 2012. http://www.xilinx.com/support/documentation/sw_manuals/xilinx14_2/ug702.pdf

[X2] David Dye. Partial Reconfiguration of Xilinx FPGAs Using ISE Design Suite, a Xilinx, Inc. White Paper WP374 (v 1.2), May 30, 2012. http://www.xilinx.com/support/documentation/whitepapers/wp374_Partial_Reconfig_Xi linx_FPGAs.pdf

[X3] Sebastien Lamonnier, Marc Thoris, Marlene Ambielle. Accelerate Partial Reconfiguration with a 100% Hardware Solution, Xcell Journal, Issue 79, Second Quarter 2012: pages 44-49. http://www.xilinx.com/publications/archives/xcell/Xcell79.pdf

[X4] 7 Series FPGAs Configuration User Guide, a Xilinx, Inc. User Guide UG470 (v 1.5) Nov. 5, 2012. http://www.xilinx.com/support/documentation/user_guides/ug470_7Series_Config.pdf

[X5] Partial Reconfiguration Tutorial, PlanAhead Design Tool, a Xilinx, Inc. User Guide UG743 (v 14.1) May 8, 2012. http://www.xilinx.com/support/documentation/sw_manuals/xilinx14_1/PlanAhead_Tutorial_Partial_Reconfiguration.pdf

[X6] Simon Tam, Martin Kellermann. Fast Configuration of PCI Express Technology through Partial Reconfiguration, a Xilinx, Inc. Application Note XAPP883 (v 1.0) Nov. 19, 2010. http://www.xilinx.com/support/documentation/application_notes/xapp883 Fast_Config PCIe.pdf

[A1] Deshanand Singh. Implementing FPGA Design with the OpenCL Standard, an Altera corporation White Paper WP-01173-2.0, November 2012. http://www.altera.com/literature/wp/wp-01173-opencl.pdf The reference [X1] provides user documentation for reconfiguring portions of programmable logic chips. The references [X2], [X3], [X4], [X5] and [X6] discuss implementation techniques for, under the control of user logic, reconfiguring portions (slots) in programmable logic chips, such as the core slots of the herein described manycore array, with identified alternative hardware logic functions, such as the differing processing core types discussed, e.g., Application Specific Processors (ASPS). The reference [A1] discusses techniques translating functions of software programs to custom hardware logic implementations, e.g., ASPS.

More specifically, concerning reconfiguring the logic of parts of programmable logic devices or field programmable gate array microchips (FPGAs), [X2] discusses techniques for how the FPGA logic can control reconfiguring sub-areas of the FPGA, while [X3] details an implementation of an FPGA logic design to control an "Internal Configuration Access Port" (ICAP) of a Xilinx FPGA to reconfigure a particular area of the FPGA with an identified logic configuration bitstream; see in particular pp. 46-47 of the source journal of [X3] referring to the FIGS. 2 and 3 of the article, under its captions "Reconfiguration Process" and "Inside ICAP". [X4] describes interacting with said ICAP (specifically, ICAPE2 in Xilinx Series 7 FPGAs) by user designed logic, including specifying a configuration bitstream (by its start address in a non-volatile memory storing multiple alternative full and/or partial configuration bitstreams) to be used for a (partial) reconfiguration of the FPGA; see, in particular subsections 'IPROG' and 'WBSTAR' on pp. 122-123, and "IPROG Reconfiguration" and "IPROG Using ICAPE2" on pp. 124-125. [X5] provides documentation for creating partial reconfiguration logic programming bit files, while [X6] describes techniques for partial reconfiguration of the logic etc. in a defined sub-area of an FPGA chip, while keeping the functions of the chip not subject to any given partial reconfiguration process unimpacted during such partial reconfigurations. [A1] discusses an OpenCL compiler for translating software (C-language) program functions to hardware that implements each operation of such functions.

Note that these 3rd party technologies however do not enable adapting the types of processing resources in a given resource pool according to the processing load and type demand variations presented by a group of applications configured to dynamically share the given pool of processing resources. The technology as herein described enables accomplishing that goal.

General

The process to adapt the execution core slots of the manycore arrays to match the types of the app tasks assigned for execution on any given core slot are operationally independent from each other, and thus the description of such a process in the following is focused on the reconfiguration of just an (arbitrary) single core slot within the manycore array of any of the processing stages of the given multi-stage manycore processing system (as otherwise described in this description). Moreover, since there is just one task type per any given application located at any given processing stage, any and all instances of any given application present the same task for processing on the core slot under study. Thus for the purposes of the descriptions in this chapter, all instances of the given app assigned for the given core slot under study are identical, and moreover, so are all instances of those applications whose tasks hosted at the given processing stage under study demand the same core type.

Logic Implementation

In the context of FIG. 10, the FIG. 15 below illustrates the logic architecture for reconfiguring a given core slot according to the core type demanded by the app being assigned for execution on it.

Figure 15:
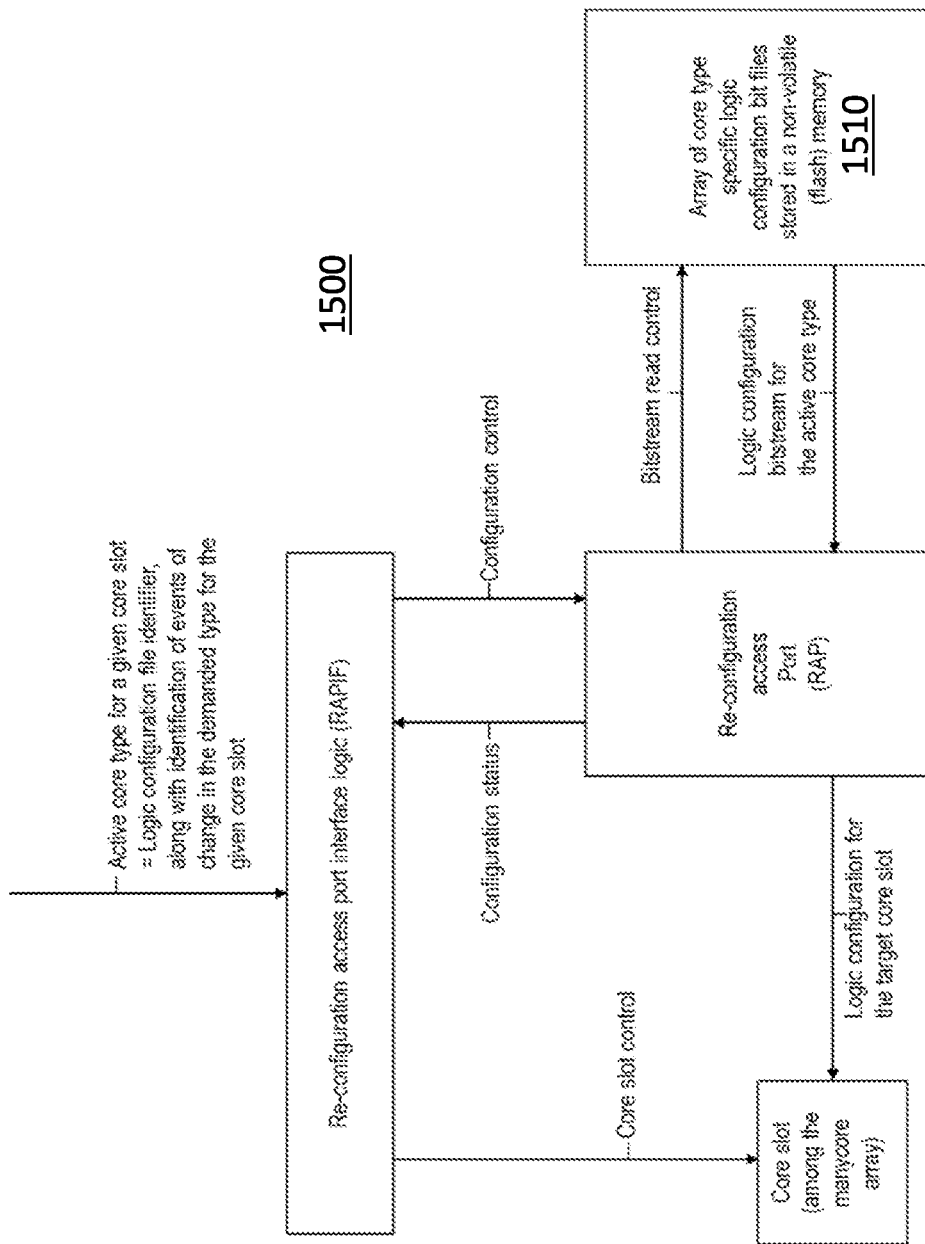
FIG. 15 shows, in accordance with an embodiment of the invention, a functional block diagram of a processing core slot reconfiguration subsystem for a manycore processor.

FIG. 15 shows a functional logic block diagram for a subsystem 1500 for controlling the reconfiguring of a given core slot of the manycore processor (of a processing stage in the herein described multi-stage architecture) to match the type of an application task assigned for the given core slot for the upcoming core allocation period (CAP) or a sequence of CAPs. The core type to match the type of an application task instance (referred to simply as task in this section) assigned to a given core slot is used by the app-instance to core assignment algorithm (of the controller of the local processing stage) to directly identify the demanded core type for the given core slot. Specifically, the ID # of any given application assigned to a given core slot is used directly to select the appropriate configuration file for a target core slot to which the application of the given ID # is assigned for execution.

Per FIG. 15, a non-volatile (e.g., flash) memory 1510 is used to store a set of configuration files for programming the reconfigurable hardware logic for core slots of the manycore fabric (of the local processor) to make a given core slot function as a processor core type associated with a given logic configuration file. The cores slots are on a programmable logic chip, e.g., FPGA microchip supporting reconfiguration of specified logic areas within the chip with identified logic programing files.

In the specific logic system illustrated in FIG. 15, the controller of the local manycore processor identifies, through a re-configuration access port interface logic (RAPIF) within user logic of the FPGA chip (on which the manycore array of a processing stage is implemented), and per a given target core slot subject to a change in the processing core type demanded between its latest and new assigned application, the type of the core to which the hardware logic of given core slot is to be reconfigured. In the logic implementation, RAPIF is notified by the controller of changes in the core type demanded for the given core slot—note that the controller, when assigning an app for a given core slot, is able to directly detect whether that new app demands a different core type than the app presently assigned to the given core slot. The RAPIF module, in turn, after detecting a change in the demanded core type for a particular core slot, identifies for the re-configuration access port (RAP) of the FPGA chip the logic configuration file instance used for reconfiguring the given target core slot, and provides a command for the RAP module to carry out such partial reconfiguration within the FPGA. The RAP interacts with the configuration file memory 1510 to retrieve the demanded configuration file for such target core slot.

Please see the reference [X4], especially pp. 124-125, for details of a particular implementation possibility; in such implementation scenario, the value for Warm Boot Start Address (WBSTAR) register can be used to identify the logic configuration file for the partial reconfiguration demanded to reprogram the hardware logic of a given target core slot to the demanded core type to match the processing application assigned for such target core slot, and the issuing of IPROG command can be used to launch the demanded reconfiguration with the identified partial reconfiguration file. Note that in these implementation scenarios, the individual partial logic reconfiguration files also identify their target core slot; in such scenarios, for each core type, an individual file is needed per each possible target core slot among the array. The RAP further provides for the RAPIF status of the demanded core slot logic reprogramming, including of its completion. Based on the timing of control and status of the configuration access port, the RAPIF provides any applicable control, such as reset, for the core slot instance subject to the reconfiguration. Such control provided during the reconfiguration of a given core slot prevents unintended interactions between that core slot and the rest of the system, by keeping the inputs to and outputs from (other than the inputs and any outputs used for reconfiguration) the core slot under reconfiguration in their passive values. The reference [X3] provides specification for a possible implementation of such control and status signals.

Furthermore, besides the identification of a core type for a given core slot, the signals from the processing stage controller includes an identification of changes in the demanded core type for the given core slot. This information about change events in the core type demanded for a given core slot is used by the RAPIF (FIG. 15) to launch and control the logic reconfiguration process when actually needed, i.e., when the core type for the given slot changes between two successive core allocation periods, while otherwise avoiding reconfiguring the logic of the core slot.

Note that the techniques per above, along with those per e.g., [A1] for synthesizing segments of software programs into custom hardware logic designs, referred to here as application specific processors (ASPS), enable creating logic configuration files such that configure the programmable logic of their target core slot into a hardware logic implementation that performs the information processing function directly according to their source software program (segment) without a need for any executable program instructions. I.e., such ASPS, for which the techniques described herein enable configuring processing cores as demanded, are able to produce the intended processing results of their associated software programs or tasks thereof without any software overhead (including without fetching, caching, scheduling, pipelining or serially processing any instructions), by processing the appropriate input data directly in the custom hardware logic to produce the requested results, e.g., output data. For instance, an ASP can process in parallel custom hardware logic gates all of the functionality of the source software program for the ASP that do not need to be processed sequentially. Such ASPS, compared to conventional processor cores that rely on sequences of program instructions for controlling their operation, can thus significantly speed up a given information processing function as well as improve the energy etc. resource efficiency of the processing, in particular when used in combination with the other application load and type adaptive processing techniques per this description including its incorporated references.

Billing Sub-System

Objectives

The presented billing techniques are designed for maximizing the value-add of the application processing throughput of a multi-user-application parallel computing platform across a set of users of the service provided with the platform. These billing techniques, for any given user contract among the contracts supported by the platform, and on any given billing assessment period, determine a level of a demand for the capacity of the platform associated with the given contract that is met by a level of access to the capacity of the platform allocated to the given contract, and assess billables for the given contract based on (1) such met demand and (2) a level of assured access to the capacity of the platform associated with the given contract, as well as (3) billing rates, applicable for the given billing assessment period, for (a) the met demand and (b) the level of assured access associated with the given contract.

Figure 16:
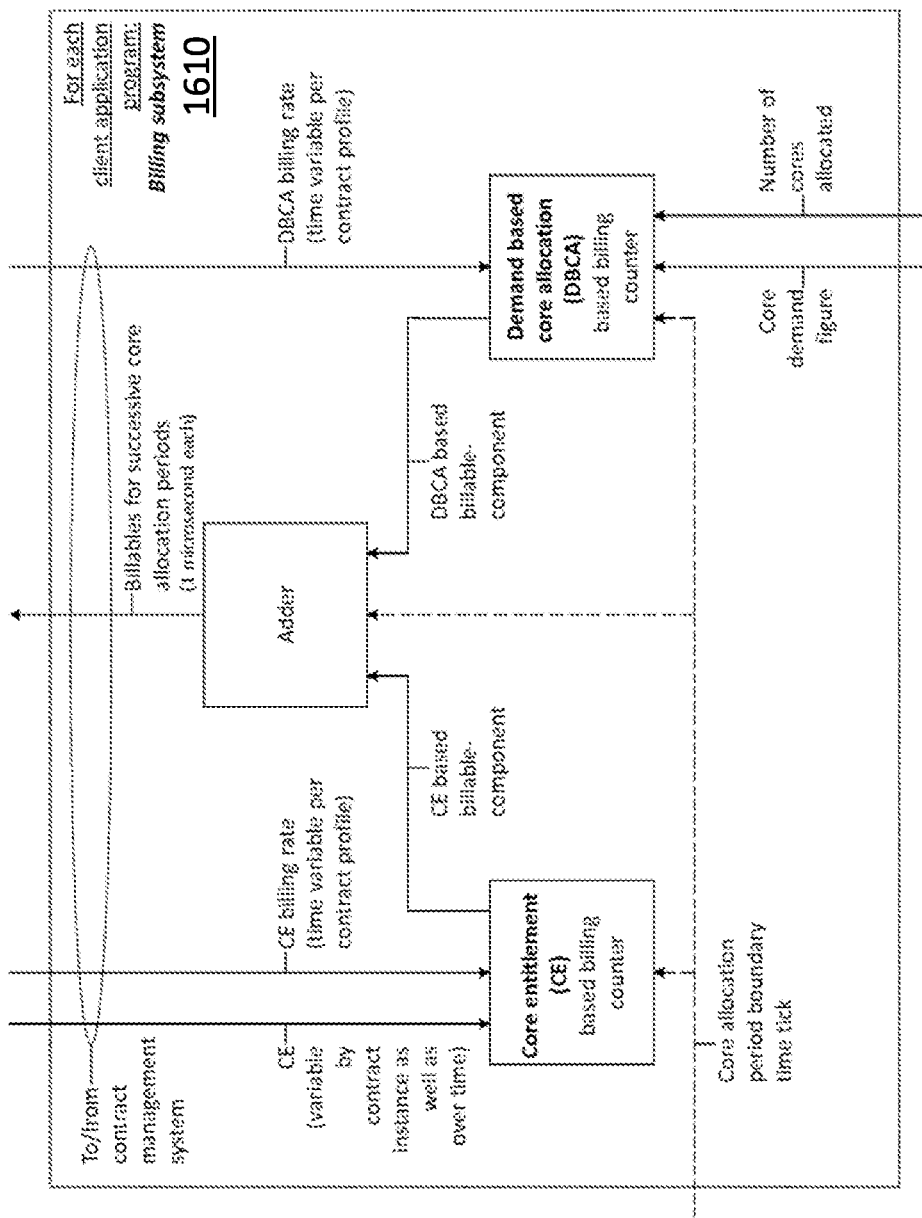
FIG. 16 shows, in accordance with an embodiment of the invention, a functional block diagram of a billing subsystem for a manycore processor.

A logic block diagram of a billing subsystem 1610 for each processing stage of the cloud processor per the foregoing is presented in FIG. 16.

The presented cloud processor billing techniques target maximizing: i) the on-time data processing throughput per unit cost for the users of a given processing system per this description, and ii) the revenue over a period of time for the service provider operating such a system of a certain total cost. Accordingly, these techniques have the following objectives:

1) Maximizing, at given billing rates for demand-based core allocations (DBCAs) for a billing assessment period (BAP), the total volume of demand-based core allocations for the programs configured for a given system per this description. Herein, DBCA refers to an amount of cores allocated to a program to meet that program's core demand figures (CDF) on the given BAP (i.e., any cores allocated for a program beyond the CDF of the program are not counted as demand based core allocations). DBCA for a given program on a given core allocation period (CAP) is taken as the lesser of the CDF and allocated core count of the program.

2) Maximizing, at given billing rates for core entitlements (CEs), the number of core entitlements sold for user contracts supported by a given system per this description. CE herein refers to the number of cores up to which amount of cores of the shared array a given user program is assured to get its (CDFs) met by core allocations on successive runs of the algorithm.

These objectives reflect the utility for the users running their programs on a system per this description; the users are assumed to perceive value in, and be willing to pay for, assured access to their desired level of capacity of a given compute system and their actual usage of the platform capacity. Accordingly, the above objectives 1) and 2) are among principal factors driving the revenue for the operator of the given system per this description.

Billing Formula

Per FIG. 16, the billables (B) for the operator of the system from a given user contract is per the following equation:

$$B = x*CE + y*DBCA \qquad \text{(Equation 1)},$$

wherein CE stands for core entitlement for the user, DBCA stands for the amount of core allocations to that user's program to meet its CDFs for the Core Allocation Periods (CAPs, e.g., 1 microsecond each) during the contract time period in question, and x and y are billing rates per the contract that convert CE and DBCA into monetary figures.

An advantage of this billing method is that a portion (i.e., the term y*DBCA) of the cost of the utility computing service for a user running its program on a system per this description is based on the CDFs of the user's program (to the degree that CDFs are met by core allocations). Therefore, each user of the system per this description has an economic incentive to configure its programs so that they eliminate any CDFs beyond the number of cores that the given program is actually able to utilize at the given time. If so allowed for a given user contract, the system will generate the CDFs for the user automatically based on the input data load levels for the user program instances. Whether the CDFs are generated by user programs or the system on their behalf, the users have the incentive to not automatically (cause a) demand (for) at least their CE worth of cores irrespective of on how many cores the given program is able to execute on in parallel at any given time. This incentive leads to increasing the average amount of surplus cores for runs of the core allocation algorithm i.e., cores that can be allocated in a fully demand driven manner (rather than in a manner to just meet the CDFs by each application for their CE figure worth of cores). Such maximally demand driven core allocation (which nevertheless allows guaranteeing each user application an assured, contract defined minimum capacity access level whenever actually demanded) facilitates providing maximized value-adding processing throughput per normalized cost across the set of user applications dynamically sharing the system per this description.

Moreover, either or both of the billing rates x and y for Equation 1 can be specified in the user contract to vary over time. The term x*CE can take a form of a sum such as x1*CE1+x2*CE2, wherein, for example, x1 is the billing rate for a core entitlement during specified premium businesses hours (e.g., Monday-Friday 9 am-5 pm at the local time zone of the given platform or user) and x2 the billing rate for a core entitlement outside the premium business hours, while CE1 and CE2 are core entitlements for the given user contract for the premium and non-premium hours, respectively. Naturally, there can be more than just two time phases with their respective billing rates. For instance, in addition to premium pricing during the business hours, also evening hours 5 pm-1 am could have a different billing rate than 1am-9 am, and so forth, depending on the popularity of the compute capacity usage during any given hours of the day. Similarly, different days of the week, special calendar days etc. can have different billing rates, based on expected popularity of compute capacity on such days. Naturally, this discussion applies also the for the coefficient y of the term y*DBCA in Equation 1.

Per FIG. 16, digital hardware logic within the controller module functions as a billing counter for the contracts supported by a given system per this description. In the logic implementation for the billing subsystem functionality discussed herein, in addition to the billing rate values, the signals x and y, provide notifications of transitions of contract time phases at which the CE and DBCA billing rates (x and y) get new values. In such a logic implementation, DBCA based billing counter counts an average number of cores allocated to a given user program over the core allocation periods (CAPs) during a given billing assessment period (BAP) (i.e., time between two successive changes of the rate y, or the maximum BAP duration configured for the system), and multiplies this average DBCA amount with a total DBCA billing rate per core applicable for that BAP. Similarly, the CE based billing counter counts the average CE level for the given program (or simply takes any constant CE level for the time phase in question) for a given BAP for which the CE billing rate remains a constant, and multiplies that average (or simply constant) CE level with a total CE billing rate applicable for that BAP. At user billing intervals, the adder accumulates the series of billable components, so produced for such BAPS of constant billing rates to form the billables for the given program. For context, the typical CAPs consist of tens to thousands of processing logic clock cycles, thus lasting for microseconds or less, while the BAPS, at boundaries of which the billing rates change, may last from minutes to hours, comprising several millions to billions of CAPs. Finally, the user contract billing periods are typically calendar months, thus typically comprising tens to hundreds of BAPS.

Usage Scenarios

The compute capacity provider operating a platform based on system(s) per this description can offer different types of CE time profiles for different application types. For instance, a service provider operating the platform could sell four basic contract types with differing CE time profiles per examples of contract plans A, B, C and D in Tbl. 8 below:

TABLE 8

| | | | Plan | | | |
|---|---|---|---|---|---|---|
| | | A | B | C | D | |
| | | | Contract type: | | | |
| | | Enterprise | Entertainment | Batch | Always on | Sum of CEs = cores need for the below |
| | | | Number of contracts | | | |
| | | 1 | 3 | 1 | 2 | contract mix |
| CEs-time profiled: | Business hours | 8 | 2 | 0 | 1 | 16 |
| | Evening hours | 1 | 4 | 0 | 1 | 15 |
| | Night hours | 0 | 2 | 8 | 1 | 16 |
| | Max during 24 h: | | | | | 16 |
| CEs-flat: | Any hour | 8 | 4 | 8 | 1 | 30 |
| | Cost-efficiency gain of time profiled CEs vs. flat CEs: | | | | | (30 − 16)/ 16 = 87.5% |

As illustrated in Tbl. 8, the capability to allow configuring compute capacity contracts with differing CE time profiles, particularly contract types with non-overlapping CE peaks on a given platform per this description, can be used both for improving the computing cost-efficiency for the users of the compute service provided through the platform as well as increasing the revenues that the compute capacity service provider is able to achieve with the platform of a certain cost of ownership. Either or both of the CE and DBCA billing rates can be set for different values on the different billing assessment periods (BAPS) within day, week, month, etc., in order to optimally even out the user program's collective processing load for a given system per this description over time, and thereby, maximize the cost efficiency for the users of the computing service provided with the given platform and/or the revenue generation rate for the service provider operating the platform. For instance, in an example scenario, the CE billing rate on business days could be $0.08 per a core for the BAP of the business hours, $0.04 for the BAP of the evening hours, and $0.01 for the BAP of night hours, while DBCA billing rate, per the average number of demand based cores allocated to a given program over the eight hours of these daily BAPS, could be $0.04 for the business, $0.02 for evening, and $0.01 for night BAPS. These daily BAP billing rates can naturally be set to any other values as well, and can have differing values on different calendar days, as well as different weekdays (e.g., Monday-Friday versus Saturday-Sunday) can have non-uniform BAP phasing (e.g., Saturday-Sunday could replace the business hour BAP of Monday-Friday with 'extended' evening hour BAP), etc.

With the example values of Tbl. 8 for a mix (or 'basket') of enterprise, entertainment (including news etc.), batch job (overnight block data processing), and always-on type of applications, it can be seen that the capability to configure applications for a given platform per this description with different CE time profiles enables the service provider operating the platform to support a given set of applications, with their collective CE requirements, with a significantly reduced system processing core capacity requirement, i.e., with a lower cost base for the revenues generated by the given set of user applications. With the numerical example shown in Tbl. 8, this system core utilization efficiency gain with time-profiled contract CEs compared to flat CEs enables a reduction from 30 to 16 cores needed for the provided mix of user contracts. In turn, this compute resource utilization efficiency gain through time profiled CEs reduces the cost of revenue for the utility computing service provider by an accordant factor. Put differently, the service provider's revenue per unit cost of the service provided (driven by the number of cores needed to support a given set of contracts) is multiplied accordingly.

Note that in discussion herein regarding the example of Tbl. 8, also the flat CE reference, against which the cost-efficiency of the time profiled CE contracts are compared, is assumed to be implemented on a system per this description that supports the application load adaptive core allocation dynamic parallel execution techniques per the preceding chapters. Since the described dynamic compute resource allocation with contract specified minimum system access level guarantees (to be met when so demanded) is not supported by conventional computing systems, the contracts supported with a platform per this description, i.e., contracts with the capability to burst to up to the full system core capacity while having a contract defined minimum assured level of access to the shared system capacity, provide a higher market value than conventional contract types, which provide either only a dedicated capacity share (but without a capability to dynamically, without user or platform operator involvement, burst beyond the dedicated cores) or a capability to burst (but without a contract defined minimum core count based access level that the user contract is guaranteed to get whenever demanded).

Moreover, regarding Tbl. 8, also note that CE level of 0 does not imply that such contract type would not allow the application under that contract to execute on its host system per this description during the hours in question; instead, CE of 0 indicates that, while the application is not guaranteed to have its CDFs met for up to any specified minimum core count, it will still in practice get its demand based fair of share of the cores allocated to it after the CDFs of set of the applications up to their CE levels have been met (per the algorithm for allocating the cores among the applications). In fact, at times when there are no other user application expressing a positive CDF at a given system per this description, the application with CE of 0 will get its CDFs met all the way to the total core count of the array.

The 24-hour cycle for the CE time profiles per example of Tbl. 8 here is merely to illustrate the capability to facilitate efficient combining of applications with differing demand time profiles for compute capacity into a shared compute capacity pool. In various scenarios, there can be, for instance, further variants of plans within the basic contract types (e.g., plans A through D per Tbl. 8) such that offer greater CE levels than the norm for the given base plan (e.g., plan A) at specified seasons or calendar dates of the year (either during the peak hours of the profile or throughout given 24-hour days) in exchange of lower CE levels than the norm for that base plan at other dates or seasons. Besides combining contracts with differing CE profiles within 24 h cycles as illustrated in Tbl. 8 to dynamically share the same capacity pools, the system also facilitates combining the seasonally differing variants of contracts within a given plan type (i.e., variants with non-coinciding seasonal peaks in their CE profiles) in the same capacity pools for further capacity utilization efficiency gains, in addition to the 8-hour phases shown in Tbl. 8. Moreover, there can be variants of contract types within a given base plan that have finer time granularity in their CE profiles. For instance, among the contracts of type B, there can be a variant that offers greater than the standard CE level of the plan type for the night hours (e.g., 1am-9 am) at specific timeslots (e.g., for a news casts at for 15 minutes at 6 am, 7 am, 8 am) in exchange of lower CE at other times during the night hours. The system facilitates efficiently combining these types of variants of contracts within a given base type with complementary peaks and valleys in their CE profiles also within a given (8 hour) phase of the 24 h cycle. As well, this type of combining of complementary variants (either seasonally, within 24 h cycles, etc.) of a given contract type can take place within the aggregate CE subpool of the contracts of the given base type. In the example shown in Tbl. 8, this type of intra contract type combining of complementary variants can thus take place, e.g., among the three contracts of type B, whose aggregate CE level is, for instance, during the night hours worth 3*2=6 cores for each CAP. At systems per this description with greater number of cores, there will normally be a greater number of applications of any given type sharing the systems (and a greater subpool of CEs for each contract type) than what is shown in the simple illustration example of Tbl. 8.

Hardware Implementation for High Resolution Billing with Minimized Overhead

The direct hardware logic implementation of the user application billing counters per FIG. 16, including the hardware logic based subcounter for computing the CE based billables components for each given application on the successive CAPs and BAPS, enables supporting (in practical terms) infinitely fine granularity of CE time profiling for the contract types and their variants. Moreover, the capability to customize the contract and variant CE time profiles per their application specific demands for processing capacity, with the hardware logic based (down to clock cycle) fine granularity, determinism, accuracy and efficiency, enables the computing service provider operating a system per this description to profitably sell highly competitively priced compute capacity service contracts, with the offered customizable CE time profiles accurately matching the processing capacity demands of any given application type. With these capabilities of the system, the users with less time sensitive programs, for instance among the programs within a given base plan, have an incentive to shift their processing loads (at least in term of their core entitlements) to less busy times, to make room for CE peaks at more popular times for the applications than can afford the more pricier CEs at such times of high aggregate demand for CEs (specifically, high aggregate demand that would exist if the CE pricing adjustment techniques were not used). These system-software-overhead-eliminating, fine granularity hardware-logic-based pricing adjustment, billables assessment and efficient compute-platform-sharing techniques per above facilitate both maximizing the users' net value of the compute service being subscribed to as well as the service provider's profitability.

SUMMARY

The presented dynamic parallel cloud computing billing model enables combining the desired aspects of per-user dedicated and multi-user shared-capacity-based computing services. Each user is guaranteed its access to its contract-specified level of the processing capacity whenever actually demanded. However, the contract specified capacity entitlements are neither kept locked down to their associated programs (at times when the processing load associated with a given user program does not demand its entitlement worth of processing core capacity) nor are they any limits for maximum capacity available for their user programs (at times when the processing load of a given user program exceeds its entitlement worth of core capacity). In fact, the incentives that the billing model provides for the user programs to economize on their core capacity demand expressions (i.e., to demand just as much capacity as their current processing load demands, rather than at least their capacity entitlement worth of processing cores regardless of the actual processing load) lead to maximization of the portion of the system processing capacity available for realtime application processing load variation based capacity allocation, to match the processing capacity demand peaks of the user programs (beyond their capacity entitlement levels).

Accordingly, the presented billing techniques for parallel processing system capacity utilization and application processing performance (per normalized cost) optimization described in the foregoing provide the following fundamental advantages:

Increased user's utility, measured as demanded-and-allocated cores per unit cost, as well as, in most cases, allocated cores per unit cost. Note that, compared to a case where the users would purely pay for their core entitlements (CEs), and as such have no direct incentive to ever demand less than their CE worth of cores, the billing method wherein a portion of the billables per a user is based on the user's demand-based-core-allocations (DBCAs) (Eq. 1; FIG. 16) during the billing assessment period, incentivizes the users to economize on their core demand figures (CDFs) (e.g., not demand their CE worth of cores unless the given user application is able to effectively utilize at the time such number of cores). In turn, this leads to there on average being more cores, per unit cost for a system per this description, to be allocated to meet CDFs above any given user's CE, when the given user's program is actually able to benefit from such bursting. Note also that cores allocated beyond the CDF of the user's application do not cost the user anything, while a users' program can gain performance benefit from receiving a greater than number of cores allocated to it than it demanded. Thus the described billing techniques, together with the dynamic parallel execution techniques per this description, maximize the amount of utilizable parallel execution core capacity received by each given user application on systems per this description per unit of cost of the computing service provided through such platform.

Increased revenue generating capability for the service provider from CE based billables, per unit cost for a system per this description, through the ability to offer contract plans with mostly or fully non-overlapping CE peaks (such as in case with plans A through D per example of Tbl. 8). This enables increasing the service provider's operating cash flows generated or supported by a system per this description of certain cost level. Also, compared to a given computing service provider's revenue level, this method reduces the provider's cost of revenue, allowing the provider to offer more competitive contract pricing, by passing on at least a portion of the savings to the customers (also referred to as users) running programs on the system per this description, thereby further increasing the customer's utility of the computing service subscribed to (in terms of compute capacity received when demanded, specifically, number of cores allocated and utilized for parallel program execution) per unit cost of the service. Consequently, this technique for optimally combining user contracts with complementary CE time profiles on a given system per this description allows the service provider operating the system per this description to increase the competitiveness of its compute capacity service offering among the prospective customers in terms of performance and price.

The presented pricing optimization and billing techniques, in particular when combined with dynamic parallel cloud computing techniques per the preceding chapters of this execution environment system description, thus are designed for maximizing the overall utility computing cost-efficiency, particularly for workflows demanding parallel execution for on-time processing throughput performance gain.

Further reference specifications for aspects and embodiments of the invention are in the references [1] through [10].

The functionality of the invented systems and methods described in this specification, where not otherwise mentioned, is implemented by hardware logic of the system (wherein hardware logic naturally also includes any necessary signal wiring, memory elements and such).

Generally, this description and drawings are included to illustrate architecture and operation of practical embodiments of the invention, but are not meant to limit the scope of the invention. For instance, even though the description does specify certain system elements to certain practical types or values, persons of skill in the art will realize, in view of this description, that any design utilizing the architectural or operational principles of the disclosed systems and methods, with any set of practical types and values for the system parameters, is within the scope of the invention. Moreover, the system elements and process steps, though shown as distinct to clarify the illustration and the description, can in various embodiments be merged or combined with other elements, or further subdivided and rearranged, etc., without departing from the spirit and scope of the invention. Finally, persons of skill in the art will realize that various embodiments of the invention can use different nomenclature and terminology to describe the system elements, process phases etc. technical concepts in their respective implementations. Generally, from this description many variants and modifications will be understood by one skilled in the art that are yet encompassed by the spirit and scope of the invention.

What is claimed is:

1. A parallel data processing platform comprising:
a plurality of programmable logic-based processing units, each comprising
at least one input port to receive data packets,
a plurality of reconfigurable processing cores, separately configurable to perform respective processing tasks, wherein in at least a first configuration, a first processing core of the plurality of reconfigurable processing cores is configured to instantiate a first task, and a second processing core of the plurality of reconfigurable processing cores is configured to instantiate a second task, different than the first task,
a hardware-configured set of task-specific packet buffers,
a hardware-configured demultiplexer to demultiplex data packets received at the at least one input port into corresponding ones of the task-specific packet buffers, in dependence on a respective value of at least one identifier included in each received data packet, and
multiplexing logic to, for each respective packet buffer of the task-specific packet buffers, direct data packets from the respective packet buffer to a corresponding one of the plurality of reconfigurable processing cores that is in a current task configuration corresponding to the respective packet buffer.

2. The parallel data processing platform of claim 1, wherein each of the plurality of programmable logic-based processing units further comprises at least one output port to transmit data packets, the parallel data processing platform further comprising a packet cross-connect providing data packet connectivity between a respective output port of the at least one output port of each of at least some of the plurality of programmable logic-based processing units and a respective input port of the at least one input port of each of at least some others of the plurality of programmable logic-based processing units.

3. The parallel data processing platform of claim 2, configured to support execution of a multi-stage program task comprising the first task and a third task by:
instantiating the first task on one of the plurality of reconfigurable processing cores of a first processing unit of the plurality of programmable logic-based processing units;
instantiating the third task on one of the plurality of reconfigurable processing cores of a second processing unit of the plurality of programmable logic-based processing units; and
configuring the first processing unit to transmit output data packets from the first task, the output data packets comprising intermediate results of the multi-stage program task and including an identifier for the third task, the transmitting being out the at least one output port of the first processing unit to the at least one input port of the second processing unit.

4. The parallel data processing platform of claim 3, further configured to support execution of the multi-stage program task by:
instantiating the third task on one of the plurality of reconfigurable processing cores of a third processing unit of the plurality of programmable logic-based processing units, and
configuring the first processing unit to transmit the output data packets from the first task to either the second processing unit or the third processing unit, in dependence upon at least a relative availability between a respective availability reported by each of the second and third processing units.

5. The parallel data processing platform of claim 4, wherein the relative availability comprises a load or utilization.

6. The parallel data processing platform of claim 1, wherein each of the plurality of programmable logic-based processing units comprises a field-programmable gate array (FPGA).

7. The parallel data processing platform of claim 6, wherein the hardware-configured demultiplexer is configured at least in part on one or more programmable regions of the FPGA.

8. The parallel data processing platform of claim 6, wherein the multiplexing logic is configured at least in part on one or more programmable regions of the FPGA.

9. The parallel data processing platform of claim 6, wherein selected ones of the FPGAs are configured to support communicating, by a task executing on the respective FPGA, final results of a given task from the parallel data processing platform to a client that requested execution of the given task.

10. The parallel data processing platform of claim 6, further comprising one or more elements of the platform configured to:
maintain availability information identifying availability of one or more reconfigurable processing cores for the FPGAs; and
modify the availability information to indicate that a particular FPGA is in use.

11. A method of operating a parallel data processing platform comprising a plurality of interconnected programmable logic-based processing units, each programmable logic-based processing unit comprising a plurality of programmable logic sections, the method comprising, on each given unit of the plurality of programmable logic-based processing units:
configuring a plural set of task-specific packet buffers;
configuring a hardware demultiplexer to demultiplex data packets received by at least one input port of the given unit into corresponding ones of the task-specific packet buffers, in dependence on a respective value of at least one identifier included in each received data packet;

configuring different programmable logic sections of the given unit to perform separate program tasks, at least some of which correspond to respective ones of the task-specific packet buffers;

configuring multiplexing logic to, for each respective packet buffer of the task-specific packet buffers, direct data packets received into the respective packet buffer to a corresponding programmable logic section of the given unit that is in a current task configuration corresponding to the respective packet buffer; and concurrently executing the separate program tasks configured to consume the data packets directed to the corresponding programmable logic sections.

12. The method of claim 11, further comprising:
configuring a programmable logic section of a first processing unit of the plurality of interconnected programmable logic-based processing units to execute a first task;

configuring a programmable logic section of a second processing unit of the plurality of interconnected programmable logic-based processing units to execute a second task, wherein the first and second tasks are each a portion of a multi-stage program task;

configuring the first processing unit to transmit output data packets from the first task, comprising intermediate results of the multi-stage program task and including an identifier for the second task, over an interconnection to the second processing unit; and configuring the second processing unit such that one of the task-specific packet buffers receives the output data packets as input data packets for the second task.

13. The method of claim 12, further comprising:
configuring a programmable logic section of a third processing unit of the plurality of interconnected programmable logic-based processing units to execute the second task; and configuring the first processing unit to transmit output data packets from the first task to either the second processing unit or the third processing unit, in dependence upon at least a relative availability between a respective availability reported by each of the second and third processing units.

14. The method of claim 13, wherein the relative availability comprises a load or utilization.

15. The method of claim 12, further comprising configuring the second processing unit to support communicating final results of the multi-stage program task to a client that requested execution of the multi-stage program task.

16. The method of claim 11, wherein each of the plurality of interconnected programmable logic-based processing units comprises a field-programmable gate array (FPGA), and each of the programmable logic sections comprises a separately reconfigurable processing core of the FPGA.

17. The method of claim 16, further comprising:
maintaining availability information identifying availability of one or more of the reconfigurable processing cores for the FPGAs; and modifying the availability information to indicate that a particular FPGA is in use.

* * * * *